(12) United States Patent
Satoh et al.

(10) Patent No.: US 8,094,522 B2
(45) Date of Patent: Jan. 10, 2012

(54) ELECTRONIC CLOCK

(75) Inventors: Kohichi Satoh, Niiza (JP); Yuh Takyoh, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 167 days.

(21) Appl. No.: 12/309,033

(22) PCT Filed: Jul. 5, 2007

(86) PCT No.: PCT/JP2007/063431
§ 371 (c)(1),
(2), (4) Date: Jan. 5, 2009

(87) PCT Pub. No.: WO2008/004605
PCT Pub. Date: Jan. 10, 2008

(65) Prior Publication Data
US 2009/0238044 A1 Sep. 24, 2009

(30) Foreign Application Priority Data

Jul. 6, 2006 (JP) .................................. 2006-186524

(51) Int. Cl.
*G04B 19/04* (2006.01)
(52) U.S. Cl. .......................................... 368/80; 368/155
(58) Field of Classification Search .................. 368/76, 368/80–81, 157, 200–202
See application file for complete search history.

(56) References Cited

U.S. PATENT DOCUMENTS

| | | | | |
|---|---|---|---|---|
| 4,241,433 A * | 12/1980 | Ueda et al. | ....................... | 368/76 |
| 4,460,282 A | 7/1984 | Kanno | | |
| 5,889,734 A * | 3/1999 | Sato | ................ | 368/64 |
| 5,933,392 A * | 8/1999 | Sato et al. | ..................... | 368/157 |
| 6,194,862 B1 * | 2/2001 | Hara | .............................. | 318/696 |
| 6,946,813 B2 * | 9/2005 | Manaka | ........................ | 318/685 |
| 7,701,807 B2 * | 4/2010 | Kitazawa et al. | ............... | 368/80 |

(Continued)

FOREIGN PATENT DOCUMENTS

GB 2 076 567 12/1981

(Continued)

OTHER PUBLICATIONS

Supplementary European Search Report issued Mar. 24, 2010 in EP 07 76 8181.

(Continued)

*Primary Examiner* — Sean Kayes
(74) *Attorney, Agent, or Firm* — Wenderoth, Lind & Ponack, L.L.P.

(57) ABSTRACT

An electronic clock makes no erroneous determination of rotation detection and suppresses unnecessary current consumption even when being provided with a second hand having a large moment of inertia. The electronic clock uses a first detection mode determination circuit and a second detection mode determination circuit to perform the rotation detection. The electronic clock includes a determination selecting circuit as changing means for changing the determination period of the second detection mode in accordance with the determination period of the first detection mode. Even when the current waveform is disturbed, erroneous determinations are prevented in a way that the determination terminal of the second detection mode is shortened if the first detection mode terminates earlier. The determination period is changed by the determination selecting circuit selecting either one of a seven-time detection/determination circuit that terminates the determination after seven detection pulses or a six-time detection/determination circuit that terminates the determination after six detection pulses. Alternatively, instead of the number of detection pulses, a cycle of the detection pulses may be shortened.

11 Claims, 26 Drawing Sheets

| U.S. PATENT DOCUMENTS | | | |
|---|---|---|---|
| 2006/0186853 A1 | 8/2006 | Brummack et al. | |

| FOREIGN PATENT DOCUMENTS | | |
|---|---|---|
| JP | 7-120567 | 12/1995 |
| JP | 8-33457 | 3/1996 |
| JP | 2003-259692 | 12/2003 |
| JP | 2006-271190 | 5/2006 |
| WO | 2004/088438 | 10/2004 |

OTHER PUBLICATIONS

International Search Report issued Aug. 7, 2007 in the International (PCT) Application of which the present application is the U.S. National Stage.

* cited by examiner

FIG.3
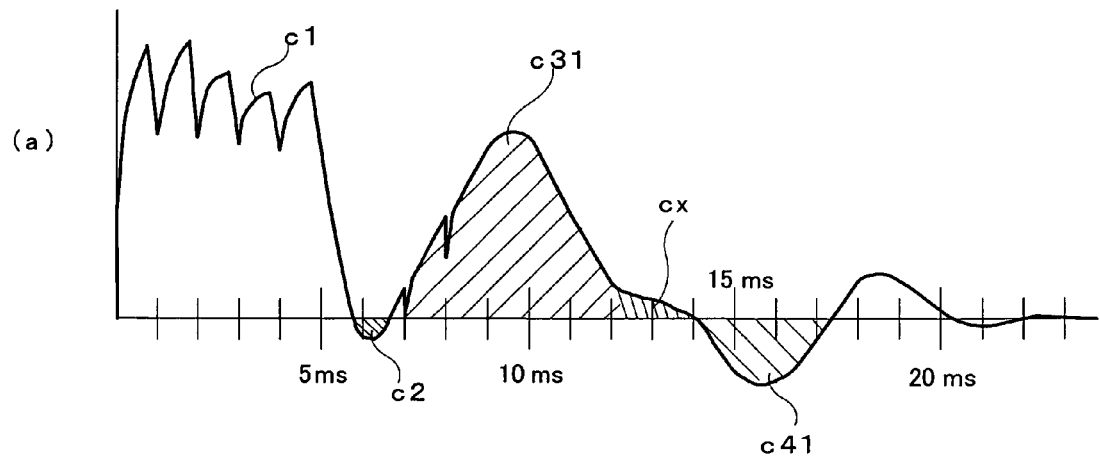
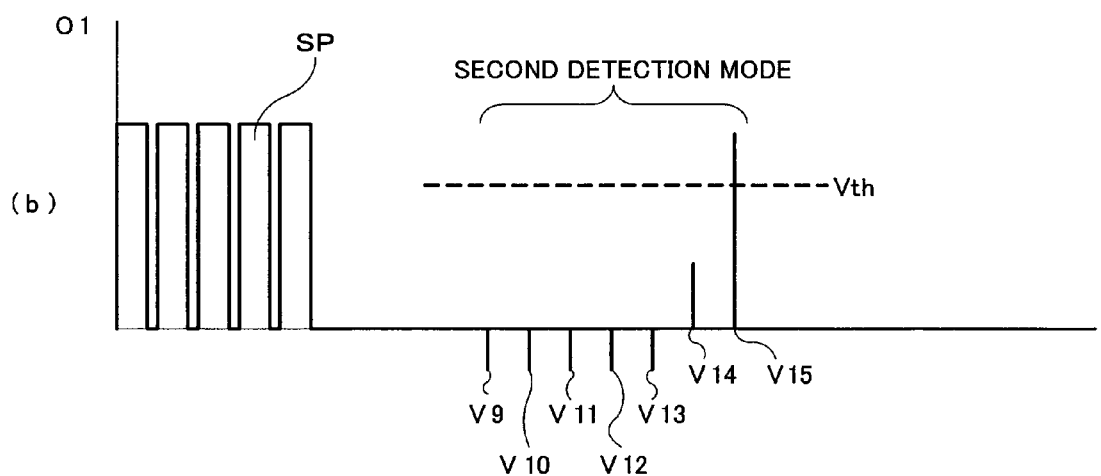
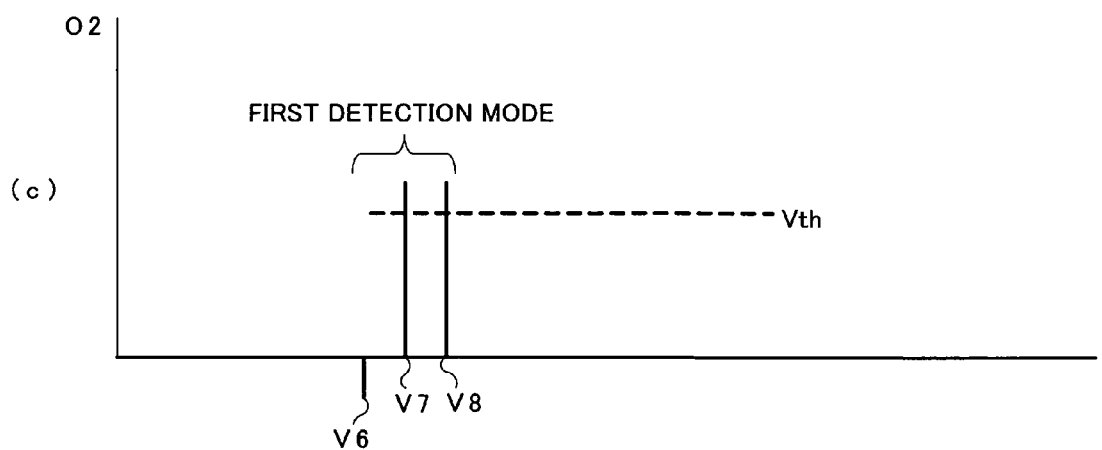

FIG.4
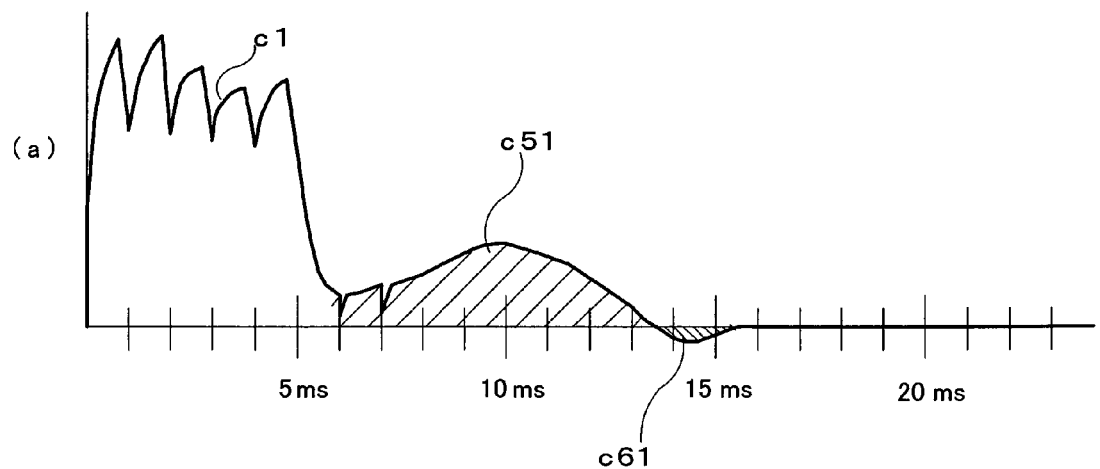
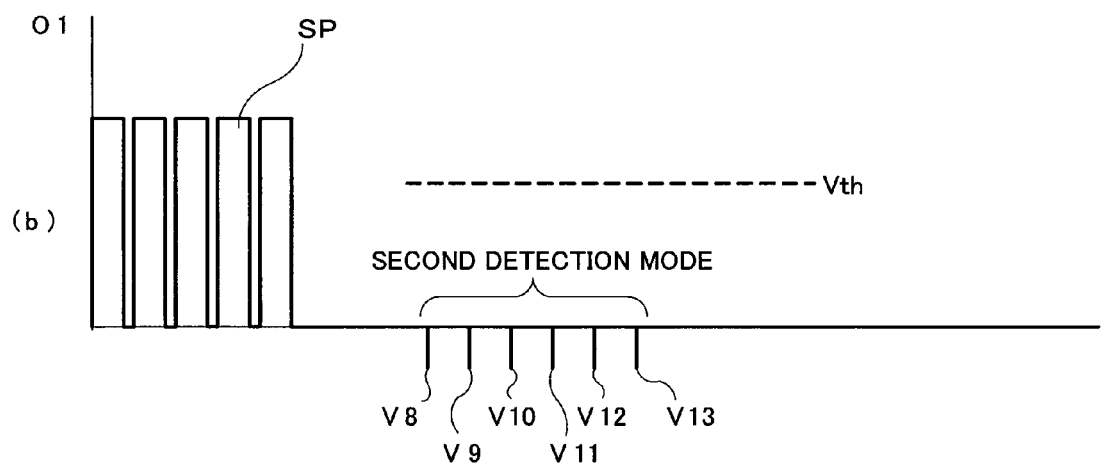
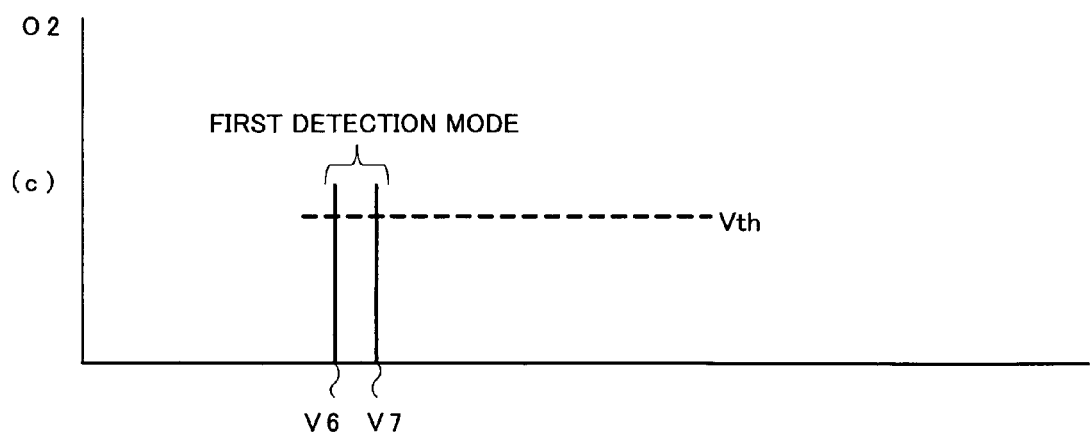

FIG. 14
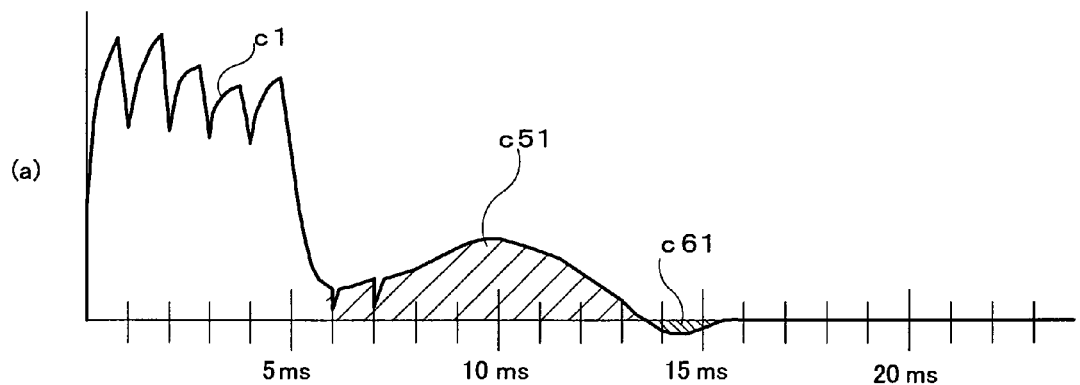
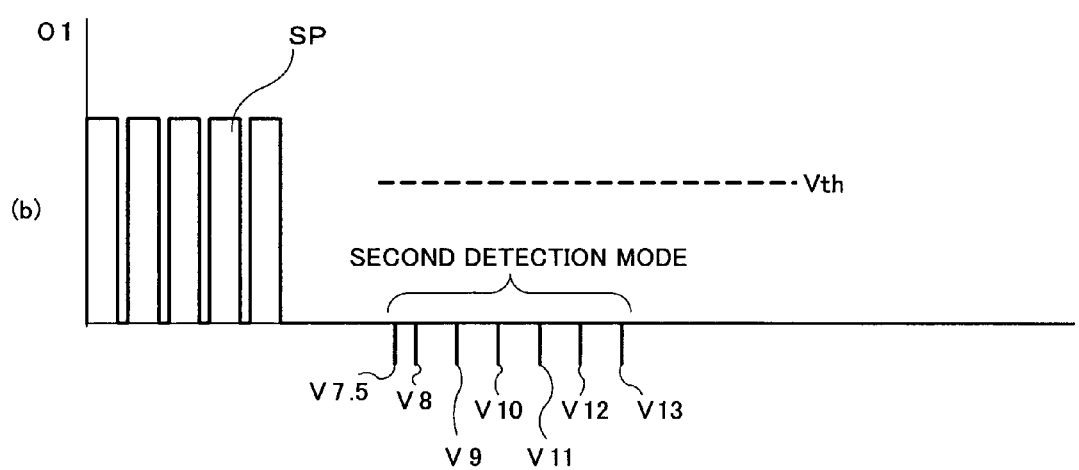
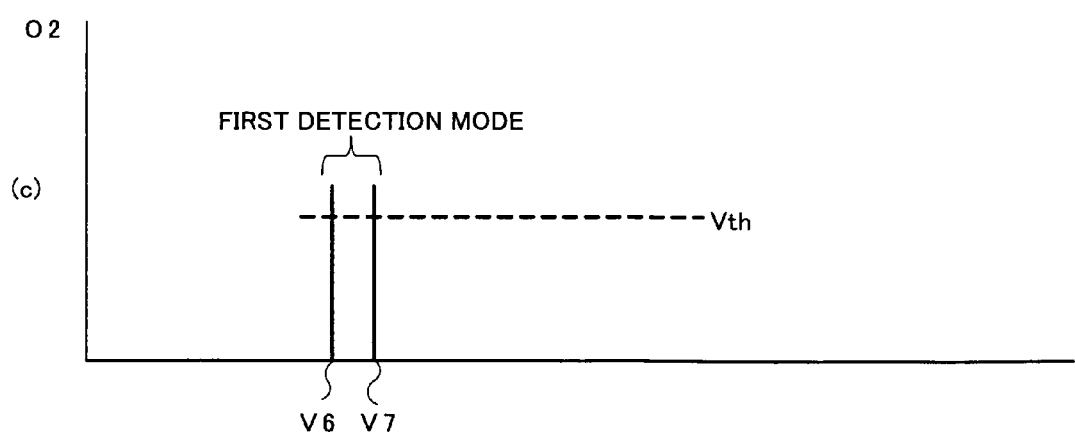

FIG.17
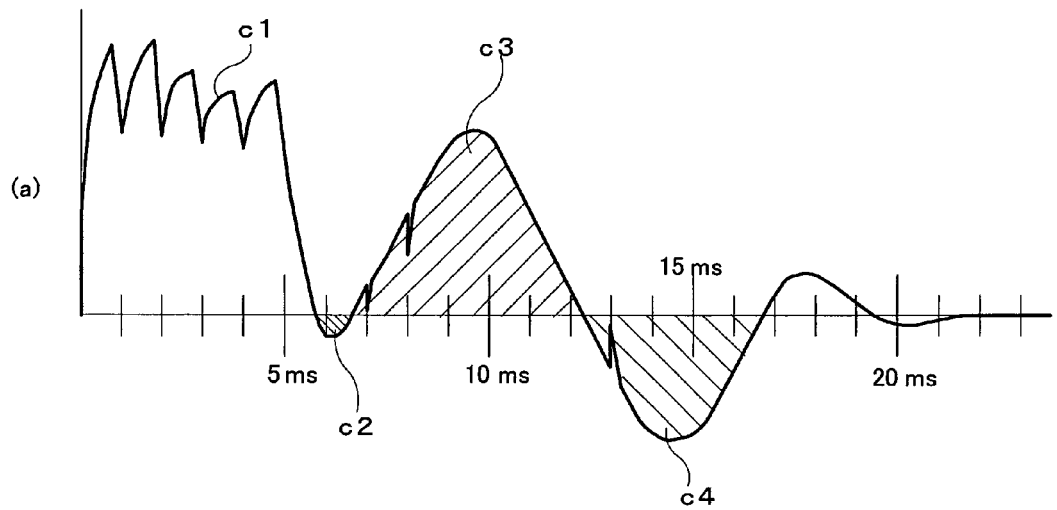
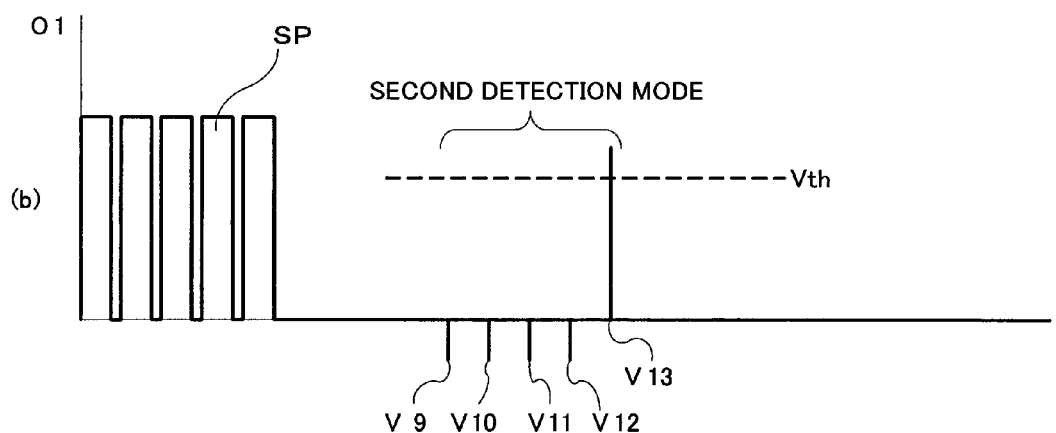
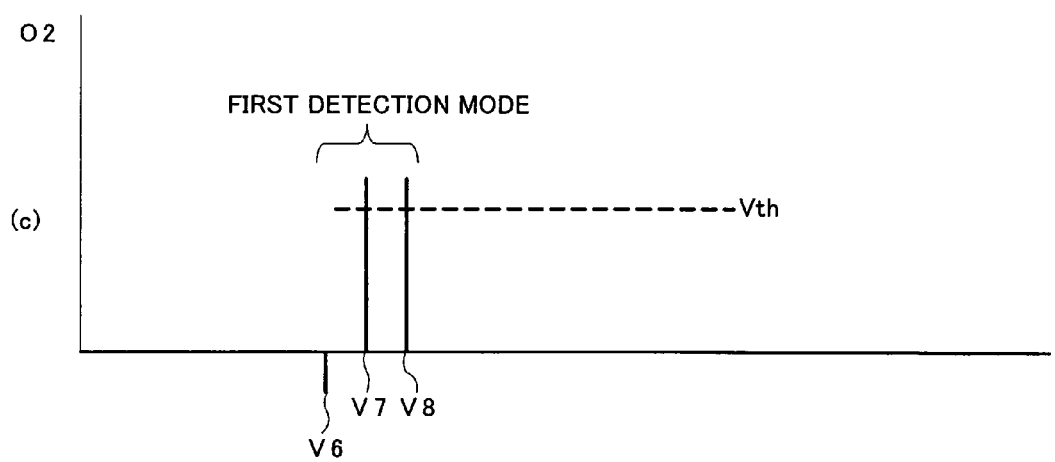

FIG.18
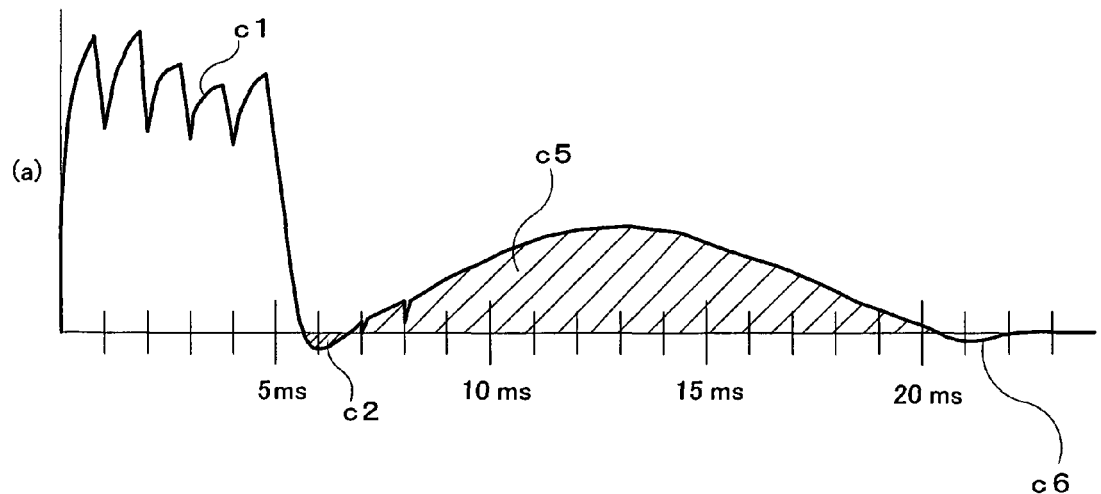
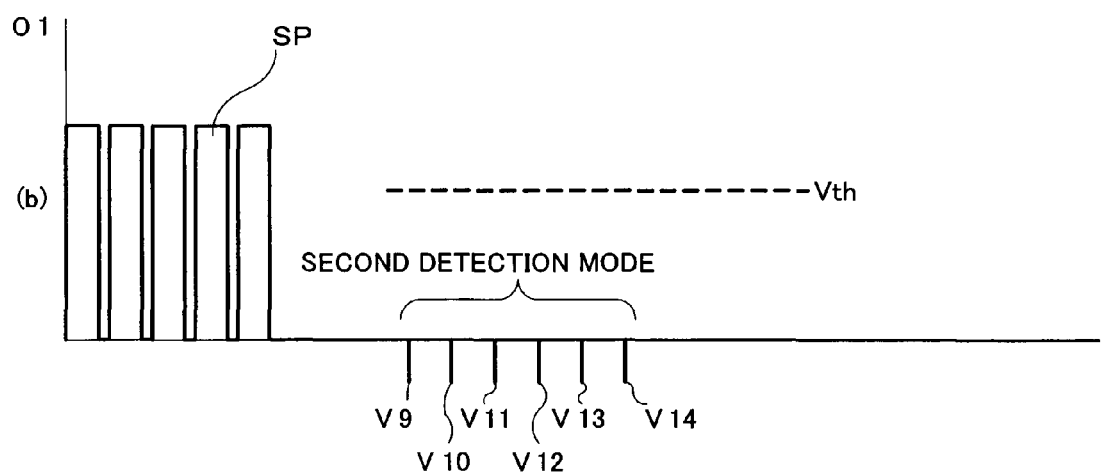
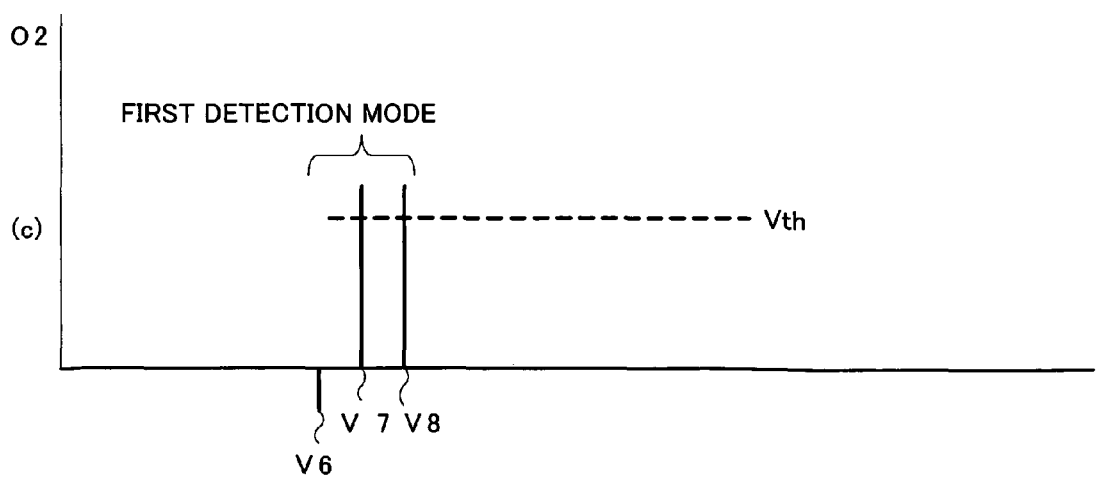

FIG. 19
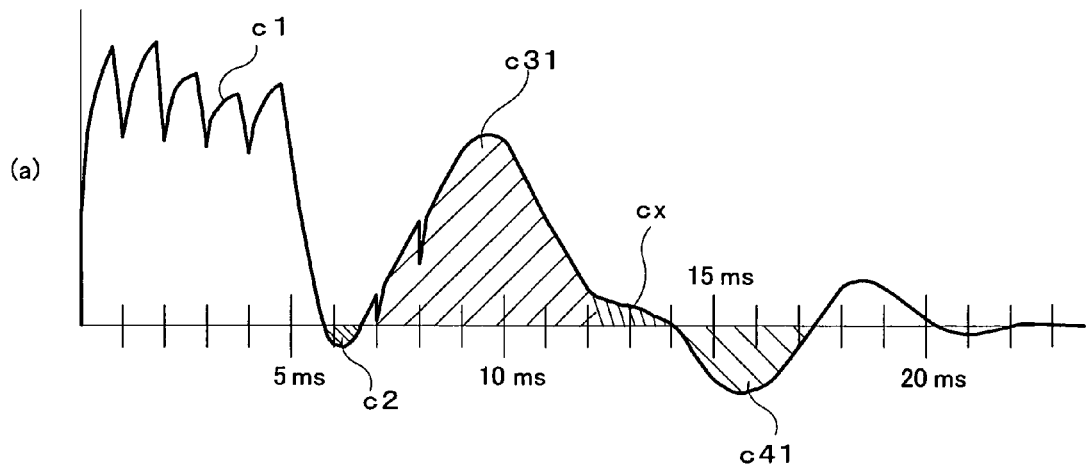
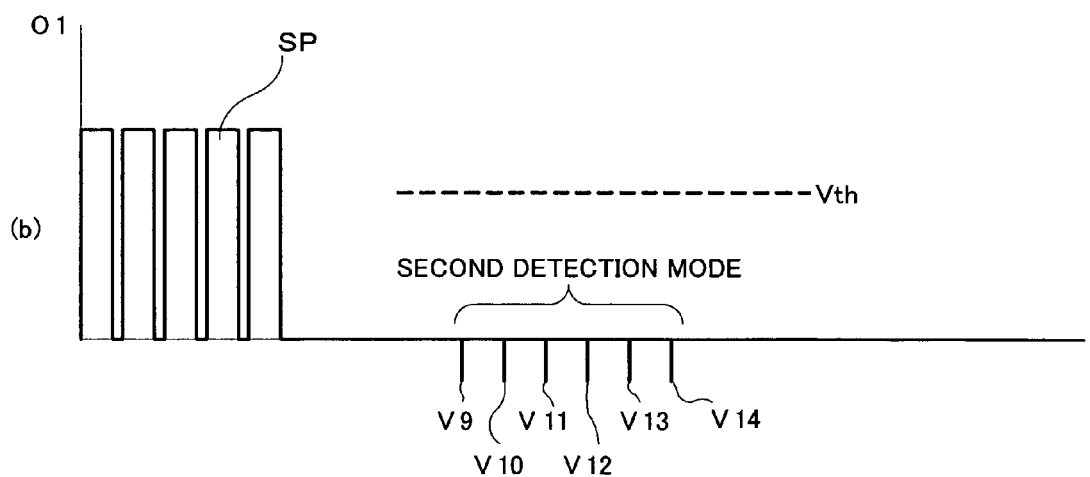
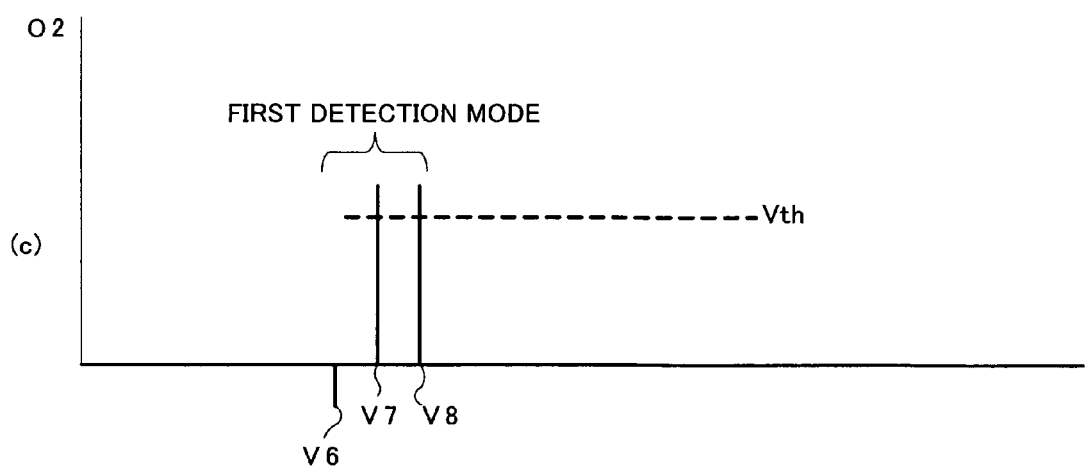

FIG.20
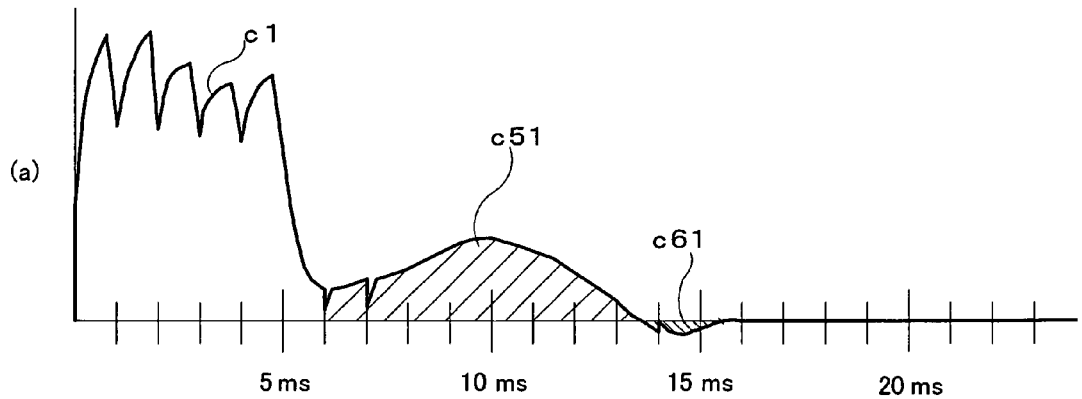
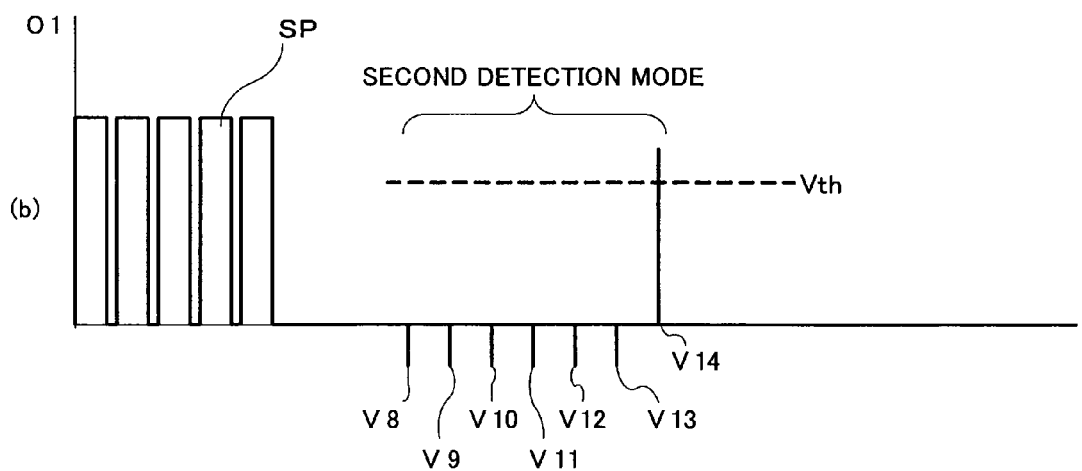
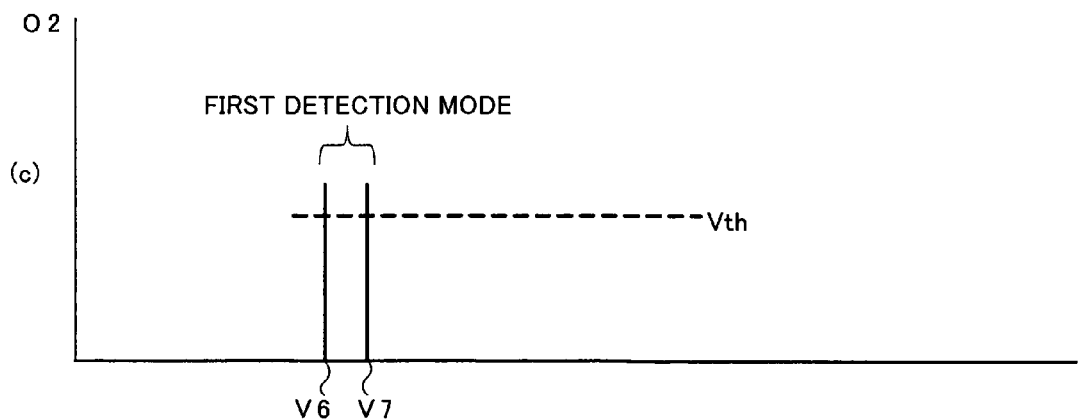

FIG.23
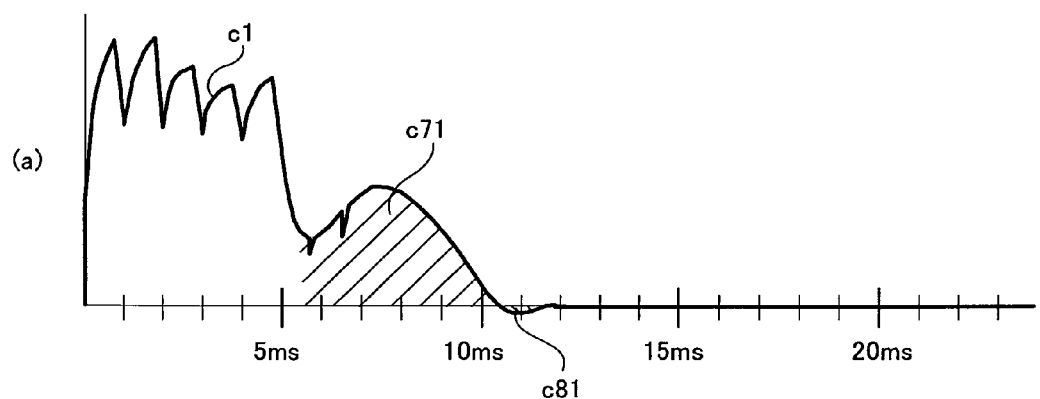
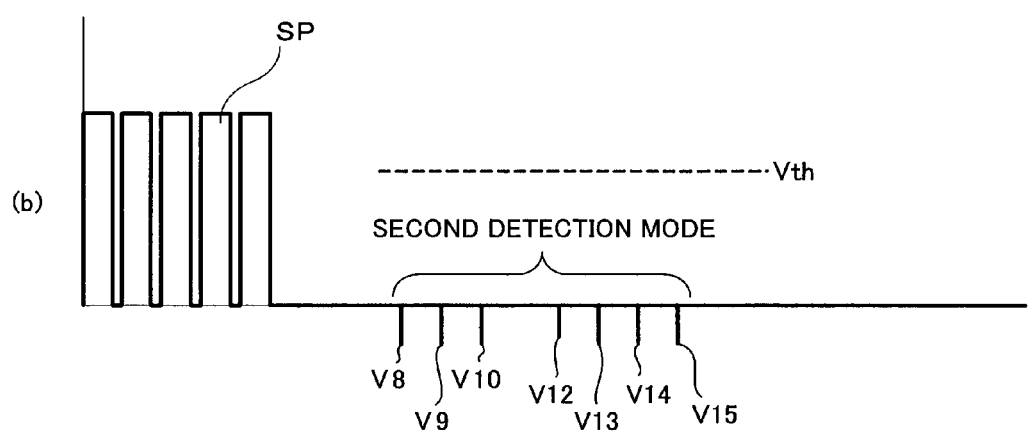
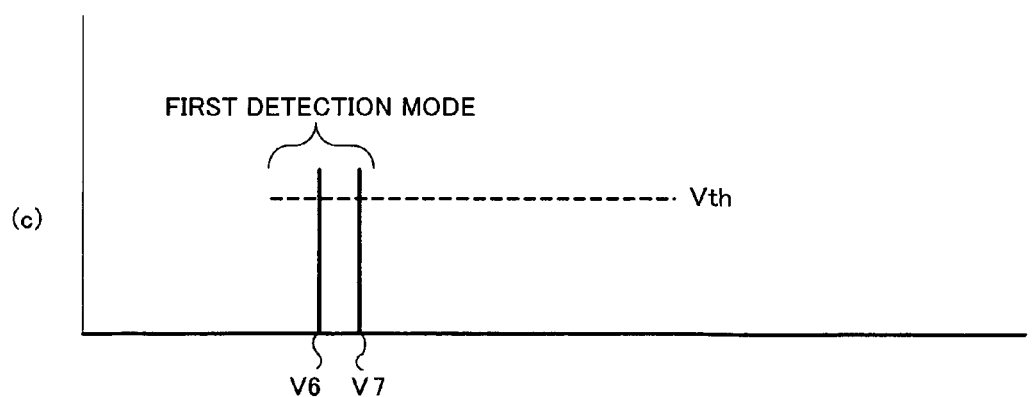

FIG.26
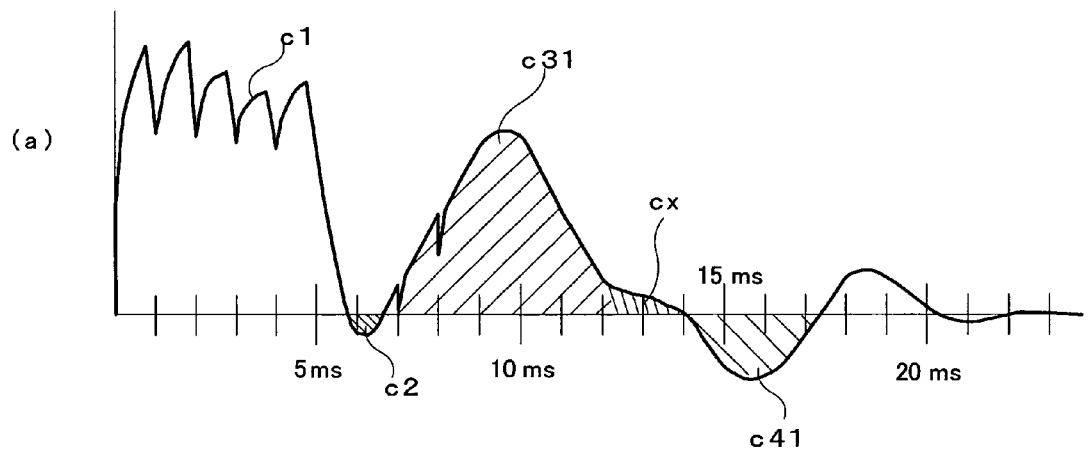
(a)
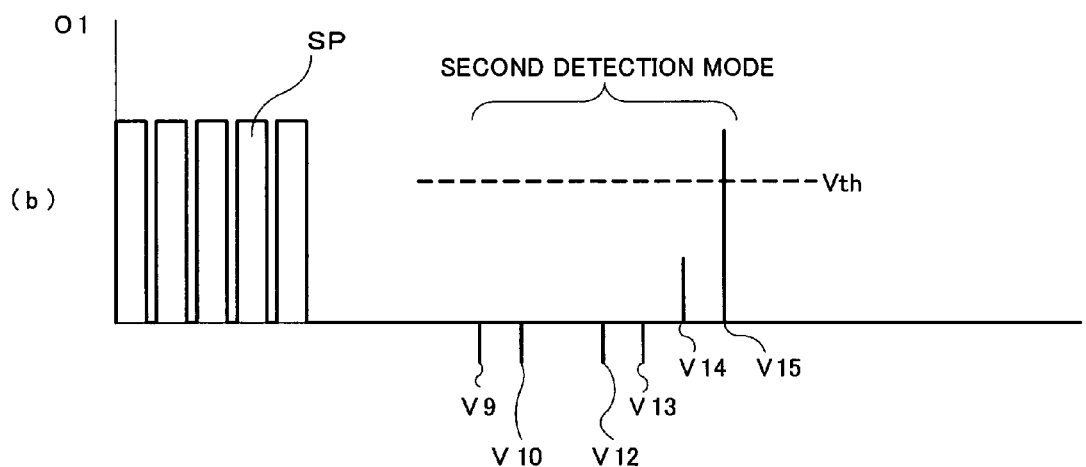
(b)
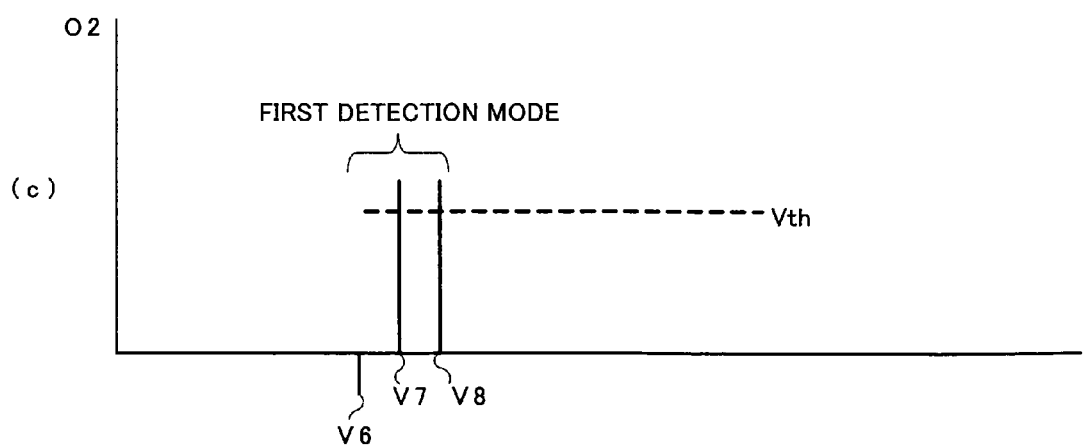
(c)

ELECTRONIC CLOCK

TECHNICAL FIELD

The present invention relates to an electronic clock having a step motor.

PRIORITY CLAIM

This application claims priority from Japanese Patent Application No. 2006-186524, filed on Jul. 6, 2006, the content of which is incorporated herein by reference.

BACKGROUND ART

In recent years, an electronic clock has greatly extended battery life by lowering current consumption of a step motor. The lowering of the current consumption of the step motor is achieved by usually driving the step motor with a small driving force that consumes a small amount of current, while driving the step motor with large driving force only when a rotor fails to rotate due to load increase. In a widely-used conventional method of detecting rotation/non-rotation of a rotor, a free vibration pattern of a rotor is determined as follows: after application of a normal drive pulse has terminated, a detection pulse is outputted to quickly change an impedance value of a coil of the step motor; and then an induced voltage generated in the coil is detected at an end of the coil. For example, firstly, one of two drive inverters respectively connected to two ends of the coil is operated to output a detection pulse as a first detection mode. Then, when a rotation detection signal is generated, the first detection mode is stopped while the other drive inverter is operated to output a detection pulse as a second detection mode. If a rotation detection signal is generated during the second detection mode, it is determined that the rotor is successfully rotated.

The second detection mode is for detecting that rotation has succeeded, i.e., that a rotor has exceeded a mountain of magnetic potential. The first detection mode is performed prior to the second detection mode to prevent detection of an erroneous detection signal generated before the rotor completely exceeds the mountain of magnetic potential when the rotor is driven relatively weakly. This prevents a waveform of a current waveform c2 of FIG. 17 or 18 from being erroneously determined as a detection signal showing that the rotor has exceeded the magnetic potential even though the rotation of the rotor has not yet terminated. Hence, performing the first detection before the second detection mode is known as an effective technique for more reliably detecting rotation. (Refer to Patent Document 1 and Patent Document 2, for example.)

Hereinbelow, the conventional technique is described with reference to the drawings. FIG. 15 is a block diagram showing a circuit configuration of a conventional electronic clock. FIG. 16 is a diagram showing pulse waveforms generated in the conventional electronic clock. FIG. 17 is a diagram of current waveforms and voltage waveforms generated in the coil when the rotor has successfully rotated. FIG. 18 is one example of a diagram of current waveforms and voltage waveforms generated in the coil when the rotor has successfully rotated.

In FIG. 15, reference numeral 20 is a step motor formed of a coil 9 and a rotor 10, reference numeral 1 is an oscillating circuit, reference numeral 2 is a frequency divider circuit, and reference numeral 3 is a normal drive pulse generating circuit which is configured to output ¾ ms-wide normal drive pulses SP every 1 ms in width of 5 ms, as shown in FIG. 16(a), at the beginning of every second, based on a signal of the frequency divider circuit 2. Reference numeral 4 is a correction drive pulse generating circuit which is configured to output a correction drive pulse FP of 10 ms, based on the signal of the frequency divider circuit 2 as shown in FIG. 16(d). If a rotation detection signal of the rotor 10 is not generated and rotation of the rotor is determined as failure, the correction drive pulse FP is outputted at 32 ms after the beginning of the second. Reference numeral 5 is a first detection pulse generating circuit that outputs detection pulses B6 to B12 for performing the first detection mode, based on the signal of the frequency divider circuit 2. As shown in FIG. 16(b), the detection pulses B6 to B12 are pulses of 0.125 ms width and outputted every 1 ms in a period of 6 ms to 12 ms after the beginning of the second. Reference numeral 406 is a second detection pulse generating circuit that outputs detection pulses F8 to F18 for performing the second detection mode, based on a signal of the frequency divider circuit 2. As shown in FIG. 16(c), the detection pulses F8 to F18 are pulses of 0.125 ms width and are outputted every 1 ms in a period of 8 ms to 18 ms after the beginning of the second.

Reference numeral 7 is a pulse selecting circuit that selectively outputs signals outputted from the normal drive pulse generating circuit 3, the correction drive pulse generating circuit 4, the first detection pulse generating circuit 5, and the second detection pulse generating circuit 406, based on results of the determination made in a first detection mode determination circuit 412 and a second detection mode determination circuit 413, which will be described later. Reference numeral 8 is a driver circuit that outputs a signal of the pulse selecting circuit 7 to the coil 9, rotationally drives the rotor 10, and controls rotation detection. The driver 8 outputs pulses alternately from a terminal O1 and a terminal O2 every second. Reference numeral 11 is a detection circuit that detects an induced voltage generated in the coil 9. Reference numeral 412 is the first detection mode determination circuit that performs a determination in the first detection mode, based on a detection signal of the detection circuit 11, while reference numeral 413 is the second detection mode determination circuit that performs a determination in the second detection mode, based on a detection signal of the detection circuit 11.

Note that, the detection pulses B6 to B12 are outputted to the terminal opposite to the terminal to which the normal drive pulses SP are outputted to quickly change an impedance of a closed loop including the coil 9 so that a counter-electromotive voltage generated from free vibrations of the rotor 10 after application of the normal drive pulses SP is amplified and then the detection circuit 11 detects the amplified counter-electromotive voltage. In addition, the detection pulses F8 to F18 are outputted to the same terminal as the terminal to which the normal drive pulses SP are outputted to quickly change an impedance of the closed loop including the coil 9 so that a counter-electromotive voltage generated from free vibrations of the rotor 10 after application of the normal drive pulses SP is amplified and then the detection circuit 11 detects the amplified counter-electromotive voltage.

Next, the operation of the above configuration will be described. The pulse selecting circuit 7 selects the normal drive pulses SP outputted from the normal drive pulse generating circuit 3 at the beginning of every second, and drives the step motor 20. Then, 6 ms after the beginning of the second, the first detection mode starts. In the first detection mode, the pulse selecting circuit 7 selects and outputs the detection pulses B6 to B12 outputted from the first detection pulse generating circuit 5, and controls the step motor 20 so that an impedance of the coil 9 may change. Then, the detection circuit 11 detects an induced voltage generated in the coil 9 due to the detection pulses B6 to B12. In contrast, the pulse selecting circuit 7 instructs the first detection mode determination circuit 412 to start determination operation. The first detection mode determination circuit 412 determines the presence or absence of a detection signal in the first detection mode, based on the number of inputs of the detection signals from the detection circuit 11. Based on the detection signals from the detection circuit 11, when detection signals are generated twice, the first detection mode determination circuit 412 determines detection. Immediately after this, the first detection mode determination circuit 412 instructs the pulse selecting circuit 7 to stop detection pulses outputted from the first detection pulse generating circuit 5 and to terminate the operation of the first detection mode, and makes a shift from the first detection mode to the second detection mode by instructing the second detection mode determination circuit 413 to start operation.

In the second detection mode, the pulse selecting circuit 7 selects and outputs detection pulses F8 to F18 generated by the second detection pulse generating circuit 406, and controls the step motor 20. Then, the detection circuit 11 detects an induced voltage generated in the coil 9 due to the detection pulses F8 to F18. Based on the detection signal of the detection circuit 11, when a detection signal is generated even once, the second detection mode determination circuit 413 determines that rotation is successfully performed. Immediately after this, the second detection mode determination circuit 413 controls the pulse selecting circuit 7 to terminate the detection pulses outputted from the second detection pulse generating circuit 406 so that the operation of the second detection mode is terminated, and not to output correction drive pulse FP. Here, the second detection mode determination circuit 413 terminates the detection of the detection signals generated due to the detection pulses F8 to F18 after at most six times of the detections. If no detection signal is generated during a detection trial, the second detection mode determination circuit 413 determines failure of rotation and controls the pulse selecting circuit 7 to output the correction drive pulse FP.

A method of detecting actual rotation in the above operation will be described with reference to waveform diagrams of FIGS. 16 and 17. First, a case where the rotor normally rotates will be described. FIG. 17(a) shows a current waveform induced in the coil 9 when the rotor 10 rotates. FIG. 17(b) shows a voltage waveform generated at one terminal O1 of the coil 9 in the second detection mode, and FIG. 17(c) shows a voltage waveform generated at the other terminal O2 of the coil 9 in the first detection mode. The generated waveforms of the terminals O1 and O2 are alternating pulses that reverse phases every second.

First, the normal drive pulses SP as shown in FIG. 16(a) are applied to the one end O1 of the coil 9 and the rotor 10 rotates. The waveform at this time is shown as a waveform c1 of FIG. 17(a). When the normal drive pulses SP terminate, the rotor 10 becomes in a free vibration state, and the current waveform is turned into induced current waveforms shown by c2, c3, c4. At 6 ms, the first detection mode starts, and the detection pulse B6 shown in FIG. 16(b) is applied to the coil 9. As shown in FIG. 17(a), at 6 ms, the current waveform is in the region of the current waveform c2 and a current value is on the negative side. Thus, as shown in FIG. 17(c), an induced voltage V6 generated due to the detection pulse B6 does not exceed a threshold value Vth of the detection circuit (hereinafter simply referred to as a threshold value Vth). However, at 7 ms, the current waveform enters the region of the current waveform c3, and the current value changes to the positive side. Thus, as shown in FIG. 17(c), an induced voltage V7 generated due to the detection pulse B7 is a detection signal exceeding the threshold value Vth. Similarly, also at 8 ms, the current waveform is in the region of the current waveform c3, and an induced voltage V8 generated due to the detection pulse B8 is a detection signal exceeding the threshold Vth. Since the two detection signals of the induced voltages V7, V8 have exceeded the threshold value Vth, the first detection mode switches to the second detection mode.

Since the switching to the second detection mode according to the induced voltage V8, a detection pulse of the next timing, i.e., a detection pulse F9 at 9 ms shown in FIG. 16(c) is applied to the coil 9. As shown in FIG. 17(a), at 9 ms, the current waveform is in the region of the current waveform c3 and the current value is on the positive side. Thus, as shown in FIG. 17(b), an induced voltage V9 generated due to the detection pulse F9 does not exceed the threshold value Vth. In addition, as the current waveform is still in the region of the current waveform c3, induced voltages V10, V11, V12 generated due to the respective detection pulses F10, F11, F12 do not exceed the threshold value Vth, either. However, at 13 ms, the current waveform enters the current waveform c4 shown in FIG. 17(a) and the current value changes to the negative side. Then, an induced voltage V13 generated due to the detection pulse F13 is a detection signal exceeding the threshold value Vth. Based on this detection signal, the second detection mode determination circuit 413 determines success of rotation and no correction drive pulse FP is outputted.

Next, a case where the rotor fails to rotate will be described based on the waveform diagrams of FIGS. 16 and 18. FIG. 18(a) represents a current waveform induced in the coil 9 when the rotor 10 fails to rotate because driving force of the step motor 20 drops due to a decrease of the operating voltage of the driver circuit 8, etc. FIG. 18(b) represents a voltage waveform generated at one terminal O1 of the coil 9 at this time, and FIG. 18(c) represents a voltage waveform generated at the other terminal O2 of the coil 9.

The current waveform generated at the coil when the rotor fails to rotate is the current waveform shown in FIG. 18(a). Specifically, until the end of the current waveform c1, a shown current waveform is almost the same waveform as that in the case where the rotor successfully rotates as previously mentioned. After that, however, the current waveform is turned into those shown by the current waveforms c2, c5, c6. Compared with the case where the rotor successfully rotates, the current waveform generated in the coil 9 when the rotor fails to rotate is a long and smooth waveform, as shown by the current waveform c5. Even when the rotor fails to rotate, the method of detecting rotation is the same. First, at 6 ms, the first detection mode starts and the detection pulse B6 is applied to the coil 9. As shown in FIG. 18(a), at 6 ms, the current waveform is in the region of the current waveform c2 and the current value is on the negative side. Thus, as shown in FIG. 18(c), an induced voltage V6 does not exceed the threshold value Vth. However, at 7 ms, the current waveform enters the region of the current waveform c5 and the current value changes to the positive side. Thus, as shown in FIG. 18(c), an induced voltage V7 is a detection signal exceeding the threshold value Vth. Similarly, at 8 ms, the current waveform is in the region of the current waveform c5 and an induced voltage V8 is a detection signal exceeding the threshold value Vth. Since the two detection signals of the induced voltages V7, V8 have exceeded the threshold value Vth, the first detection mode switches to the second detection mode.

Since the switching to the second detection mode according to the induced voltage V8, a detection pulse of the next timing, i.e., a detection pulse F9 at 9 ms shown in FIG. 16(c)

is applied to the coil 9. As shown in FIG. 18(*a*), at 9 ms, the current waveform is in the region of the current waveform c5 and the current value is on the positive side. Thus, as shown in FIG. 18(*b*), an induced voltage V9 does not exceed the threshold value Vth. In addition, as the current waveform is still in the region of the current waveform c5, induced voltages V10 to V13 generated due to the respective detection pulses F10 to F13 do not exceed the threshold value Vth, either. Furthermore, as the current waveform is also in the region of the current waveform c5, an induced voltage V14 generated due to a detection pulse F14 for the sixth-time detections in the second detection mode does not exceed the threshold value Vth. Thus, no detection signal exceeding the threshold value is detected in a period for the six-time detections of the induced voltages V9 to V14. Hence, the second detection mode determination circuit 413 determines failure of rotation, and aborts the determination. Consequently, the pulse selecting circuit 7 selects the correction drive pulse FP, drives the step motor 20, and rotates the rotor 10 reliably. As described above, the detection of rotation or non-rotation is performed and the correction drive pulse FP can be outputted appropriately if the rotor fails to rotate.

Patent Document 1: JP-A 7-120567
Patent Document 2: JP-B 8-33457

However, in the conventional technique, detection may not be performed well in some cases where current waveforms are disturbed because a pointer having a large moment of inertia is used for a second hand or the like. The above problem will be described based on FIGS. 16 and 19. FIG. 19 is a diagram of a current waveform and a voltage waveform at a time when the rotor 10 rotates in the case where the conventional electronic clock has a hand with a large moment of inertia. FIG. 19(*a*) shows current waveforms induced in the coil 9 in the case where the hand with the large moment of inertia is attached. FIG. 19(*b*) shows voltage waveforms generated in the one terminal O1 of the coil 9 at this time, and FIG. 19(*c*) shows voltage waveforms generated in the other terminal O2 of the coil 9.

When a hand with a large moment of inertia is attached to the normal drive circuit, current waveforms are those shown in FIG. 19(*a*). Specifically, following a current waveform c1, waveforms are shaped as shown by induced current waveforms c2, c31, cx, and c41. Compared with the current waveform shown in FIG. 17(*a*), the stepped current waveform cx is generated between the current waveforms c31 and c41. The current waveform cx is generated because the free vibration of the rotor 10 is restricted by the moment of inertia of the second hand. For this reason, the current waveform 41 to be detected in principle shifts later. Hereinbelow, the detection operation in this case will be described. First, at 6 ms, the first detection mode starts, and the detection pulse B6 is applied to the coil 9. As shown in FIG. 19(*a*), at 6 ms, the current waveform is in the region of the current waveform c2 and the current value is on the negative side. Thus, as shown in FIG. 19(*c*), an induced voltage V6 does not exceed the threshold value Vth. However, at 7 ms, the current waveform enters the current waveform c31 and a current value changes to the positive side. Thus, as shown in FIG. 19(*c*), an induced voltage V7 is a detection signal exceeding the threshold value Vth. Similarly, at 8 ms, the current waveform is also in the region of the current waveform c31 and the induced voltage V8 is a detection signal exceeding the threshold value Vth. Since the two detection signals of the induced voltages V7, V8 have exceeded the threshold value Vth, the first detection mode switches to the second detection mode.

Since the switching to the second detection mode according to the induced voltage V8, a detection pulse of the next timing, i.e., a detection pulse F9 at 9 ms is applied to the coil 9. As shown in FIG. 19(*a*), at 9 ms, the current waveform is in the region of the current waveform c31 and the current value is on the positive side. Thus, as shown in FIG. 19(*b*), an induced voltage V9 does not exceed the threshold value Vth. Similarly, as the current waveform is in the region of the current waveform c31, induced voltages V10 to V12 do not exceed the threshold value Vth. At 13 ms, although the current waveform enters the current waveform cx, the current value is still on the positive side. Thus, induced voltages V13 and V14 generated due to the detection pulses F13 and F14 cannot exceed the threshold value Vth. Thus, no detection signal exceeding the threshold value is detected in a period for the six-time detections of the induced voltages V9 to V14. Hence, the second detection mode determination circuit 413 determines failure of rotation, and the pulse selecting circuit 7 selects and outputs the correction drive pulse FP. In other words, a phenomenon occurs that although the rotation has been successfully achieved, the correction drive pulse FP is outputted by the erroneous determination, thus increasing current consumption unnecessarily. The correction drive pulse FP is a pulse needing a large current consumption to drive the step motor 20 reliably. Therefore, frequent outputs of the correction drive pulse FP due to the erroneous detection leads to a problem that the battery life decreases significantly.

In order to solve the above problem, a conceivable countermeasure is to extend a determination period by simply changing the number of detection trials before the aborting of the detection in the second detection mode from six times to seven times and thus to make a determination. However, the countermeasure cannot be employed because another problem occurs as described below. The problem will be described based on FIGS. 16 and 20. FIG. 20 is a waveform diagram in the case where the driving force of the step motor 20 is weaker than that in FIG. 18, whereby the rotor 10 fails to rotate. FIG. 20(*a*) represents current waveforms induced in the coil 9 when the rotor 10 fails to rotate. FIG. 20(*b*) represents voltage waveforms generated in one terminal O1 of the coil 9 at this time, and FIG. 20(*c*) represents voltage waveforms generated in the other terminal O2.

FIG. 20(*a*) shows a current waveform generated in the coil when the rotor fails to rotate as the driving force is further weaker. Specifically, following the current waveform c1, the current waveform is tuned into those shown by the current waveforms c51, c61. In this waveform, compared with the current waveforms of FIG. 18(*a*), the current waveform c2 does not appear; the current waveform c51 appears following the current waveform c1; the current waveform c51 terminates early in time; and the current waveform 61 appears. In a case of such waveforms, if the detection is performed with the number of detection trials before the aborting of the detection in the second detection mode simply changed from six times to seven times, the following result is obtained. First, at 6 ms, the first detection mode starts and the detection pulse v6 is applied to the coil 9. As shown in FIG. 20(*a*), at 6 ms, the current waveform is in the region of the current waveform 51 and the current value is on the positive side. The induced voltage V6 is a detection signal exceeding the threshold voltage V6, as shown in FIG. 20(*c*). Further, at 7 ms, the current waveform is also in the region of the current waveform c51, and the induced voltage V7 is a detection signal exceeding the threshold value Vth. Since the induced voltages V6, V7 of the two detection signals have exceeded the threshold voltage, the first detection mode switches to the second detection mode.

Since the switching to the second detection mode according to the induced voltage V7, a detection pulse of the next timing, i.e., a detection pulse F8 at 8 ms is applied to the coil 9. As shown in FIG. 20(a), at 8 ms, the current waveform is in the region of the current waveform c51 and the current value is on the positive side. Thus, as shown in FIG. 20(b), an induced voltage V8 does not exceed the threshold value Vth. Further, as the current waveform is still in the current waveform of c51, the induced voltages V9 to V13 do not exceed the threshold value Vth. However, at 14 ms, which is a time for the seventh time detections in the second detection mode, the waveform enters the region of the current waveform c61 and the current value changes to the negative side. Thus, as shown in FIG. 20(b), the induced voltage V14 is a detection signal exceeding the threshold value Vth. Then, the second detection mode determination circuit 413 erroneously determines that rotation has been successfully achieved, although the rotation has been actually failed. As the pulse selecting circuit 7 does not select and output the correction drive pulse FP, the rotor does not rotate. As described above, if a period of the second detection mode is simply extended, a problem crucial for an electronic clock may occur that a step motor stops to cause a time delay.

SUMMARY OF THE INVENTION

An object of the present invention is to provide an electronic clock that is capable of eliminating the above-mentioned disadvantages and coping with a second hand having a larger moment of inertia than usual, and that has rotation detecting means applicable even to a case where a driving force of a step motor drops.

In order to achieve the above object, the present invention has following configurations. That is, the present invention is an electronic clock including a step motor having a coil and a rotor, drive pulse generating means configured to generate drive pulses to drive the step motor, step motor drive means configured to drive the step motor based on the drive pulses, rotor rotation detecting means configured to detect a rotation status of the rotor based on an induced voltage generated in the coil, first detection/determination means configured to determine rotation or non-rotation of the rotor based on a detection signal outputted by the rotor rotation detecting means, and second detection/determination means configured to determine one of rotation and non-rotation of the rotor based on a detection signal outputted by the rotor rotation detecting means after determination of the first detection/determination means. The second detection/determination means changes a determination condition of the determination based on determination time required for the determination of the first detection/determination means.

In addition, the invention further includes first detection pulse generating means configured to generate a first pulse signal having a predetermined cycle within a first predetermined period after the drive pulse is generated and second detection pulse generating means configured to generate a second pulse signal of a predetermined cycle in a second predetermined period after the generation of the first pulse signal. The rotor rotation detecting means detects a rotation status of the rotor in the first predetermined period based on an induced voltage converted through the first pulse signal from an induced current generated due to the drive pulse in the coil after the rotor is driven, and also detects a rotation status of the rotor in the second predetermined period based on an induced voltage converted through the second pulse signal from the induced current.

In addition, the invention is characterized in that: the determination conditions is a determination period during which the second detection/determination means determines rotation or non-rotation of the rotor; and the determination period is shortened, if the determination time of the first detection determining means is short.

In addition, the invention is characterized in that the second detection pulse generating means shortens the determination period of the second detection/determination means by reducing the number of the second pulse signals.

In addition, the invention is characterized in that the second detection pulse generating means shortens the determination period of the second detection/determination means by shortening the predetermined cycle of the second pulse signal.

In addition, the invention is characterized in that the second detection pulse generating means shortens the determination period by shortening the predetermined cycle of the second pulse signal in a part of the second determined period.

In addition, the invention is characterized in that the second detection pulse generating means shortens the determination period by at least one of the methods for reducing the number of the second pulse signals, for shortening the predetermined cycle of the second pulse signal, and for shortening the predetermined cycle for the second pulse signal in a part of the second predetermined period.

In addition, the invention is characterized in that: the determination condition is a determination period during which the second detection/determination means determines one of rotation and non-rotation of the rotor; and the second detection/determination means stops the second pulse signals from being generated at least in a part of the second predetermined period, if the determination time of the first detection/determination means is short.

In addition, the invention is characterized in that the second detection/determination means stops the second pulse signal from being generated at least in a part of the second predetermined period so that the determination period is extended.

In addition, the invention further includes correction drive pulse generating means configured to generate a correction drive pulse to perform correction drive of the step motor, characterized in that the correction drive pulse is generated when one of the first detection/determination means and the second detection/determination means determines the non-rotation of the rotor.

As described above, the present invention has the effect in that more accurate determination of rotation or non-rotation can be made than before, even when a second hand having a large moment of inertia is used, by changing a determination period of the second detection mode in accordance with a determination time of the first detection mode.

The ability to use a second hand having a larger moment of inertia is not only effective in a finished clock, but also increases flexibility in second hands available to customers in sales of clock movements, which is thus a very advantageous technique in design.

BRIEF DESCRIPTION OF THE DRAWINGS

FIG. 3 is a diagram of current waveforms and voltage waveforms generated in a coil when a pointer having a large moment of inertia is attached to the electronic clock of the present invention (first embodiment).

FIG. 4 is a diagram of current waveforms and voltage waveforms generated in the coil when a rotor of the electronic clock of the present invention fails to rotate (first embodiment).

FIG. 14 is a diagram of current waveforms and voltage waveforms generated in a coil when a rotor of the electronic clock of the present invention fails to rotate (third embodiment).

FIG. 17 is a diagram of current waveforms and voltage waveforms generated in the coil when the rotor of the conventional electronic clock has successfully rotated.

FIG. 18 is a diagram of current waveforms and voltage waveforms generated in the coil when the rotor of the conventional electronic clock fails to rotate.

FIG. 19 is a diagram of current waveforms and voltage waveforms generated in the coil when a pointer having a large moment of inertia is attached to the conventional electronic clock.

FIG. 20 is a diagram of current waveforms and voltage waveforms generated in the coil when the rotor 10 fails to rotate because driving force of the conventional electronic clock further weakens.

FIG. 23 represents current waveforms and voltage waveforms generated in the coil when the rotor of the electronic clock of the present invention fails to rotate (fourth embodiment).

FIG. 26 is a diagram of current waveforms and voltage waveforms generated in the coil when a pointer having a large moment of inertia is attached to the electronic clock of the present invention (fifth embodiment).

Figure 1:
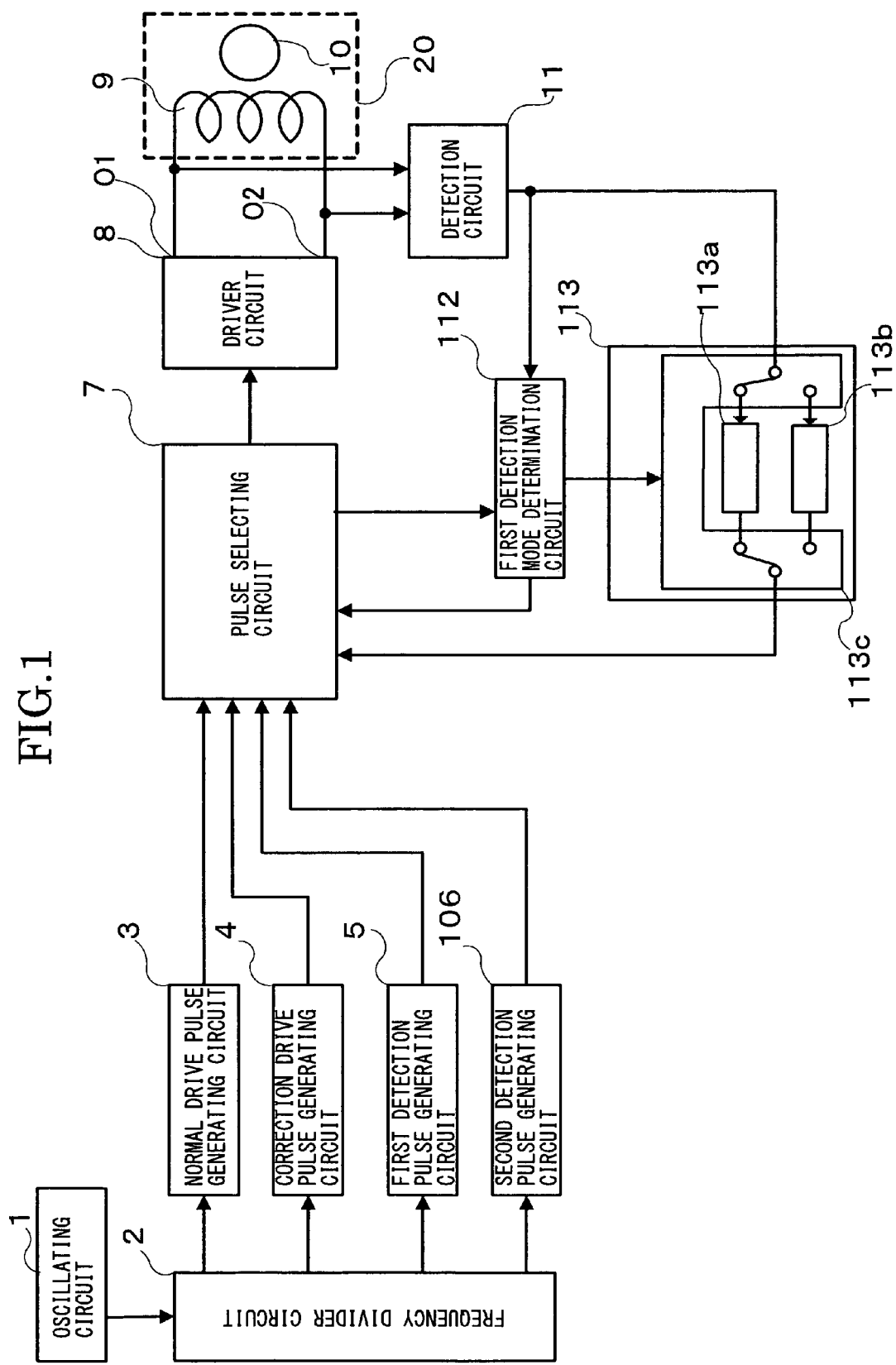
FIG. 1 is a block diagram showing a circuit configuration of an electronic clock of the present invention (first embodiment).

EXPLANATION OF REFERENCE NUMERALS 1 oscillating circuit
2 frequency divider circuit
3 normal drive pulse generating circuit
4 correction drive pulse generating circuit
5 first detection pulse generating circuit
106, 306, 406, 506, 606 second detection pulse generating circuit
206a second long cycle detection pulse generating circuit
206b second short cycle detection pulse generating circuit
7 pulse selecting circuit
20 step motor
9 coil
10 rotor
11 detection circuit
112, 212, 312, 412 first detection mode determination circuit
113, 213, 313, 413 second detection mode determination circuit
SP normal drive pulse
B6 to B12 detection pulse
F8 to F19 detection pulse
f8, f8.8, f9.6, f10.4, f11.2, f12, f12.8 detection pulse
c1, c2, c31, cx, c41, c51, c61, c71, c81 current waveform
V6 to V15 induced voltage

DETAILED DESCRIPTION OF THE INVENTION

Figure 7:
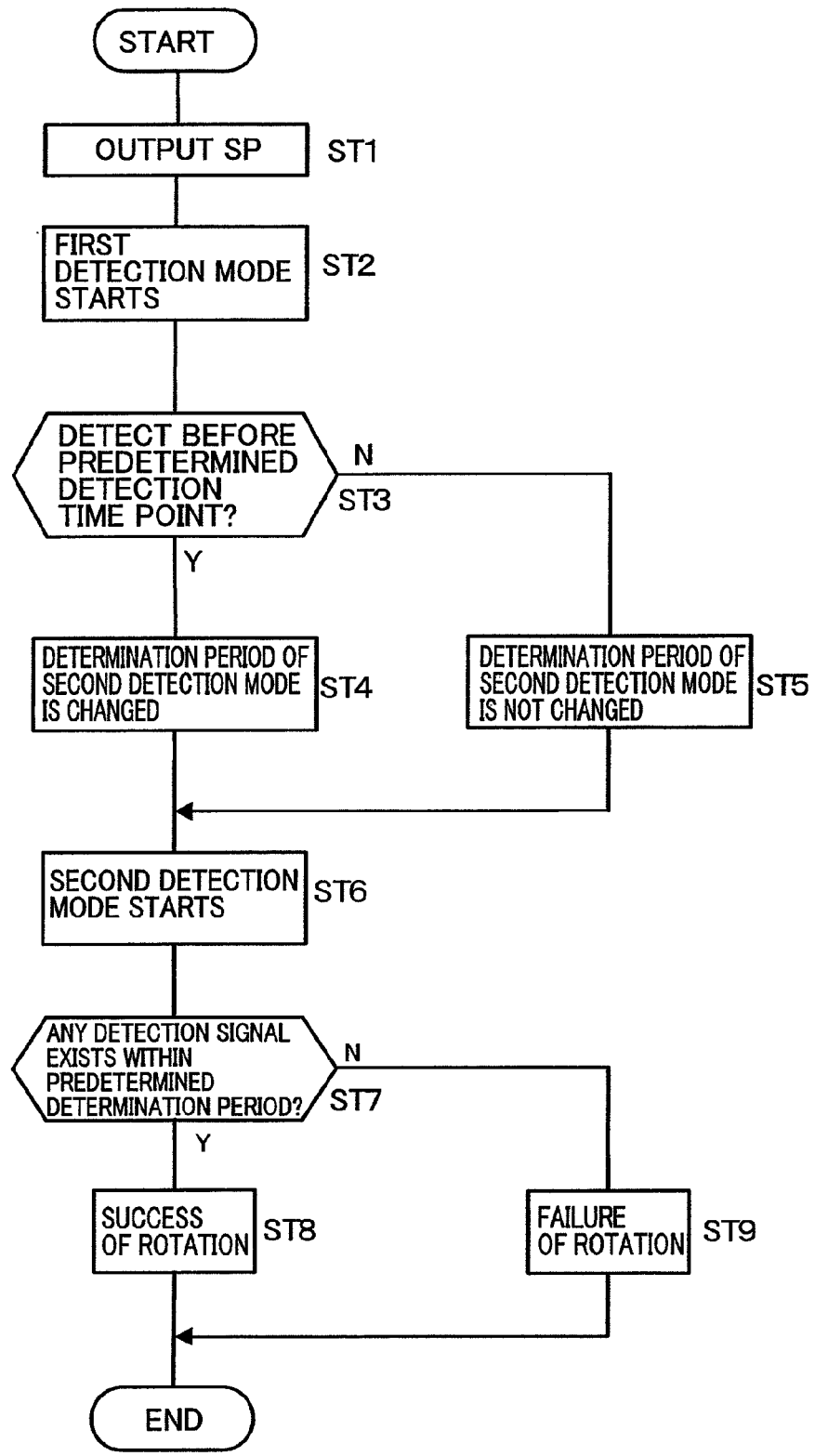
FIG. 7 is a flow chart showing a concept of the method for detecting rotation of the rotor in the electronic clock of the present invention.

First, an overview of the present invention will be given using a flow chart. FIG. 7 is a flow chart showing a concept of a method for detecting rotation of a rotor in an electronic clock of the present invention. FIG. 7 shows operation performed at the beginning of every second to generate normal drive pulses, detect/determine rotation of the rotor, and control generation of correction drive pulses. Normal drive pulses SP are outputted at the beginning of every second (step ST1), and a first detection mode starts following a certain period after the normal drive pulses SP terminate, i.e., 6 ms after the beginning of the second (step ST2). In the first detection mode, it is determined whether or not a detection signal could be detected before a predetermined time point (step ST3). If the detection signal has been detected before the predetermined time point (step S3:Y), control is performed in the second detection mode to change a determination period for determining presence or absence of a detection signal (step ST4). If the detection signal has been detected after the predetermined time point (step S3: N), the second detection mode starts (step ST6) without changing the determination period of the second detection mode (step ST5). Then, in the second detection mode, it is determined whether or not the detection signal is detected in a predetermined determination period (step ST7). If the detection signal is detected within the predetermined determination period (step ST7: Y), the rotation is determined as successful (step ST8). If the detection signal is not detected within the predetermined determination period (step 7:N), the rotation is determined as failure (step ST9). This completes the operation of the second detailed mode, and the operation starts again from the beginning of the next beginning of every second.

First Embodiment

Figure 2:
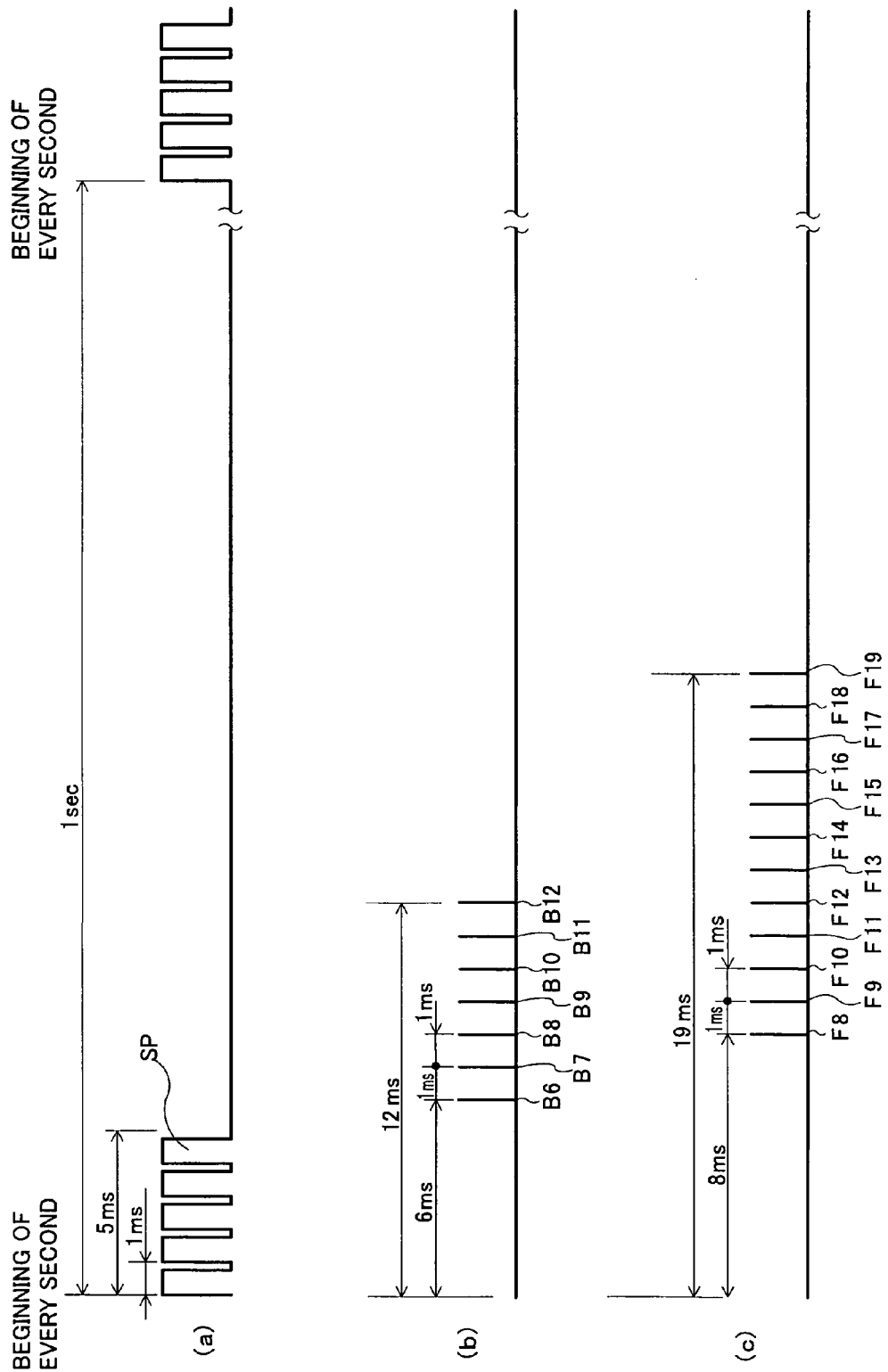
FIG. 2 is a waveform diagram of pulses generated by a circuit of the electronic clock of the present invention (first embodiment).

Hereinafter, a first embodiment of the present invention will be described in detail based on the drawings. The first embodiment is an example of changing the maximum number of detection trials for a detection signal in the second detection mode, based on a determination time for determining the presence or absence of a detection signal in the first detection mode, thereby changing a determination period of the detection signal. FIG. 1 is a block diagram showing a circuit configuration of the electronic clock of the first embodiment. FIG. 2 is a waveform diagram of pulses generated by the circuit of an electronic clock of the first embodiment. FIG. 3 is a diagram of current waveforms and voltage waveforms generated in a coil when a pointer having a large moment of inertia is attached to the electronic clock of the first embodiment. FIG. 4 shows one example of diagrams of current waveforms and voltage waveforms when a rotor of the electronic clock of the first embodiment fails to rotate because the driving force of the step motor decreases due to a drop of an operating voltage of a driver circuit 8. Components that are the same as those described in the conventional example are designated by the same reference numerals and will not be specifically described herein.

In FIG. 1, reference numeral 20 is the step motor formed of the coil 9 and the rotor 10, reference numeral 1 is an oscillating circuit, reference numeral 2 is a frequency divider circuit, reference numeral 3 is a normal drive pulse generating circuit, reference numeral 4 is a correction drive pulse generating circuit, and reference numeral 5 is a first detection pulse generating circuit that outputs detection pulses B6 to B12 for performing a first detection mode based on a signal of the frequency divider circuit 2. The detection pulses B6 to B12 are 0.125 ms-wide pulses as shown in FIG. 2(b), and outputted every 1 ms, in a period of 6 ms to 12 ms after the beginning of every second, respectively. Reference numeral 106 is a second detection pulse generating circuit that outputs detection pulses F8 to F19 for performing a second detection mode based on a signal from the frequency divider circuit 2. The detection pulses F8 to F19 are 0.125-wide pulses as shown in FIG. 2(c), and outputted every 1 ms, in a period of 8 ms to 19 ms after the beginning of the second, respectively.

Reference numeral 7 is a pulse selecting circuit, reference numeral 8 is a driver circuit, reference numeral 9 is the coil, reference numeral 10 is the rotor, reference numeral 11 is a detection circuit, reference numeral 112 is a first detection mode determination circuit to determine the first detection mode based on the detection signal from the detection circuit 11, and reference numeral 113 is a second detection mode determination circuit to determine the second detection mode based on the detection signal of the detection circuit 11. The second detection mode determination circuit 113 further has two systems of a seven-time detection/determination circuit 113a and a six-time detection/determination circuit 113b internally. A determination selecting circuit 113c selects which determination of the seven-time detection/determination circuit 113a or the six-time detection/determination circuit 113b is to be adopted, based on a determination time of the first detection mode determination circuit 112.

Next, the operation of the above configuration will be described. The pulse selecting circuit 7 selects a normal drive pulse SP outputted from the normal drive pulse generating circuit 3 at the beginning of every second and drives the step motor 20. Then, 6 ms after the beginning of the second, the first detection mode starts. In the first detection mode, the pulse selecting circuit 7 outputs detection pulses B6 to B12 outputted from the first detection pulse generating circuit 5, and controls the step motor 20 so that an impedance of the coil 9 may vary. Then, the detection circuit 11 detects induced voltages generated in the coil due to the detection pulses B6 to B12. Meanwhile, the pulse selecting circuit 7 instructs the first detection mode determination circuit 112 to start the determination operation. The first detection mode determination circuit 112 determines the presence or absence of a detection signal in the first detection mode, when a detection signal is inputted by the detection circuit 11. Based on receipt of the detection signal of the detection circuit 11, when the detection signal is generated twice, the first detection mode determination circuit 112 determines the detection, immediately stops the detection pulses outputted by the first detection pulse generating circuit 5, and shifts the first detection mode to the second detection mode by not only instructing the pulse selecting circuit 7 to stop the operation of the first detection mode, but also instructing the second detection mode determination circuit 113 to start the operation.

A determination circuit for the second detection mode varies depending on determination time of the first detection mode. When a second detection signal is generated due to the detection pulse B7, the determination selecting circuit 113c selects the six-time detection/determination circuit 113b. On the other hand, when the second detection signal is generated due to a detection pulse after the detection pulse B8, the determination selecting circuit 113c selects the seven-time detection/determination circuit 113a. The determination selecting circuit 113c functions as changing means to change the determination period of the second detection mode in accordance with the determination time of the first detection mode. Further, the determination selecting circuit 113c shortens the determination period of the second detection mode, for example, by reducing the number of the detection pulse outputs in the second detection mode when the determination time of the first detection mode is earlier than a predetermined timing.

First, described is a case where the second detection signal is generated due to the detection pulse B7, and the first detection mode is shifted to the second detection mode. When shifting to the second detection mode, the pulse selecting mode 7 selects and outputs detection pulses F8 to F19 generated by the second detection pulse generating circuit 106, and controls the step motor 20. Then, the detection circuit 11 detects an induced voltage generated in the coil 9 due to the detection pulses F8 to F19. Since the second detection signal has been generated due to the detection pulse B7, the six-time detection/determination circuit 113b of the second detection mode determination circuits 113 receives a detection signal of the detection circuit 11 and makes a determination. Based on receipt of the detection signal of the detection circuit 11, when the detection signal is generated even once, the six-time detection/determination circuit 113b determines success of rotation, immediately stops detection pulses outputted from the second detection pulse generating circuit 106, and controls the pulse selecting circuit 7 so that not only the operation of the second detection mode may terminate, but also no correction drive pulse FB may be outputted. However, the detection signals generated due to the detection pulses F8 to F19 terminate after at most six times of detection trials, i.e., after a detection trial of the detection pulse F13. If no detection signal is generated during those detection pulses, the six-time detection/determination circuit 113b determines failure of rotation, and controls the pulse selecting circuit 7 so that a correction drive pulse FP may be outputted.

Next, described is a case where two detection signals are not generated due to the pulse B7, i.e., when the second detection signal is generated by a pulse after the detection pulse B8 and then the first detection mode is shifted to the second detection mode. Since the second detection signal has been generated due to a detection pulse after the detection pulse B7, the seven-time detection/determination circuit 113a of the second detection mode detection circuits 113 receives a detection signal of the detection circuit 11 and makes a determination. Based on receipt of the detection signal of the detection circuit 11, when the detection signal is generated once, the seven-time detection/determination circuit 113a determines success of rotation, immediately stops detection pulses outputted from the second detection pulse generating circuit 106, and further controls the pulse selecting circuit 7 so that no correction drive pulse FP may be outputted. However, detection signals outputted by the detection pulses F8 to F19 terminate after at most seven times of detection trials. If no detection signal is received during the detection trials, the seven-time detection/determination circuit 113a determines failure of rotation, and controls the pulse selecting circuit 7 so that the correction drive pulse FP may be outputted. For example, if detection of the second detection mode starts from the detection pulse F10, the second detection mode is aborted after the detection trial of the detection pulse 16, which is the seventh detection trial as counted from the detection pulse F10. If no detection signal is generated during the detection trials, the seven-time detection/determination circuit 113a determines failure of rotation.

As described above, the second detection mode determination circuit 113 has two systems of the seven-time detection/determination circuit 113a that performs detection trials seven times and the six-time detection/determination circuit 113b that performs detection trials six times, in the second detection mode. Thus, if the determination time of the first detection mode terminates earlier, at 7 ms, the second detection mode determination circuit 113 terminates the second detection mode after a shorter determination period by aborting the detection at the sixth detection trial. In contrast, when the determination time of the first detection mode terminates later in a period after 8 ms, the second detection mode determination circuit 113 changes the determination period. Thus, the second detection mode may terminate after a longer determination period by aborting the detection at the seventh detection trial.

A method for detecting actual rotation in the operation described above will be described with reference to the waveform diagrams of FIG. 2 and FIG. 3. First, described is a case where a pointer having a large moment of inertia is attached. FIG. 3(a) shows current waveforms induced in the coil 9 when the pointer having the large moment of inertia is attached. FIG. 3(b) shows voltage waveforms then generated at one terminal O1 of the coil 9, and FIG. 3(c) shows voltage waveforms generated at the other terminal O2 of the coil 9.

FIG. 3(a) shows waveforms almost the same as those in FIG. 19(a). First, the normal drive pulses SP as shown in FIG. 2(a) are applied to the one end O1 of the coil 9, the rotor 10 rotates, and the current waveform c1 as shown in FIG. 3(a) is generated. When the normal drive pulses SP terminate, the rotor enters free vibration state, and the current waveforms become those shown by c2, c31, cx and c41. At 6 ms, the first detection mode starts, and the detection pulse B6 as shown in FIG. 2(b) is applied to the coil 9. As shown in FIG. 3(a), at 6 ms, the current waveform is in the region of the current waveform c2, and a current value is on the negative side.

Thus, as shown in FIG. 3(c), the induced voltage V6 generated due to the detection pulse B6 does not exceed a threshold value Vth. However, at 7 ms, the current waveform enters the region of the current waveform c31 and the current value changes to the positive side. Thus, as shown in FIG. 3(c), an induced voltage V7 generated by the detection pulse B7 is the detection signal exceeding the threshold value Vth. Similarly, at 8 ms, the current waveform is still in the region of the current waveform c31, and an induced voltage V8 generated due to the detection pulse B8 is a detection signal exceeding the threshold value Vth. Since the two detection signals of the induced voltages V7, V8 have exceeded the threshold voltage Vth, the first detection mode switches to the second detection mode.

Since the switching to the second detection mode by the induced voltage V8 generated due to the detection pulse B8 that occurs after 8 ms, the seven-time detection/determination circuit 113a determines the second detection mode. A detection pulse of next timing after 8 ms, i.e., the detection pulse F9 as shown in FIG. 2(c), is applied to the coil 9. As shown in FIG. 3(a), at 9 ms, the current waveform is in the region of the current waveform c31, and the current value is on the positive side. Thus, as shown in FIG. 3(b), an induced voltage V9 generated due to the detection pulse F9 does not exceed the threshold value Vth. Further, as the current waveform is still in the region of the current waveform c31, induced voltages V10, V11, and V12 generated due to the respective detection pulses F10, F11, F12 do not exceed the threshold value Vth. At 13 ms, the current waveform enters the region of the current waveform cx. However, the current value remains on the positive side, and induced voltages F13, F14 generated due to the respective detection pulses F13, F14 do not exceed the threshold voltage Vth, either. However, at 15 ms, which is the seventh detection trial in the second detection mode, as shown in FIG. 3(a), the current waveform is in the region of the current waveform c41, and the current value changes to the negative side. Thus, as shown in FIG. 3(b), an induced voltage V15 generated due to the detection pulse F15 is a detection signal exceeding the threshold value Vth. Then, the second detection mode determination circuit 113 correctly detects rotation to determine the success of rotation, and controls the pulse selecting circuit 7 so that no correction drive pulse FP may be outputted.

Next, a case where the rotor fails to rotate will be described with reference to FIGS. 2 and 4. FIG. 4(a) shows current waveforms induced in the coil 9 when the rotor 10 fails to rotate. FIG. 4(b) shows voltage waveforms then generated at one terminal O1 of the coil 9, and FIG. 4(c) shows voltage waveforms generated at the other terminal O2 of the coil 9.

Similar to FIG. 20(a) of the conventional example, FIG. 4(a) shows current waveforms generated in the coil when the rotor fails to rotate due to weak driving force. First, at 6 ms, the first detection mode starts and the detection pulse B6 is applied to the coil 9. As shown in FIG. 4(a), at 6 ms, the current waveform is in the region of the current waveform c51, and a current value is on the positive side. Thus, as shown in FIG. 4(c), the induced voltage V6 is a detection signal exceeding the threshold value Vth. Further, at 7 ms, the current waveform is also in the region of the current waveform c51, the induced voltage V7 is a detection signal exceeding the threshold value Vth. Since the induced voltages V6, V7 and the two detection signals have exceeded the threshold value Vth, the first detection mode is shifted to the second detection mode.

Since the first detection mode switches to the second detection mode by the induced voltage V7 generated by the detection pulse B7 that occurs at 7 ms, the six-time detection/ determination circuit 113b determines the second detection mode. Since the switching to the second detection mode by the induced voltage V7, a detection pulse of next timing after 7 ms, i.e., the detection pulse F8 at 8 ms among the detection pulses shown in FIG. 2(c), is applied to the coil 9. As shown in FIG. 4(a), at 8 ms, the current waveform is in the region of the current waveform c51, and the current value is on the positive side. Thus, as shown in FIG. 4(b), the induced voltage V8 does not exceed the threshold voltage Vth. Further, as the current waveform is still in the region of the current waveform c51, the induced voltages V9 to V12 do not exceed the threshold voltage Vth. Furthermore, even at 13 ms, which is the sixth detection trial in the second detection mode, as shown in FIG. 4(a), the current waveform is in the region of the current waveform c51 and the current value is on the positive side. Thus, as shown in FIG. 4(b), the induced voltage V13 does not exceed the threshold value Vth. The second detection mode is aborted at this sixth detection trial. Thus, as detection at the current waveform c61 is not performed, the second detection mode determination circuit 113 correctly determines failure of rotation, and controls the pulse selecting circuit 7 so that a correction drive pulse FP may be outputted. Thus, the clock does not stop.

As described above, in the second detection mode according to the first embodiment, the second detection mode determination circuit 113 has two systems of the seven-time detection/determination circuit 113a that performs detections seven times and the six-time detection/determination circuit 113b that performs detection trials six times, thus being able to change determination periods in accordance with the determination time of the first detection mode.

Figure 6:
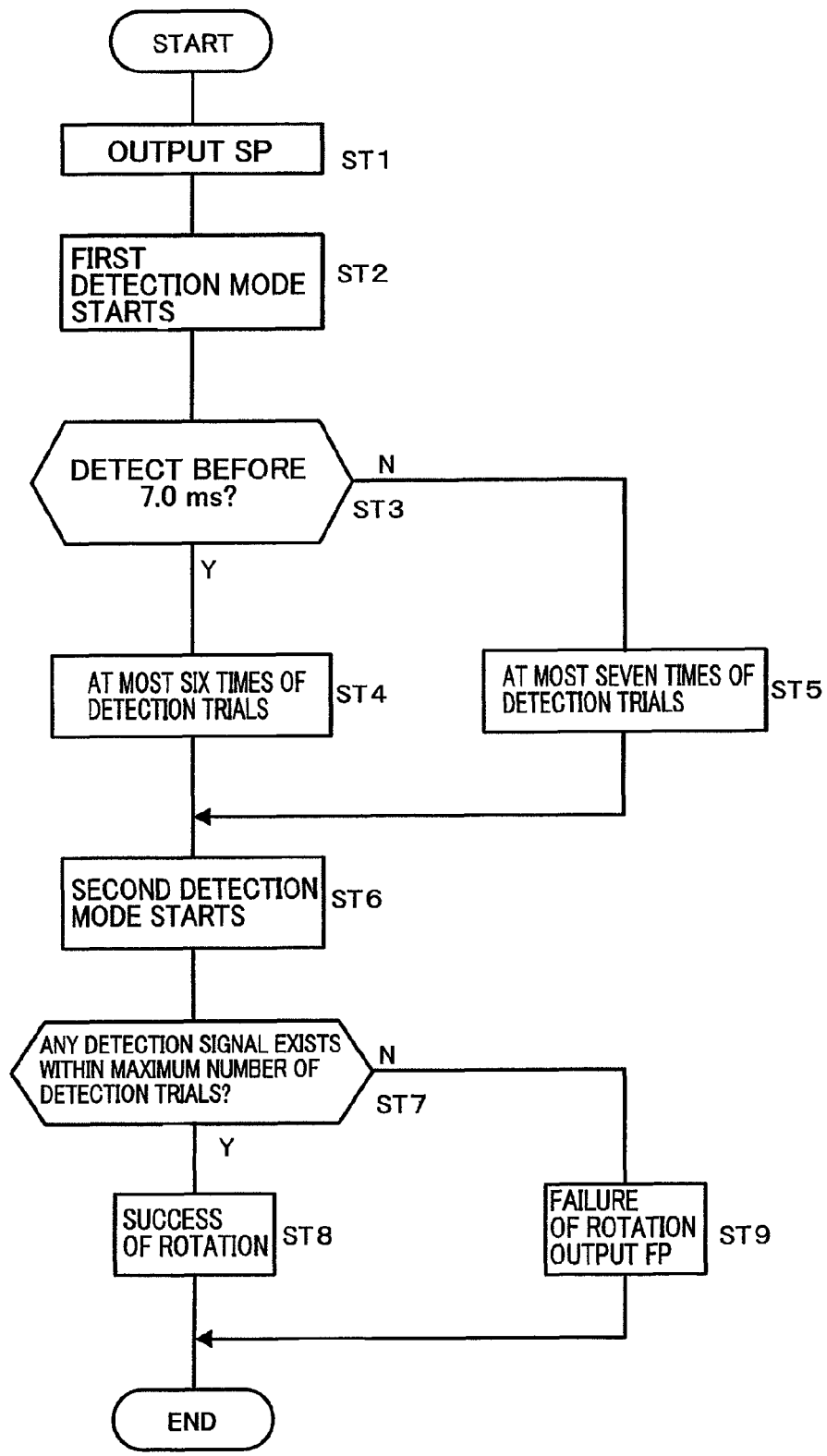
FIG. 6 is a flow chart showing a method for detecting rotation of the rotor in the electronic clock of the present invention (first embodiment).

The above operation will be described with reference to the flow charts. FIG. 6 is a flow chart showing a method for detecting rotation of the rotor in the electronic clock of the first embodiment, in which the operation for the beginning of every second is illustrated. To correspond with FIG. 7, the step numbers (ST*) in the flow chart are identical to those in the FIG. 7. A normal drive pulse SP is outputted at the timing of the beginning of every second (step ST1), and the first detection mode starts 6 ms after the beginning of the second (step ST2). In the first detection mode, it is determined whether or not the detection signal can be detected by a detection signal before 7 ms (step ST3). If a detection signal is detected before 7 ms (step ST3: Y), the maximum number of detection trials for the detection signal in the second detection mode is set to six times (step ST4) to shorten a determination period of the second detection mode. On the other hand, if the detection signal is detected after 7 ms (step ST3: N), the maximum number of detection trials for the detection signal in the second detection mode is set to (maintained at) seven times (step ST5) and the second detection mode starts (step ST6). Then, it is determined whether or not a detection signal is detected within the maximum number of detection trials for the detection signal in the second detection mode (step ST7). When the detection signal is detected within the maximum number of detection trials for the detection signal (step ST7: Y), the second detection mode determination circuit 113 determines success of rotation, and prevents a correction drive pulse from being outputted (step ST8). In contrast, when the detection signal is not detected within the maximum number of detection trials for the detection signal (step ST7: N), failure of rotation is determined, and the correction drive pulse FP is outputted (step ST9).

Figure 5:
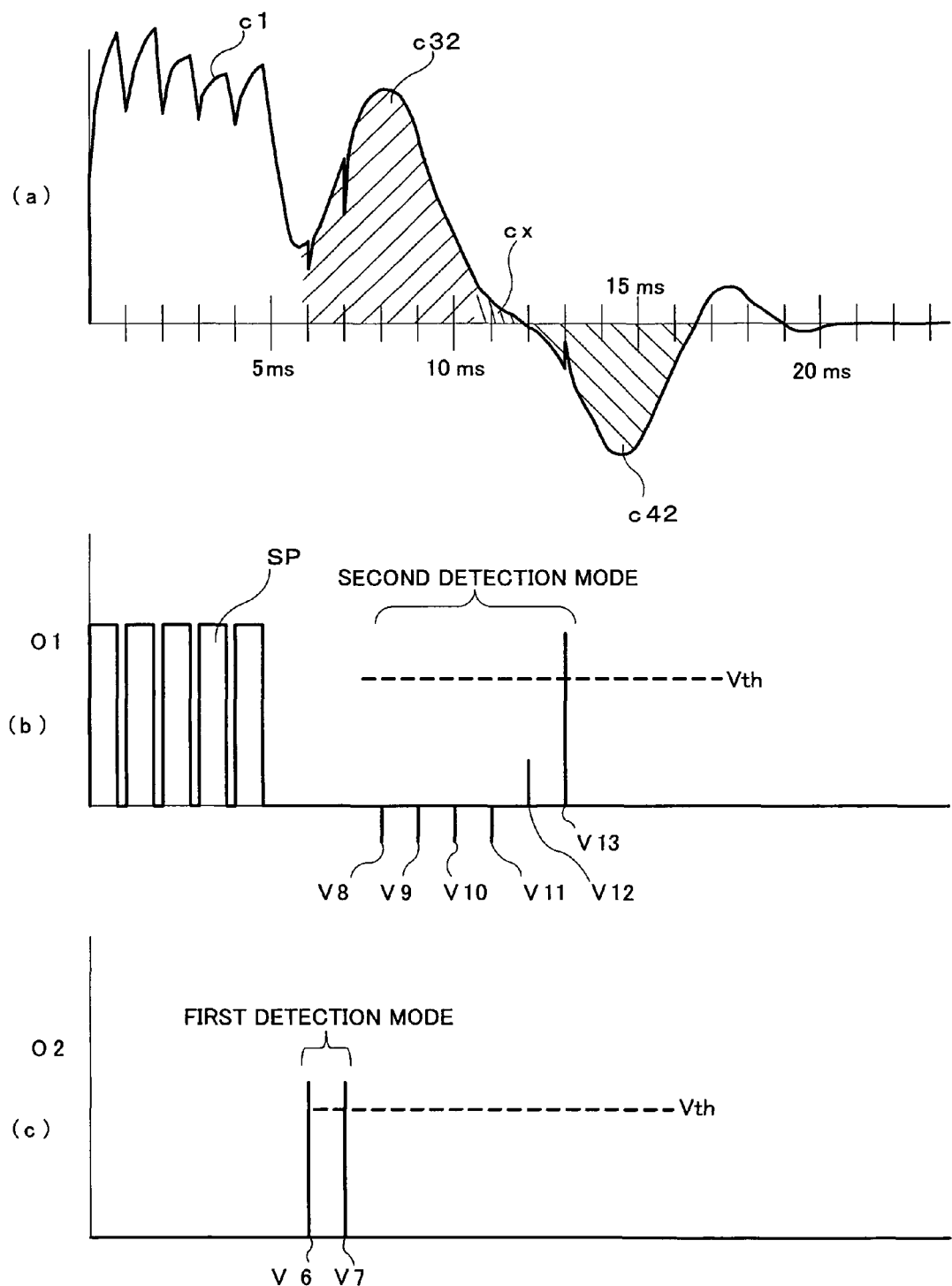
FIG. 5 is a diagram of current waveforms and voltage waveforms generated in the coil when a pointer having a large moment of inertia is attached to the rotor of the electronic clock of the present invention and when the rotor is driven strongly (first embodiment).

Next, a case where the step motor 20 is driven more strongly than that in a normal drive condition will be described with reference to the waveform diagrams. FIG. 5 is a diagram of current waveforms and voltage waveforms generated in the coil when the pointer having the large moment of inertia is attached and when the rotor is driven strongly. FIG. 5(a) shows current waveforms induced in the coil 9 when the pointer having the large moment of inertia is attached, and when the rotor 10 is strongly driven. FIG. 5(b) shows voltage waveforms then generated at the one terminal O1 of the coil 9, and FIG. 5(c) shows voltage waveforms generated at the other terminal O2 of the coil 9.

The current waveform generated in the coil when the rotor rotates with strong driving force is as shown in FIG. 5(a). In other words, following the current waveform c1, the waveform is shaped like the current waveforms c32, cx, c42. Compared with FIG. 3, the current waveform c2 does not appear, and the current waveform c32 appears following the current waveform c1. This is because as the rotor rotates fast and thus the current waveform c31 of FIG. 3(a) appears earlier, the current waveform c1 overlaps with the current waveform c31, thus eliminating the current waveform c2. In such a case, since the rotor has strong driving force, the current waveform c42 appears earlier than the current waveform c41 because the magnitude of the moment of inertia of the second hand does not affect the current waveform c42 so much as the current waveform 41 of FIG. 3(a). Thus, as shown in FIG. 5(a), even when the first detection mode terminates earlier and the second detection mode is thus aborted earlier, there is no possibility that rotation is erroneously determined as a failure, although the rotation has been actually successful.

The detection operation of the above configuration will be further described with reference to the drawings. As shown in FIG. 5(a), at 6 ms, the current waveform is in the region of the current waveform c32 and the current value is on the positive side. Thus, as shown in FIG. 5(c), the induced voltage V6 is a detection signal exceeding the threshold voltage Vth. Further at 7 ms, the current waveform is also in the region of the current waveform c32, and the induced voltage V7 is a detection signal exceeding the threshold voltage Vth. Since the induced voltages V6, V7 and the two detection signals have exceeded the threshold voltage Vth, the first detection mode is shifted to the second detection mode.

Since the first detection mode switches to the second detection mode by the induced voltage V7 generated due to the detection pulse B7 that occurs at 7 ms, the six-time detection/determination circuit 113b determines the second detection mode. Since the switching to the second detection mode by the induced voltage V7, the detection pulse F8 is applied to the coil 9. As shown in FIG. 5(a), at 8 ms, the current waveform is in the region of the current waveform c32 and the current value is on the positive side. Thus, as shown in FIG. 5(b), the induced voltage V8 does not exceed the threshold value Vth. Similarly, as the current waveform is still in the region of the current waveform c 32, the induced voltages V9 to V10 do not exceed the threshold value Vth. In addition, at 11 ms, although the current waveform enters the region of the current waveform cx, the current value is on the positive side. Thus, the induced voltages V11 and V12 do not exceed the threshold value Vth, either. However, at 13 ms, which is the sixth detection trial in the second detection mode, the current value changes to the negative side. Thus, as shown in FIG. 5(b), the induced voltage V13 is a detection signal exceeding the threshold value Vth. Then, the second detection mode determination circuit 113 correctly detects rotation to determine success of rotation, and controls the pulse selecting circuit 7 so that no correction drive pulse FP may be outputted. Thus, unnecessary output of the correction drive pulses SP and an increase in current consumption due to an erroneous determination can be prevented.

Second Embodiment

Figure 8:
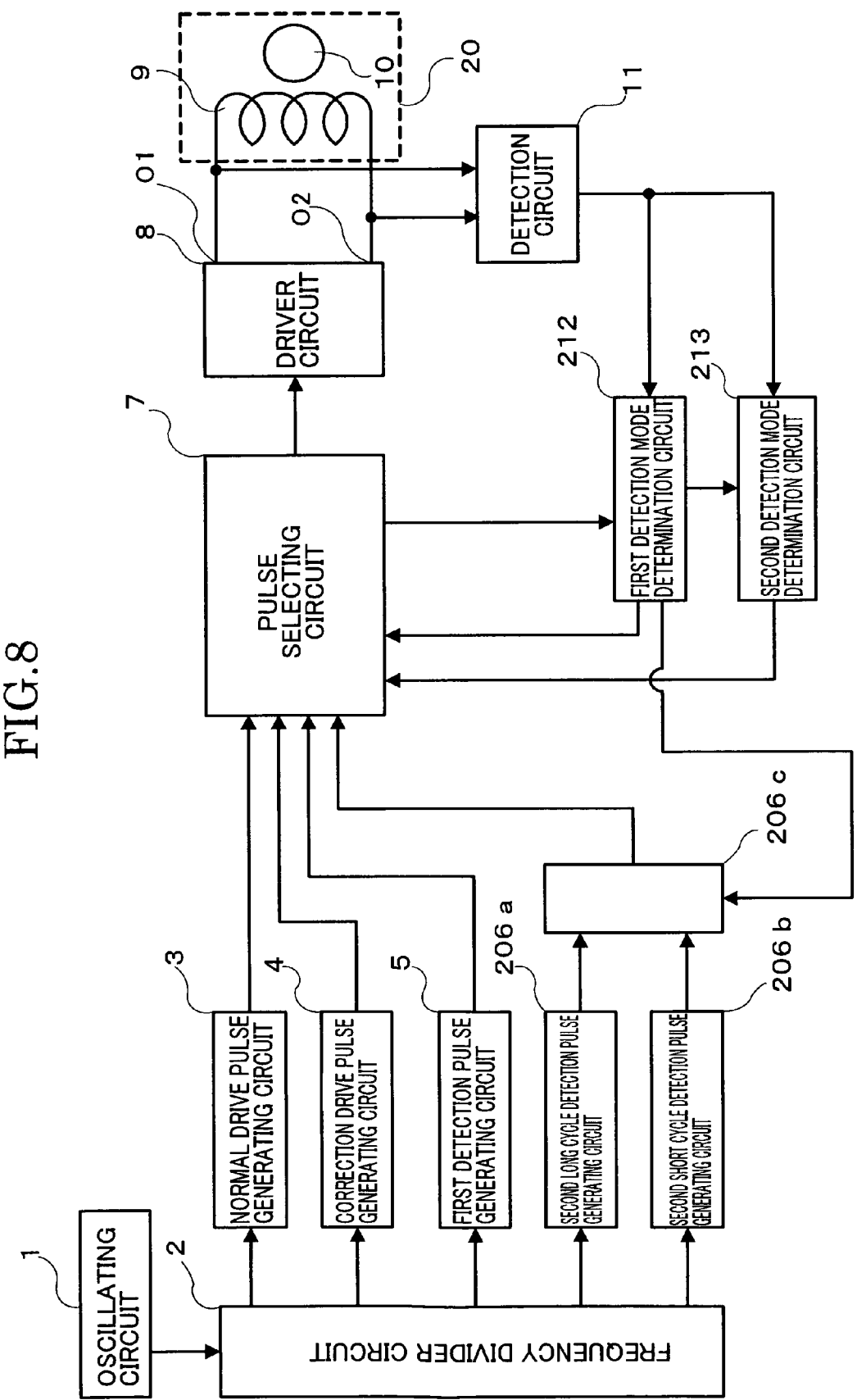
FIG. 8 is a block diagram showing a circuit configuration of an electronic clock of the present invention (second embodiment).
Figure 9:
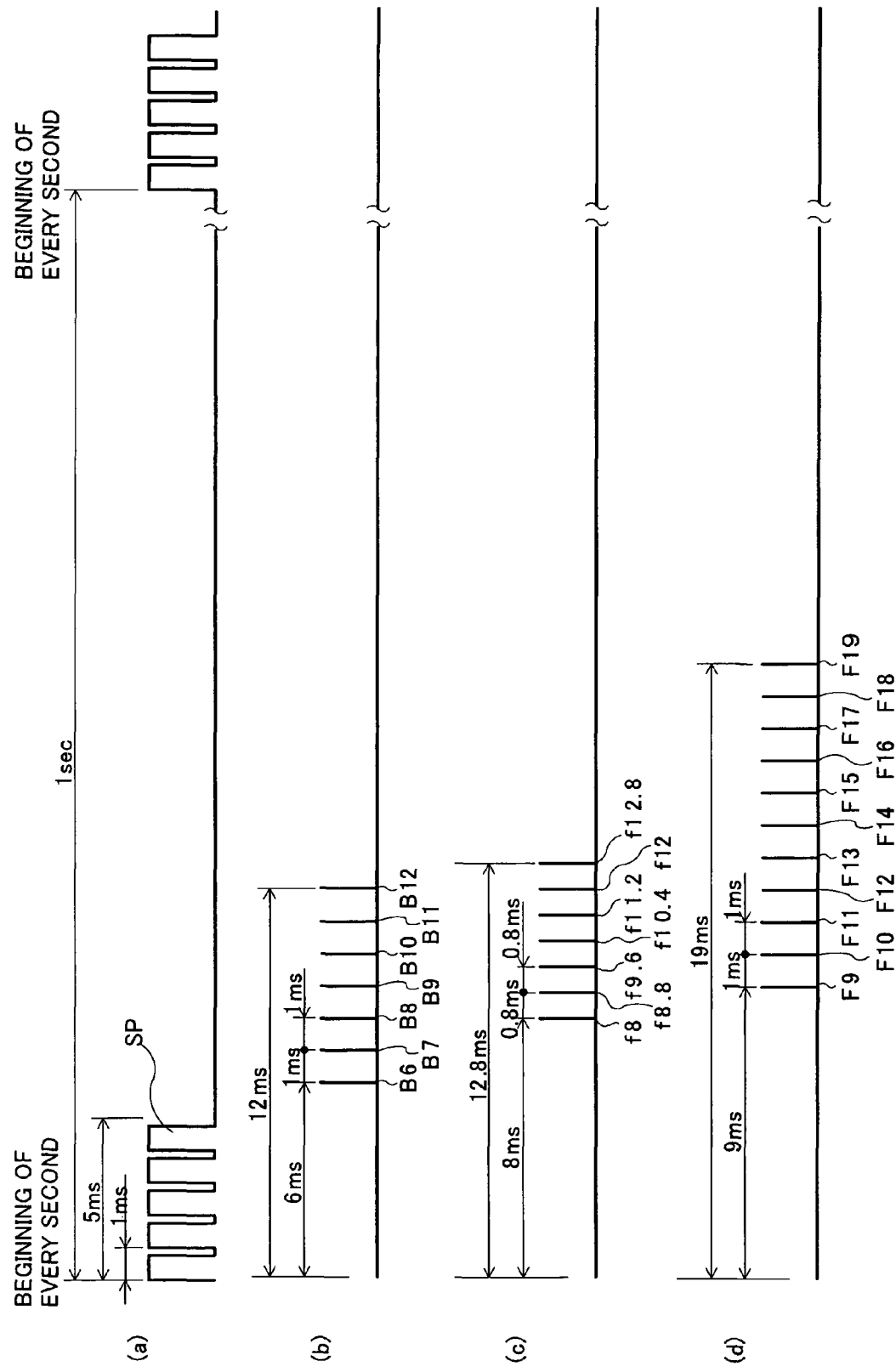
FIG. 9 is a diagram of waveforms of pulses generated by a circuit of the electronic clock of the present invention (second embodiment).
Figure 10:
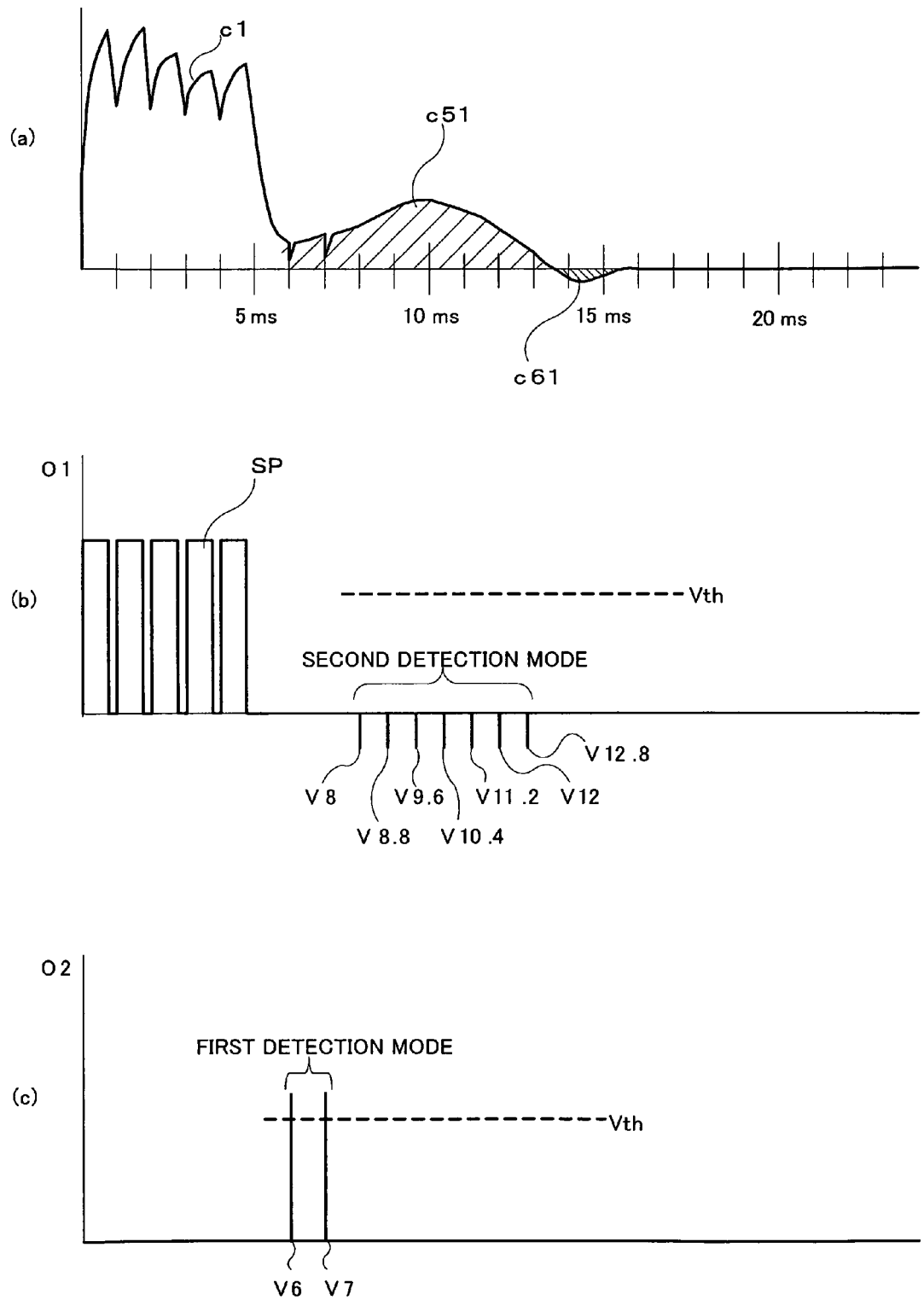
FIG. 10 is a diagram of current waveforms and voltage waveforms generated when the rotor of the electronic clock of the present invention fails to rotate (second embodiment).

Next, a second embodiment of the present invention will be described in detail based on the drawings. The second embodiment is an example in which a cycle of detection pulses in the second detection mode is changed in accordance with determination time to determine the presence or absence of a detection signal in the first detection mode, and thereby a determination period of the detection signal is changed. FIG. 8 is a block diagram showing a circuit configuration of an electronic clock of the second embodiment. FIG. 9 is a waveform diagram of pulses generated by the circuit of the electronic clock of the second embodiment. FIG. 3 is a diagram of current waveforms and voltage waveforms (the same drawings as those of the first embodiment) generated in the coil when a pointer having a large moment of inertia is attached to the electronic clock of the second embodiment. FIG. 10 shows one example of diagrams of current waveforms and voltage waveforms generated in the coil when the rotor of the second embodiment fails to rotate. Components that are the same as those described in the conventional example or the first embodiment are designated by the same reference numerals and will not be specifically described herein.

In FIG. 8, reference numeral 20 is a step motor formed of a coil 9 and a rotor 10, reference numeral 1 is an oscillating circuit, reference numeral 2 is a frequency divider circuit, reference numeral 3 is a normal drive pulse generating circuit, reference numeral 4 is a correction drive pulse generating circuit, and reference numeral 5 is a first detection pulse generating circuit that outputs detection pulses B6 to B12 for performing a first detection mode based on a signal of the frequency divider circuit 2. The detection pulses B6 to B12 are 0.125 ms-wide pulses, as shown in FIG. 9(b) and outputted every 1 ms, in a period of 6 ms to 12 ms after the beginning of every second, respectively. Reference numeral 206a is a second long cycle detection pulse generating circuit that outputs detection pulses F9 to F19 for performing a second detection mode based on a signal of the frequency divider circuit 2. The detection pulses F9 to F19 are 0.125 ms-wide pulses as shown in FIG. 9(d), and outputted for every 1 ms in a period of 9 ms to 19 ms. Reference numeral 206b is a second short cycle detection pulse generating circuit that outputs detection pulses f8, f8.8, f9.6, f10.4, f11.2, f12, and f12.8 for performing the second detection mode based on a signal of the frequency divider circuit 2. The detection pulses f8, f8.8, f9.6, f10.4, f11.2, f12, and f12.8 are 0.125 ms-wide pulses as shown in FIG. 9(c), and outputted for every 0.8 ms, in a period of 8 ms to 12.8 ms after the beginning of every second, respectively. Reference numeral 206c is a detection pulse selecting circuit that selects and outputs detection pulses of either one of the second long cycle detection pulse generating circuit 206a or the second short cycle detection pulse generating circuit 206b.

Reference numeral 7 is a pulse selecting circuit, reference numeral 8 is a driver circuit, reference numeral 9 is the coil, reference numeral 10 is the rotor, reference numeral 11 is a detection circuit, reference numeral 212 is a first detection mode determination circuit for determining a first detection mode based on a detection signal from the detection circuit 11, and reference numeral 213 is a second detection mode determination circuit for determining a second detection mode based on a detection signal of the detection circuit 11.

Next, the operation of the above configuration will be described. The pulse selecting circuit 7 selects a normal drive pulse SP outputted from the normal drive pulse generating circuit 3 at the beginning of every second and drives the step motor 20. Then, 6 ms after the beginning of the second, the first detection mode starts. In the first detection mode, the pulse selecting circuit 7 outputs detection pulses B6 to B12 outputted from the first detection pulse generating circuit 5, and controls the step motor 20 so that an impedance of the coil 9 may vary. Then, the detection circuit 11 detects induced voltages generated in the coil by the detection pulses B6 to B12. Meanwhile, the pulse selecting circuit 7 instructs the first detection mode determination circuit 212 to start the determination operation. The first detection mode determination circuit 212 determines detection result in the first detection mode, when a detection signal is inputted by the detection circuit 11. Based on receipt of the detection signal of the detection circuit 11, when the detection signal is generated twice, the first detection mode determination circuit 212 determines the detection, immediately stops the detection pulses outputted by the first detection pulse generating circuit 5, and shifts the first detection mode to the second detection mode by not only instructing the pulse selecting circuit 7 to stop the operation of the first detection mode, but also instructing the second detection mode determination circuit 213 to start the operation.

A detection pulse of the second detection mode varies depending on the determination time of the first detection mode. When the second detection signal is generated due to the detection pulse B7, the detection pulse selecting circuit 206c selectively outputs the detection pulses f8, f8.8, f9.6, f10.4, f11.2, f12, and f12.8 outputted by the second short cycle detection pulse generating circuit 206b. On the other hand, when the second detection signal is generated by a detection pulse after the detection pulse B8, the detection pulse selecting circuit 206c selectively outputs the detection pulses F9 to F19 outputted by the second long cycle detection pulse generating circuit 206a. The detection pulse selecting circuit 206a functions as changing means for changing the determination period of the second detection mode in accordance with the determination time of the first detection mode. Further, the detection pulse selecting circuit 206c shortens the determination period of the second detection mode by shortening the cycle of the detection pulses in the second detection mode when the determination time of the first detection mode is early.

First, described is a case where the second detection signal is generated by the detection pulse B7 and the first detection mode is shifted to the second detection mode. The pulse selecting circuit 7 selects and outputs the detection pulses f8, f8.8, f9.6, f10.4, f11.2, f12, and f12.8 outputted by the second short cycle detection pulse generating circuit 206b selected by the detection pulse selecting circuit 206c, and controls the step motor 20. Then, the detection circuit 11 detects induced voltages generated in the coil 9 by the detection pulses f8, f8.8, f9.6, f10.4, f11.2, f12, and f12.8. Based on receipt of the detection signal of the detection circuit 11, when a detection signal is generated even once, the second detection mode determination circuit 213 determines success of rotation, immediately stops detection pulses outputted from the second short cycle detection pulse generating circuit 206b, and controls the pulse selecting circuit 7 so that not only the operation of the second detection mode may terminate, but also no correction drive pulse FP may be outputted. However, the detection signals generated due to the detection pulses f8, f8.8, f9.6, f10.4, f11.2, f12, and f12.8 terminate after at most seven times of detection trials, i.e., after a detection trial of pulse f12.8. If no detection signal is generated during the detection trials, the second detection mode determination circuit 213 determines failure of rotation, and controls the pulse selecting circuit 7 so that a correction drive pulse FP may be outputted.

Next, described is a case where two detection signals are not generated by the pulse B7, i.e., when the second detection signal is generated by a pulse after the detection pulse B8 and then the first detection mode is shifted to the second detection mode. The pulse selecting circuit 7 selects and outputs the detection pulses F9 to F19 outputted by the second long cycle detection pulse generating circuit 206a selected by the detection pulse selecting circuit 206c, and controls the step motor 20. Then, the detection circuit 11 detects induced voltages generated in the coil 9 by the detection pulses F9 to F19. Based on receipt of the detection signal of the detection circuit 11, when a detection signal is generated even once, the second detection mode determination circuit 213 determines success of rotation, immediately stops detection pulses outputted from the second long cycle detection pulse generating circuit 206a, and further controls the pulse selecting circuit 7 so that no correction drive pulse FP may be outputted. However, the detection signals generated by the detection pulses terminate after at most seven times of detection trials. If no detection signal is generated during the detection trials, the second detection mode determination circuit 213 determines failure of rotation, and not only stops the operation of the second detection mode, but also controls the pulse selecting circuit 7 so that a correction drive pulse FP may be outputted. For example, if a detection trial of the second detection mode starts from the detection pulse F10, the second detection mode is aborted after the detection trial of the detection pulse 16, which is the seventh detection trial as counted from the detection pulse F10. If no detection signal is generated during the detection trials, the second detection mode determination circuit 213 determines failure of rotation.

As described above, the second detection pulse generating circuit has two systems of the second long cycle detection pulse generating circuit 206a having detection pulses of 1 ms cycle, and the second short cycle detection pulse generating circuit 206b having detection pulses of 0.8 ms cycle, in which the pulses are selectively outputted from the detection pulse selecting circuit 206c. Thus, when the determination time of the first detection mode terminates early at 7 ms, the second detection pulse generating circuit terminates the second detection mode after a short determination period by performing detection trials at a short cycle of 0.8 ms. In contrast, when the determination time of the first detection mode terminates later in a period after 8 ms, the second detection pulse generating circuit changes the determination period so that the second detection mode may terminate after a longer determination period by performing detection trials at a long cycle of 1 ms.

A method for detecting actual rotation in the operation described above will be described with reference to the waveform diagrams of FIG. 9 and FIG. 3. First, a case where the pointer having the large moment of inertia is attached will be described. FIG. 3 is the same as that described in the first embodiment.

FIG. 3(a) is the same as that described in the first embodiment. First, the normal drive pulse SP as shown in FIG. 9(a) is applied to the one end O1 of the coil 9, the rotor 10 rotates, and the current waveform c1 as shown in FIG. 3(a) is generated. When the normal drive pulse SP terminates, the rotor enters free vibration state, and the current waveform is the current waveforms shown by c2, c31, cx and c41. At 6 ms, the first detection mode starts, and the detection pulse B6 as shown in FIG. 9(b) is applied to the coil 9. As shown in FIG. 3(a), at 6 ms, the current waveform is in the region of the current waveform c2, and a current value is on the negative side. Thus, as shown in FIG. 3(c), an induced voltage V6 generated by the detection pulse B6 does not exceed a threshold value Vth. However, at 7 ms, the current waveform enters the region of the current waveform c31 and the current value changes to the positive side. Thus, as shown in FIG. 3(c), an induced voltage V7 generated due to the detection pulse B7 is a detection signal exceeding the threshold value Vth. Similarly, at 8 ms, the current waveform is still in the region of the current waveform c31, and an induced voltage V8 generated by the detection pulse B8 is a signal exceeding the threshold value Vth. Since the two detection signals of the induced voltages V7, V8 have exceeded the threshold voltage Vth, the first detection mode switches to the second detection mode.

Since the switching to the second detection mode by the induced voltage V8 generated by the detection pulse B8 that occurs after 8 ms, the detection pulse selecting circuit 206c selects the detection pulses F9 to F19 outputted by the second long cycle detection pulse generating circuit 206a, and outputs them to the pulse selecting circuit 7. A detection pulse of next timing after 8 ms, i.e., the detection pulse F9 at 9 ms as shown in FIG. 9(d), is applied to the coil 9. As shown in FIG. 3(a), at 9 ms, the current waveform is in the region of the current waveform c31, and the current value is on the positive side. Thus, as shown in FIG. 3(b), an induced voltage V9 generated by the detection pulse F9 does not exceed the threshold value Vth. Similarly, as the current waveform is still in the region of the current waveform c31, induced voltages V10, V11, and V12 generated due to the respective detection pulses F10, F11, F12 do not exceed the threshold value Vth. At 13 ms, the current waveform enters the region of the current waveform cx. However, the current value remains on the positive side, and induced voltages F13, F14 generated due to the detection pulses F13, F14 do not exceed the threshold voltage Vth, either. However, at 15 ms, which is the seventh detection trial in the second detection mode, the current waveform is in the region of the current waveform c41, as shown in FIG. 3(a) and the current value changes to the negative side. Thus, as shown in FIG. 3(c), an induced voltage V15 generated by the detection pulse F15 is a detection signal exceeding the threshold value Vth. Then, the second detection mode determination circuit 213 correctly detects rotation to determine that the rotation has been successful, and controls the pulse selecting circuit 7 so that no correction drive pulse FP may be outputted.

Next, a case where the rotor 10 fails to rotate due to weak driving force will be described with reference to FIG. 9 and FIG. 10. FIG. 10(a) shows current waveforms induced in the coil 9 when the rotor 10 fails to rotate. FIG. 10(b) shows voltage waveforms then generated at one terminal O1 of the coil 9, and FIG. 10(c) shows voltage waveforms generated at the other terminal O2 of the coil 9.

Similar to FIG. 20(a) of the conventional example, FIG. 10(a) shows current waveforms generated in the coil when the rotor fails to rotate due to weak driving force. First, at 6 ms, the first detection mode starts and the detection pulse B6 is applied to the coil 9. As shown in FIG. 10(a), at 6 ms, the current waveform is in the region of the current waveform c51, and a current value is on the positive side. Thus, as shown in FIG. 10(c), the induced voltage V6 is a detection signal exceeding the threshold value Vth. Further, at 7 ms, the current waveform is also in the region of the current waveform c51, the induced voltage V7 is a detection signal exceeding the threshold value Vth. Since the induced voltages V6, V7 and the two detection signals have exceeded the threshold value Vth, the first detection mode is shifted to the second detection mode.

Since the first detection mode switches to the second detection mode by the induced voltage V7 generated due to the detection pulse B7 that occurs at 7 ms, the detection pulse selecting circuit 206c selects the detection pulses f8, f8.8, f9.6, f10.4, f11.2, f12, and f12.8 outputted by the second short cycle detection pulse generating circuit 206b, and outputs them to the pulse selecting circuit 7. A detection pulse of next timing after 7 ms, i.e., the detection pulse f8 at 8 ms among the detection pulses shown in FIG. 9(c), is applied to the coil 9. As shown in FIG. 10(a), at 8 ms, the current waveform is in the region of the current waveform c51, and the current value is on the positive side. Thus, as shown in FIG. 10(b), the induced voltage V8 does not exceed the threshold voltage Vth. Further, as the current waveform is still in the region of the current waveform c51, the induced voltages V8.8, V9.6, V10.4, V11.2 and V12 generated due to the respective detection pulses f8.8, f9.6, f10.4, f11.2 and f12 do not exceed the threshold voltage Vth. Furthermore, even at 12.8 ms, which is the seventh detection trial in the second detection mode, as shown in FIG. 10(a), the current waveform is in the region of the current waveform c51 and the current value is on the positive side. Thus, as shown in FIG. 10(b), the induced voltage V12.8 generated by the detection pulse f12.8 does not exceed the threshold value Vth. The second detection mode is aborted at this sixth detection trial. Thus, the second detection mode is aborted at this seventh detection trial. Thus, as the detection at the current waveform c61 is not performed, the second detection mode determination circuit 213 correctly determines failure of rotation, and controls the pulse selecting circuit 7 so that a correction drive pulse FP may be outputted. Thus, the clock does not stop.

In the second embodiment, the total number of outputs of the detection pulses is the same irrespective of whether the detection pulses of the second short cycle detection pulse generating circuit 206b or those of the second long cycle detection pulse generating circuit 206a are outputted, and a determination of the second detection mode may be the same as the conventional one. Thus, it is no longer necessary to have the two systems of the second detection mode determination circuits depending on determination result of the first detection mode, and only the second detection mode determination circuit 213 is required.

Figure 11:
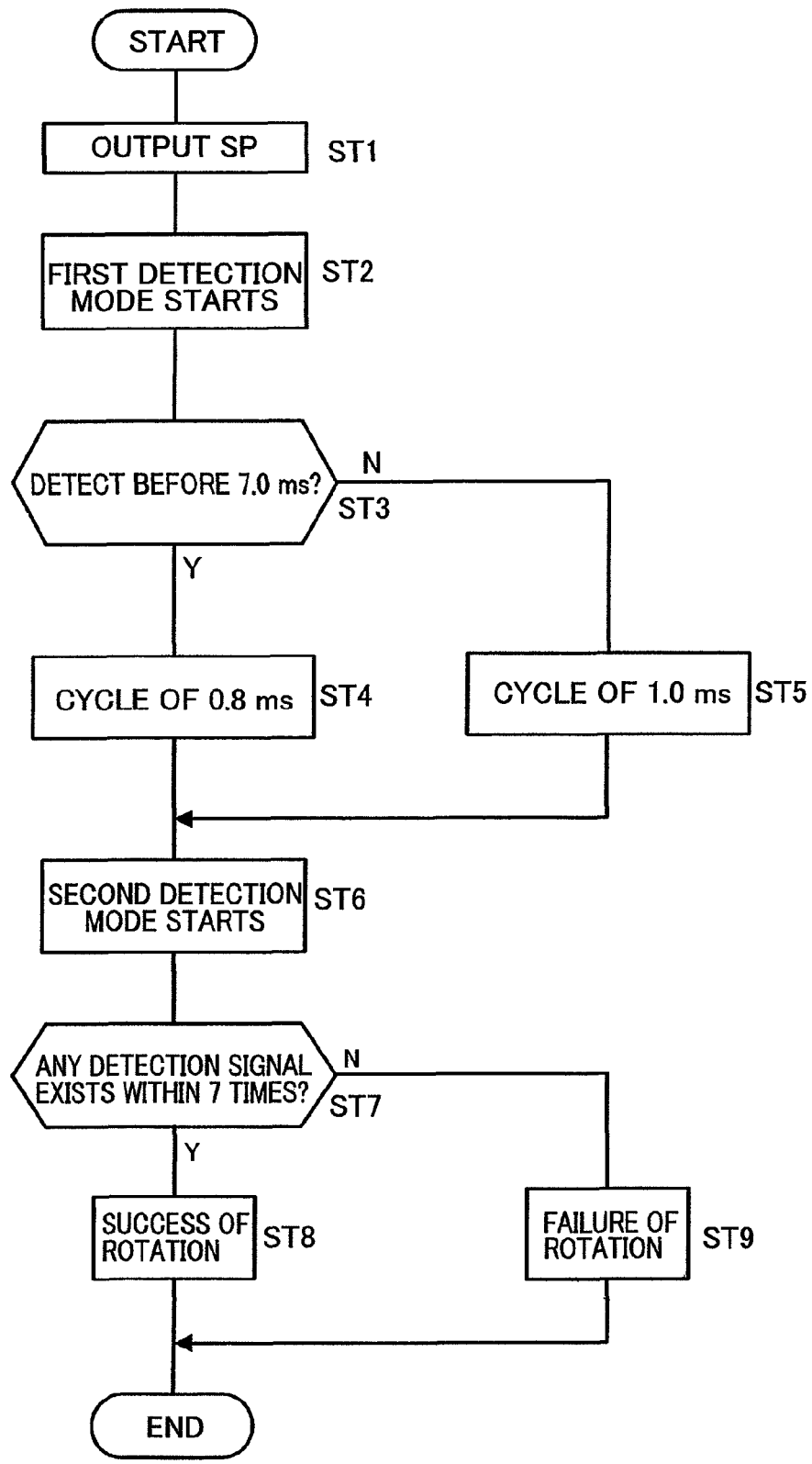
FIG. 11 is a block diagram showing a method of detecting rotation of the rotor in an electronic clock of the present invention (second embodiment).

The above operation will be described with reference to the flow charts. FIG. 11 is a flow chart showing a method for detecting rotation of the rotor in the electronic clock of the second embodiment, in which the operation for the beginning of every second is illustrated. To correspond with FIG. 7, the step numbers (ST*) in the flow chart are identical to those in the FIG. 7. A normal drive pulse SP is outputted at the timing of the beginning of every second (step ST1), and the first detection mode starts after 6 ms (step ST2). In the first detection mode, it is determined whether or not the detection signal can be detected by a detection signal before 7 ms (step ST3). If a detection signal is detected before 7 ms (step ST3: Y), a cycle of a detection pulse in the second detection mode is set to every 0.8 ms (step ST4) to shorten a determination period of the second detection mode. On the other hand, if a detection signal is detected after 7 ms (step ST3: N), a cycle of a detection pulse in the second detection mode is set to every 1.0 ms (step ST5) and the second detection mode starts (step ST6). Then, it is determined whether or not a detection signal is detected within seven times in the second detection mode (step ST7). When the detection signal is detected within the seven times (step ST7: Y), the second detection mode determination circuit 213 determines success of rotation, and prevents a correction drive pulse FP from being outputted (step ST8). In contrast, when the detection signal is not detected within the seven times (step ST7: N), the second detection mode determination circuit 213 determines failure of rotation, and outputs a correction drive pulse FP (step ST9).

Third Embodiment

Figure 12:
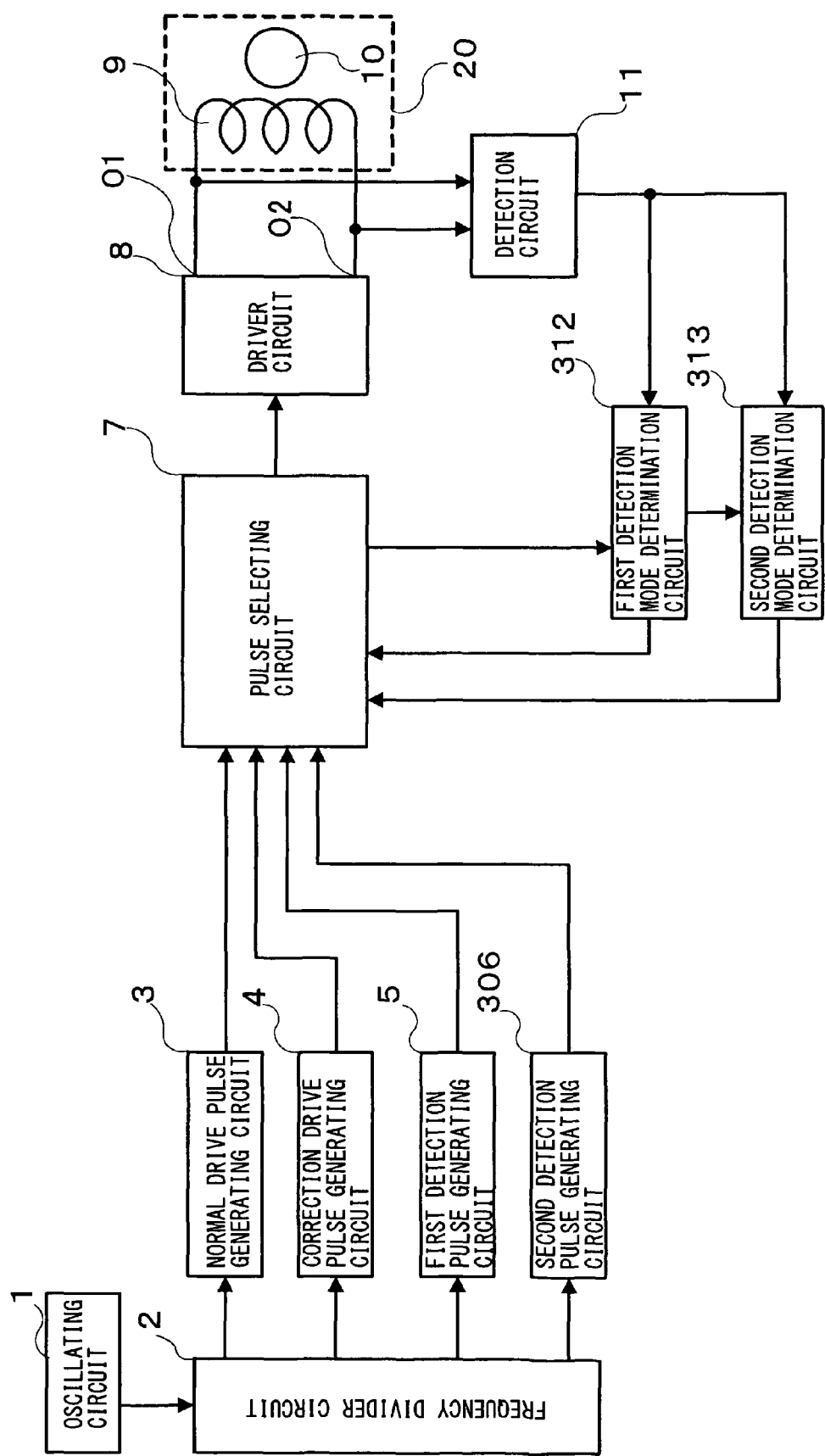
FIG. 12 is a block diagram showing a circuit configuration of the electronic clock of the present invention (third embodiment).
Figure 13:
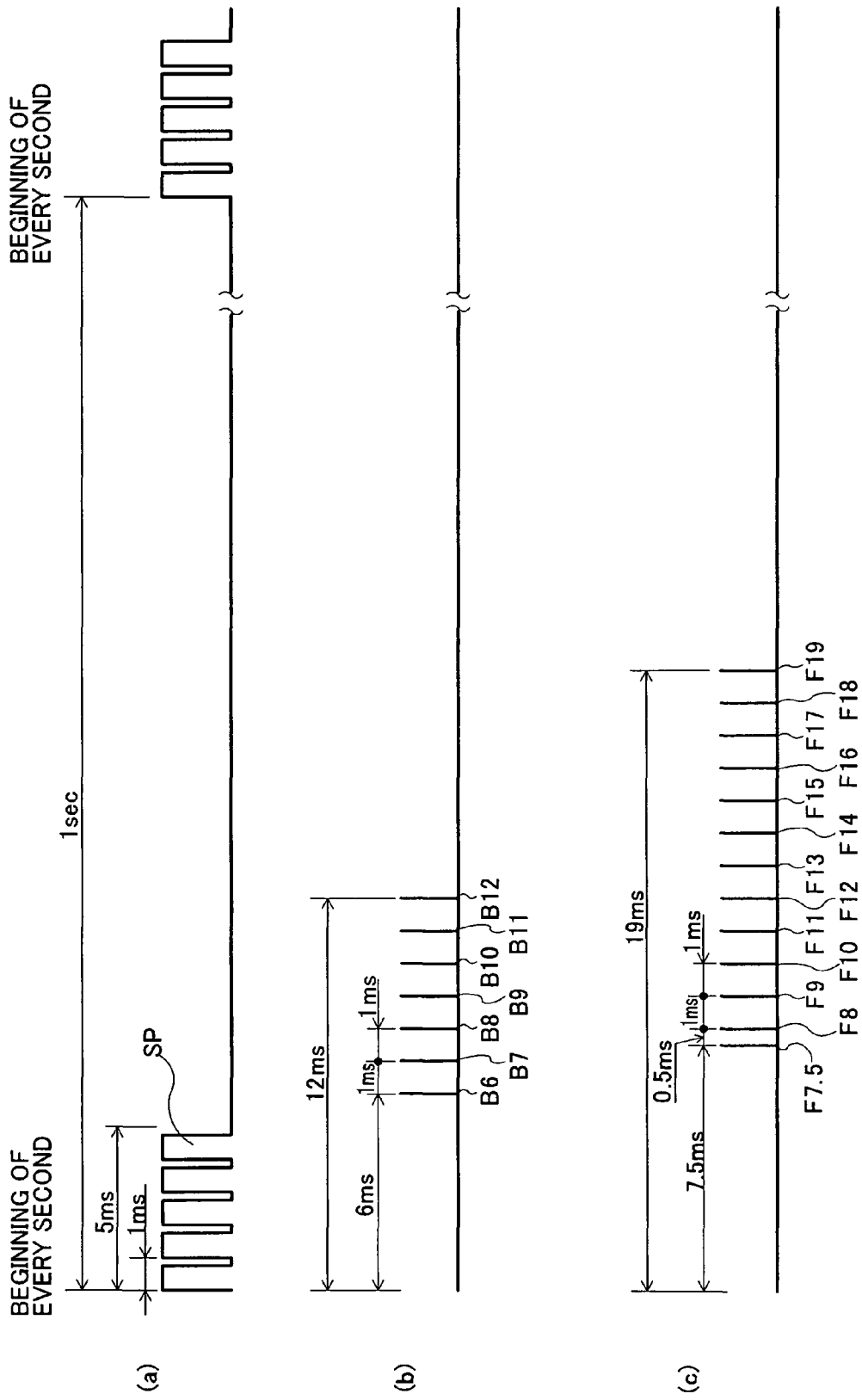
FIG. 13 is a diagram of waveforms of pulses generated by the circuit of the electronic clock of the present invention (third embodiment).
Figure 15:
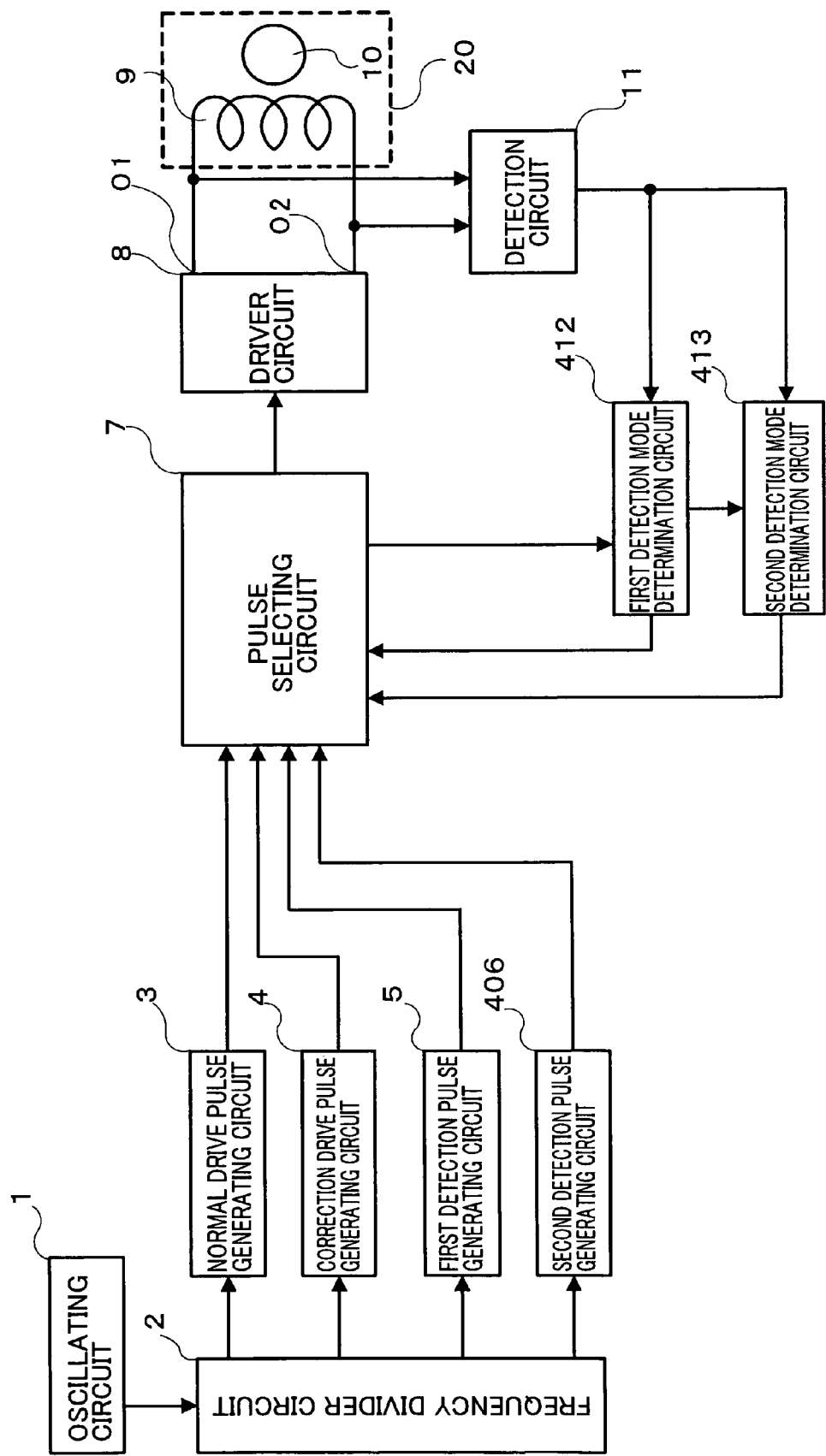
FIG. 15 is a block diagram showing a circuit configuration of a conventional electronic clock.
Figure 16:
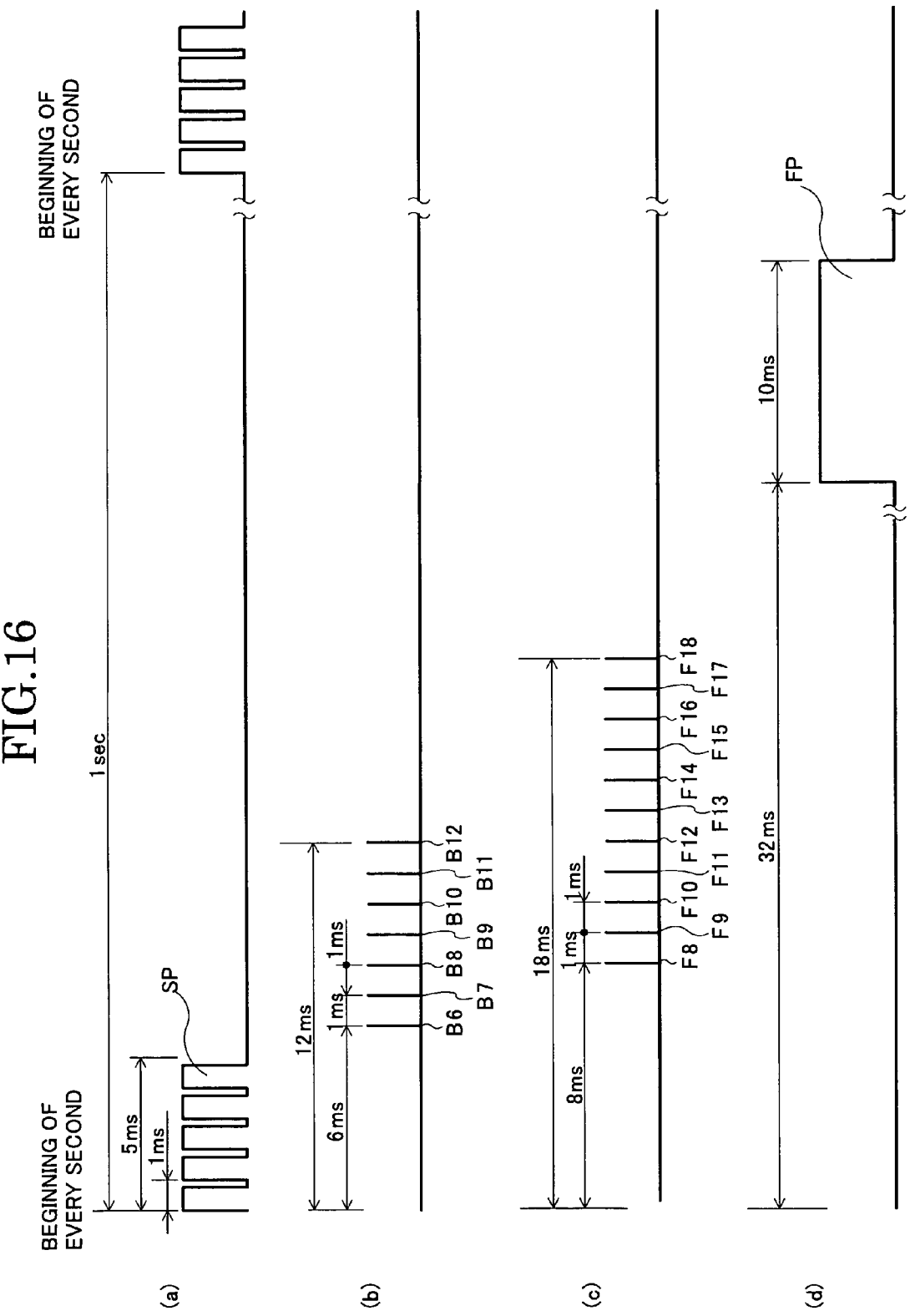
FIG. 16 is a waveform diagram of pulses generated by the circuit of the conventional electronic clock.

Next, a third embodiment of the present invention will be described in detail based on the drawings. The third embodiment is an example of changing a cycle of detection pulses on some of the detection signals in the second detection mode in accordance with detection conditions in the first detection mode. FIG. 12 is a block diagram of a circuit configuration of the electronic clock of the third embodiment. FIG. 13 is a waveform diagram of pulses outputted by the circuit of the electronic clock of the third embodiment. FIG. 3 is a diagram of current waveforms and voltage waveforms (the same drawings as those of the first embodiment) generated in the coil when the pointer having the large moment of inertia is attached to the electronic clock of the third embodiment. FIG. 14 is a diagram of current waveforms and voltage waveforms when the rotor of the electronic clock of the third embodiment fails to rotate. Components that are the same as those described in the conventional example or the first embodiment are designated by the same reference numerals and will not be specifically described herein.

In FIG. 12, reference numeral 20 is a step motor formed of a coil 9 and a rotor 10, reference numeral 1 is an oscillating circuit, reference numeral 2 is a frequency divider circuit, reference numeral 3 is a normal drive pulse generating circuit, reference numeral 4 is a correction drive pulse generating circuit, and reference numeral 5 is a first detection pulse generating circuit that outputs detection pulses B6 to B12 for performing a first detection mode based on a signal of the frequency divider circuit 2. The detection pulses B6 to B12 are 0.125 ms-wide pulses, as shown in FIG. 13(b) and outputted every 1 ms, in a period of 6 ms to 12 ms after the beginning of every second, respectively. Reference numeral 306 is a second detection pulse generating circuit that outputs detection pulses F7.5 and detection pulses F8 to F19 for performing a second detection mode based on a signal of the frequency divider circuit 2. The detection pulse F7.5 and the detection pulses F8 to F19 are 0.125 ms-wide pulses as shown in FIG. 13(c). The second detection pulse generating circuit outputs the pulse F7.5, 7.5 ms after the beginning of every second, and then outputs the detection pulses F8 to F19 for every 1 ms, in a period of 8 ms to 19 ms after the beginning of the second, respectively.

Reference numeral 7 is a pulse selecting circuit, 8 is a driver circuit, reference numeral 9 is the coil, reference numeral 10 is the rotor, reference numeral 11 is a detection circuit, reference numeral 312 is a first detection mode determination circuit for determining a first detection mode based on a detection signal from the detection circuit 11, and reference numeral 313 is a second detection mode determination circuit for determining a second detection mode based on a detection signal of the detection circuit 11.

Next, the operation of the above configuration will be described. The pulse selecting circuit 7 selects a normal drive pulse SP outputted from the normal drive pulse generating circuit 3 at the beginning of every second and drives the step motor 20. Then, 6 ms after the beginning of the second, the first detection mode starts. In the first detection mode, the pulse selecting circuit 7 selects and outputs detection pulses B6 to B12 outputted from the first detection pulse generating circuit 5, and controls the step motor 20 so that an impedance of the coil 9 may vary. Then, the detection circuit 11 detects induced voltages generated in the coil by the detection pulses B6 to B12. Meanwhile, the pulse selecting circuit 7 instructs the first detection mode determination circuit 312 to start the determination operation. The first detection mode determination circuit 312 determines the detection result in the first detection mode based on the number of inputs of the detection signals from the detection circuit 11. Based on receipt of the detection signal of the detection circuit, when a detection signal is generated twice, the first detection mode determination circuit 312 determines the detection, immediately stops the detection pulses outputted by the first detection pulse generating circuit 5, and shifts the first detection mode to the second detection mode by not only instructing the pulse selecting circuit 7 to stop the operation of the first detection mode, but also instructing the second detection mode determination circuit 313 to start the operation.

A detection pulse of the second detection mode varies depending on the determination time of the first detection mode. The second detection pulse generating circuits 406, 106 in the conventional example of the first embodiment, and the second long cycle detection pulse generating circuit 206a or the second short cycle detection pulse generating circuit 206b in the second embodiment outputs a detection pulse of a single cycle, respectively (for example, outputs the detection pulses F8 to F19 for every 1 ms and f8 to f12.8 for every 0.8 ms). However, the second detection pulse generating circuit 306 in the third embodiment changes a determination period of the second detection mode by outputting detection pulses having two kinds of cycles: the detection pulse F7.5 and the detection pulse F8 of 0.5 ms cycle outputted in a period of 7.5 ms to 8 ms, and the detection pulse F8 to the detection pulse 19 of 1 ms cycle outputted in a period of 8 ms to 19 ms. With this configuration, the second detection pulse generating circuit 306 functions as changing means for changing the determination period of the second detection mode in accordance with the determination time of the first detection mode.

First, described is a case where the second detection signal is generated due to the detection pulse B7 and the first detection mode is shifted to the second detection mode. The pulse selecting circuit 7 selects and outputs the detection pulse F7.5 and the detection pulses F8 to F19 outputted by the second detection pulse generating circuit 306, and controls the step motor 20. Then, the detection circuit 11 detects induced voltages generated in the coil 9 due to the detection pulse F7.5 and the detection pulses F8 to F19. Based on receipt of the detection signal of the detection circuit 11, when a detection signal is generated even once, the second detection mode determination circuit 313 determines success of rotation, immediately stops detection pulses outputted from the second detection pulse generating circuit 306, and controls the pulse selecting circuit 7 so that not only the operation of the second detection mode may terminate, but also no correction drive pulse FP may be outputted. However, the detection signals generated by the detection pulse F7.5 and the detection pulses F8 to F19 terminate after at most seven detection trials, i.e., after a detection trial of the detection pulse F13, which is the seventh detection trial as counted from the detection pulse F7.5. Although the detection signals are aborted after the seventh detection trial, the determination period is shortened because there are the detection pulse 7.5 of a partly short cycle and the detection pulse F8, and a length of the abort period of the second detection mode is 5.5 ms, in a period of 7.5 ms to 13 ms. If no detection signal is generated during those detection pulses, the second detection mode determination circuit 213 determines failure of rotation, and controls the pulse selecting circuit 7 so that a correction drive pulse FP may be outputted.

Next, described is a case where two detection signals are not generated due to the pulse B7, i.e., when the second detection signal is generated by a pulse after the detection pulse B8 and then the first detection mode is shifted to the second detection mode. The pulse selecting circuit 7 selects and outputs the detection pulses F9 to F19 outputted by the second detection pulse generating circuit 306, and controls the step motor 20. Then, the detection circuit 11 detects induced voltages generated in the coil 9 due to the detection pulses F9 to F19. Based on receipt of the detection signal of the detection circuit 11, when the detection signal is generated even once, the second detection mode determination circuit 313 determines success of rotation, immediately stops detection pulses outputted from the second long cycle detection pulse generating circuit 206a, and further controls the pulse selecting circuit 7 so that no correction drive pulse FP may be outputted. However, the detection signals generated due to the detection pulses terminate after at most seven detection trials If no detection signal is generated during the detection trials, the second detection mode determination circuit 313 determines failure of rotation, and controls the pulse selecting circuit 7 so that not only the operation of the second detection mode may terminate, but also a correction drive pulse FP may be outputted. For example, if detection of the second detection mode starts from the detection pulse F10, the second detection mode is aborted after a detection trial of the detection pulse 16, which is the seventh detection trial. Since a detection signal having the same cycle of 1 ms is aborted after the seventh detection, a length of the determination period of the second detection mode is 6 ms, in a period of 10 ms to 16 ms. If no detection signal is generated during the detection trials, the second detection mode determination circuit 313 determines failure of rotation.

As described above, in the second detection mode, determinations are made to differ, by using some detection pulses having different cycles. If determination time of the first detection mode terminates earlier, such as at 7 ms, the second detection mode is terminated after a short determination period by performing some detection trials in a short cycle. In contrast, if the determination time of the first detection mode terminates later in a period after 8 ms, the second detection mode is terminated after a long determination period, by performing detection trials in the same cycle of 1 ms.

A method for detecting actual rotation in the operation described above will be described with reference to the waveform diagrams in FIGS. 13 and 3. First, a case where the pointer having the large moment of inertia is attached will be described. FIG. 3 is the same as that described in the first embodiment.

FIG. 3(a) is the same as that described in the first embodiment. First, the normal drive pulse SP as shown in FIG. 9(a) is applied to the one end O1 of the coil 9, the rotor 10 rotates, and the current waveform c1 as shown in FIG. 3(a) is generated. When the normal drive pulse SP terminates, the rotor enters free vibration state, and the current waveform is the current waveforms shown by c2, c31, cx and c41. At 6 ms, the first detection mode starts, and the detection pulse B6 as shown in FIG. 13(b) is applied to the coil 9. As shown in FIG. 3(a), at 6 ms, the current waveform is in the region of the current waveform c2, and a current value is on the negative side. Thus, as shown in FIG. 3(c), an induced voltage V6 generated by the detection pulse B6 does not exceed a threshold value Vth. However, at 7 ms, the current waveform enters the region of the current waveform c31 and the current value changes to the positive side. Thus, as shown in FIG. 3(c), an induced voltage V7 generated by the detection pulse B7 is a detection signal exceeding the threshold value Vth. Similarly, at 8 ms, the current waveform is still in the region of the current waveform c31, and an induced voltage V8 generated by the detection pulse B8 is a signal exceeding the threshold value Vth. Since the two detection signals of the induced voltages V7, V8 have exceeded the threshold voltage Vth, the first detection mode switches to the second detection mode.

Since the switching to the second detection mode by the induced voltage V8, a detection pulse of next timing, i.e., a detection pulse F9 at 9 ms as shown in FIG. 13(c) is applied to the coil 9. As shown in FIG. 3(a), at 9 ms, the current waveform is in the region of the current waveform c31 and the current value is on the positive side. Thus, as shown in FIG. 3(b), an induced voltage V9 generated by the detection pulse F9 does not exceed the threshold value Vth. Similarly, as the current waveform is still in the region of the current waveform c31, induced voltages V10, V11, V12 generated due to the respective detection pulses F10, F11, F12 do not exceed the threshold value Vth. At 13 ms, the current waveform enters the region of the current waveform cx. However, the current value remains on the positive side, and induced voltages V13, V14 generated due to the detection pulses F13, F14 do not exceed the threshold value Vth, either. However, at 15 ms, which is the seventh detection in the second detection, the current waveform enters the region of the current waveform c41 as shown in FIG. 3(a), and the current value changes to the negative side. Thus, as shown in FIG. 3(c), an induced voltage generated by the detection pulse F15 is a detection signal exceeding the threshold value Vth. Then, the second detection/determination circuit 313 correctly detects rotation to determine success of rotation, and controls the pulse selecting circuit 7 so that no correction drive pulse FP may be outputted.

Next, a case where the rotor 10 fails to rotate due to weak driving force will be described with reference to FIG. 13 and FIG. 14. FIG. 14(a) shows current waveforms induced in the coil 9 when the rotor 10 fails to rotate. FIG. 14(b) shows voltage waveforms then generated at one terminal O1 of the coil 9, and FIG. 14(c) shows voltage waveforms generated at the other terminal O2 of the coil 9.

Similar to FIG. 20(a) of the conventional example, FIG. 14(a) shows current waveforms generated in the coil when the rotor fails to rotate due to weak driving force. First, at 6 ms, the first detection mode starts and the detection pulse B6 is applied to the coil 9. As shown in FIG. 14(a), at 6 ms, the current waveform is in the region of the current waveform c51, and a current value is on the positive side. Thus, as shown in FIG. 14(c), the induced voltage V6 is a detection signal exceeding the threshold value Vth. Further, at 7 ms, the current waveform is also in the region of the current waveform c51, the induced voltage V7 is a detection signal exceeding the threshold value Vth. Since the induced voltages V6, V7 and the two detection signals have exceeded the threshold value Vth, the first detection mode is shifted to the second detection mode.

Since the switching to the second detection mode by the induced voltage V7, a detection pulse of next timing, i.e., a detection pulse F7.5 at 7.5 ms as shown in FIG. 13(c) is applied to the coil 9. As shown in FIG. 14(a), at 7.5 ms, the current waveform is in the region of the current waveform c51, and the current value is on the positive side. Thus, as shown in FIG. 14(b), an induced voltage 7.5 generated by the detection pulse F7.5 does not exceed the threshold value Vth. Then, the detection pulse F8 at 8.0 ms that is 0.5 ms after the 7.5 ms is applied to the coil 9. As the current waveform is also in the region of the current waveform c31, an induced voltage V8 generated due to the detection pulse F8 does not exceed the threshold value Vth. Similarly, as the current waveform is still in the region of the current waveform c31, induced voltages V9 to V12 generated due to the detection pulses F9 to F12 that are subsequently outputted at periods of 1 ms do not exceed the threshold value Vth. Further, at 13 ms, which is the seventh detection trial in the second detection mode, as the current waveform is in the region of the current waveform c51 as shown in FIG. 14(a), and the current value is on the positive side. Thus, an induced voltage V13 does not exceed the threshold value Vth. The second detection mode is aborted at the seventh detection trial. Thus, as a detection trial at the current waveform c61 is not performed, the second detection mode determination circuit 313 correctly determines failure of rotation, and controls the pulse selecting circuit 7 so that a correction drive pulse FP may be outputted. Thus, the clock does not stop.

As described above, in the third embodiment, a determination period of the second detection mode can be changed in accordance with determination time of the first detection mode, by changing a cycle of some detection pulses of the second detection pulse generating circuit 306. In the third embodiment, a selecting circuit that changes a determination period or a detection pulse in accordance with determination time of the first detection mode is not used. Thus, with a slight modification of the conventional circuit, the effect of the present invention can be achieved.

In the first and second embodiments, although either the number of detection trials of detection signals or a cycle of detection pulses is changed, both may be changed at the same time. In this way, it is expected that changing the number of detection trials, the cycle of detection pulses, or even a determination period, as appropriate, without departing from the scope of the basic idea of this application may also achieve the similar effect.

Fourth Embodiment

Figure 21:
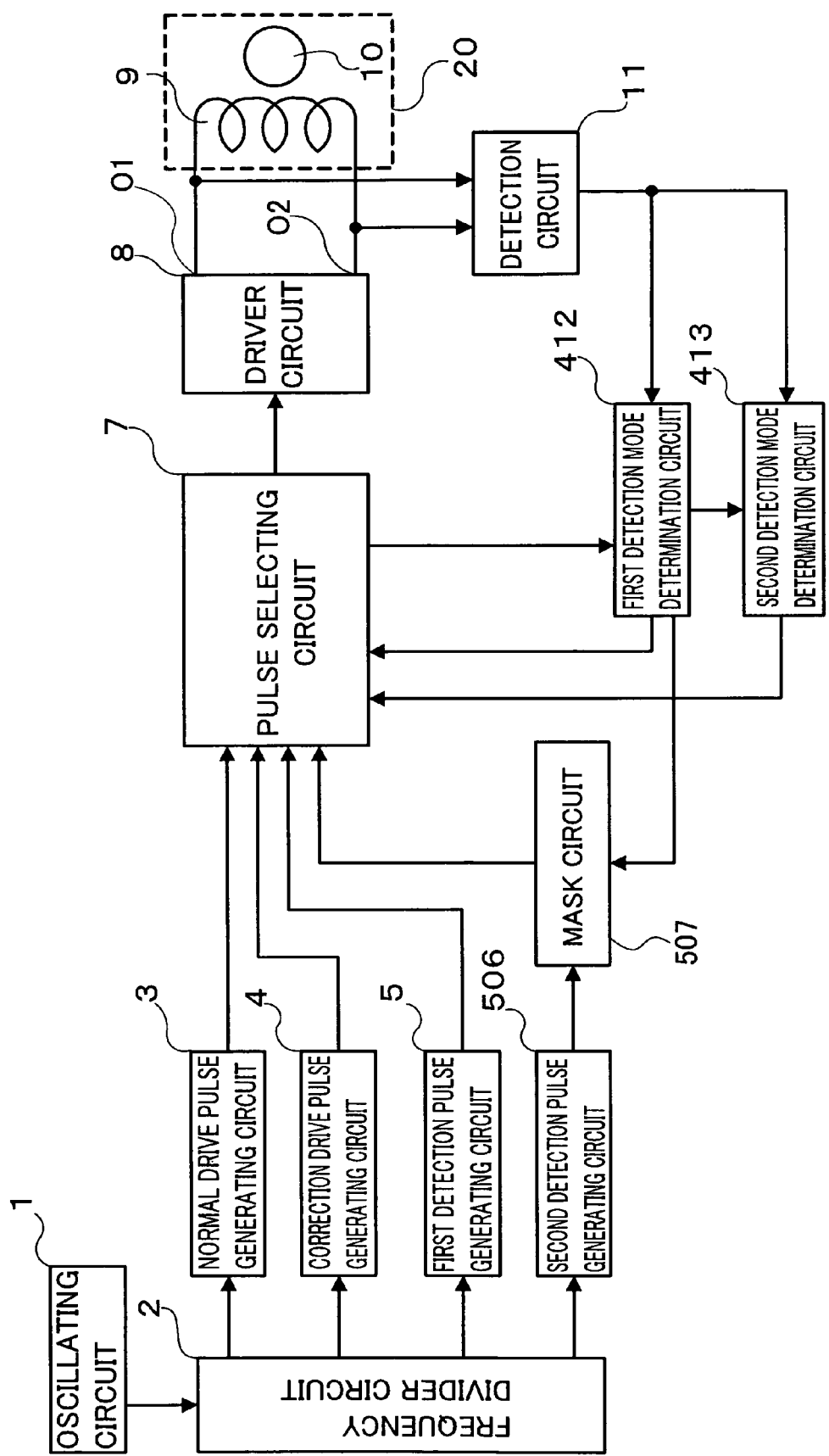
FIG. 21 is a block diagram showing a circuit configuration of an electronic clock of the present invention (fourth embodiment).
Figure 22:
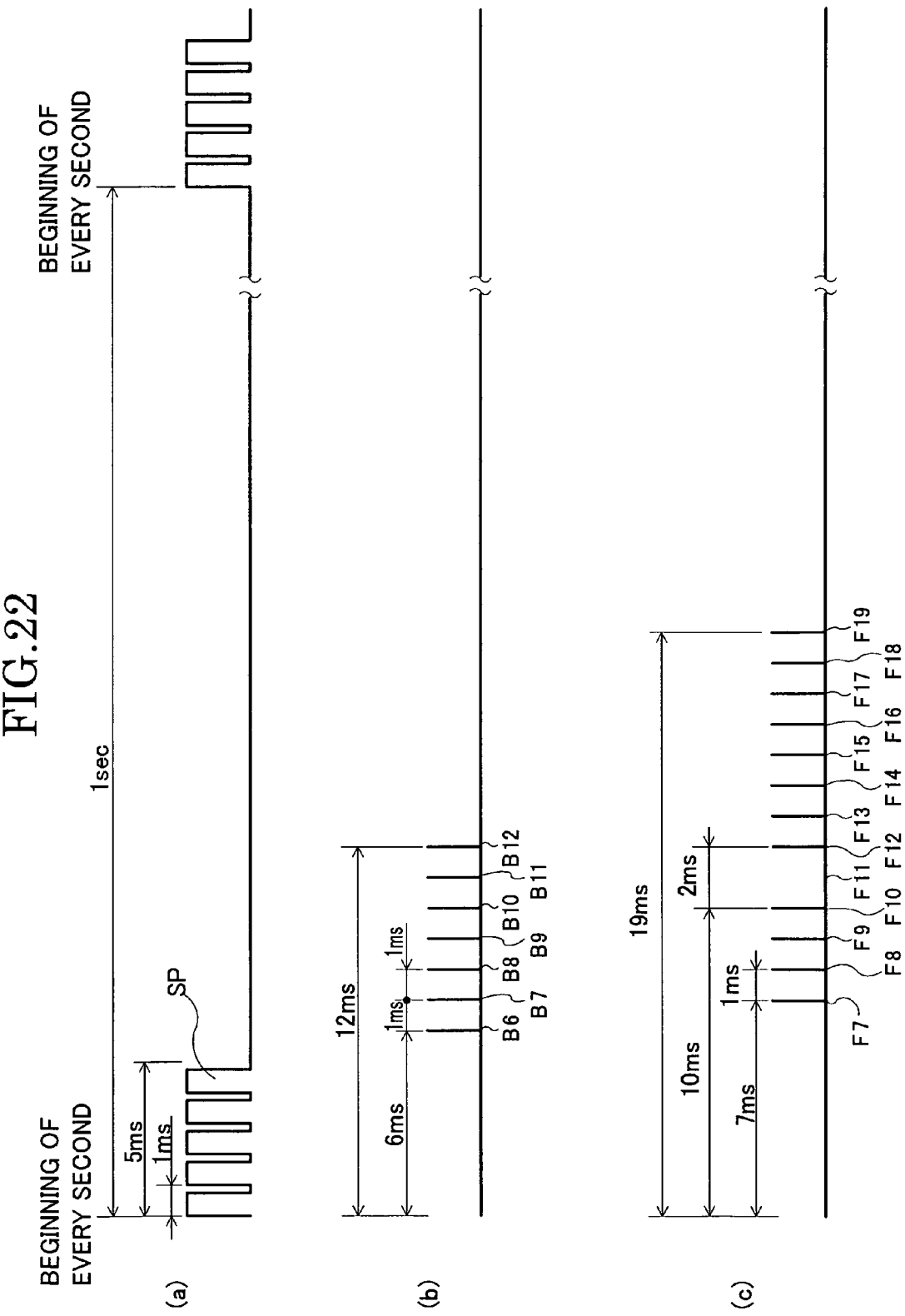
FIG. 22 is a waveform diagram of a pulse generated by the circuit of the electronic clock of the present invention (fourth embodiment).

Next, a fourth embodiment of the present invention will be described in detail based on the drawings. The fourth embodiment is an example of changing output timing of detection pulses of the second detection mode, in accordance with determination time of the first detection mode, and thereby changing the number of determination periods. FIG. 21 is a block diagram showing a circuit configuration of an electronic clock of the fourth embodiment. FIG. 22 is a waveform diagram of pulses generated by the circuit of the electronic clock of the fourth embodiment. FIG. 3 is a diagram of current waveforms and voltage waveforms (the same drawings as those of the first embodiment) generated in the coil when a pointer having a large moment of inertia is attached to the electronic clock of the fourth embodiment. FIG. 23 show current waveforms and voltage waveforms generated in the coil when a rotor fails to rotate as it is affected by external magnetic field in the fourth embodiment. Components that are the same as those described in the conventional example or the first to third embodiments are designated by the same reference numerals and will not be specifically described herein.

The first to third embodiments as described so far are countermeasures against a case where, as shown in FIG. 20(a), a negative current c61 that causes erroneous detections appears at the end of the determination period of the second detection mode. Such countermeasures are taken to prevent the negative current c61 from being detected by changing the number of occurrences of detection pulses or the cycle, thereby shortening the determination periods.

However, if the driving force weakens more than that in a case of FIG. 20, the above negative current may appear around the center of a determination period. This embodiment is intended not to detect a negative current by performing no determination during a determination period in accordance with determination time of the first detection pulse (or by setting more than one determination periods and not performing a determination therebetween).

Figure 24:
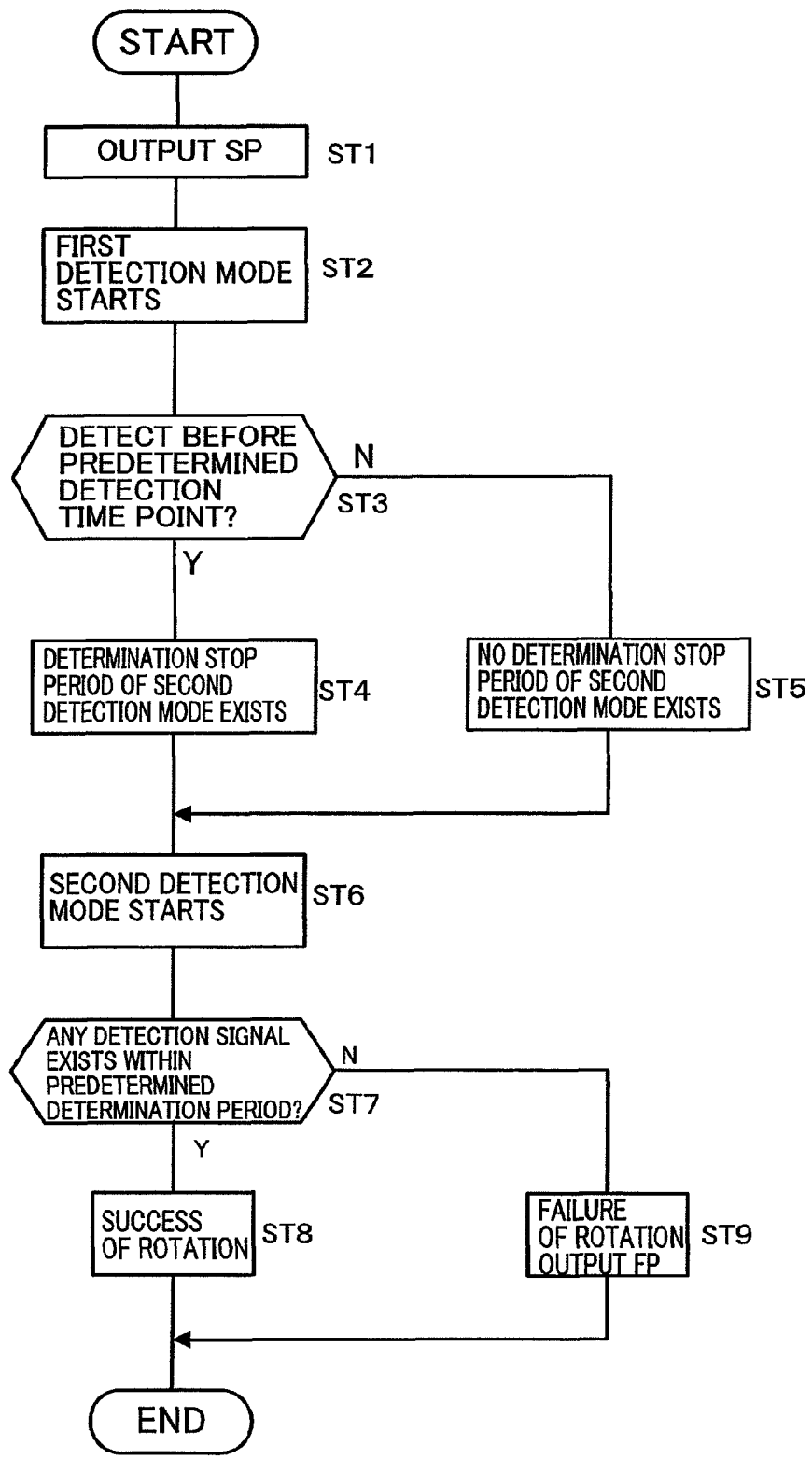
FIG. 24 is a flow chart showing a method for detecting rotation of the rotor in the electronic clock of the present invention (fourth embodiment).

FIG. 24 is a flow chart showing a concept of the present embodiment. As the main parts are the same as FIG. 7, only changed parts will be described. After an SP is outputted (step ST1), the first detection mode starts (step ST12), and whether or not a signal is detected prior to a predetermined detection point is determined (step ST3). If a signal is not detected prior to the predetermined detection point (step ST3: N), no determination period stop period is provided in the second detection mode, and an originally set determination period is adopted (step ST5). If the signal is detected prior to the predetermined detection point (step ST3: Y), a determination period stop period for stopping a determination during the determination period is provided (step ST4). As subsequent processes are similar to those of FIG. 7, they are omitted herein.

In FIG. 21, reference numeral 20 is a step motor formed of the coil 9 and the rotor 10, reference numeral 1 is an oscillating circuit, reference numeral 2 is a frequency divider circuit, reference numeral 3 is a normal drive pulse generating circuit, reference numeral 4 is a correction drive pulse generating circuit, and reference numeral 5 is a first detection pulse generating circuit that outputs detection pulses B6 to B12 for performing a first detection mode based on a signal of the frequency divider circuit 2. The detection pulses B6 to B12 are 0.125 ms-wide pulses, as shown in FIG. 22(b) and outputted every 1 ms, in a period of 6 ms to 12 ms after the beginning of every second, respectively.

Reference numeral 506 is a second detection pulse generating circuit that outputs detection pulses F8 to F19 for performing a second detection mode based on a signal from the frequency divider circuit 2. The detection pulses F8 to F19 are outputs similar to FIG. 2(c).

Reference numeral 507 is a mask circuit that masks predetermined detection pulses of the detection pulses F8 to F19 and sends them to the pulse selecting circuit 7.

In this embodiment, when the first detection mode terminates with the detection pulses B6, B7, the mask circuit 507 performs masking operation whereby the detection pulse F11 is stopped from being generated and the detection pulses F8 to F10 and F12 to F19 are sent to the pulse selecting circuit 7, as shown in FIG. 22(c). In addition, when the first detection mode terminates after the detection pulse B8, the mask circuit 507 does not perform the masking operation, and the detection pulses F9 to F19 are all sent to the pulse selecting circuit 7.

Reference numeral 7 is a pulse selecting circuit, reference numeral 8 is a driver circuit, reference numeral 9 is the coil, reference numeral 10 is the rotor, reference numeral 11 is a detection circuit, reference numeral 412 is a first detection mode determination circuit for determining a first detection mode based on a detection signal from the detection circuit 11, and reference numeral 413 is a second detection mode determination circuit for determining a second detection mode based on a detection signal of the detection circuit 11.

Next, the operation of the above configuration will be described. The pulse selecting circuit 7 selects a normal drive pulse SP outputted from the normal drive pulse generating circuit 3 at the beginning of every second and drives the step motor 20. Then, 6 ms after the beginning of the second, the first detection mode starts. In the first detection mode, the pulse selecting circuit 7 outputs detection pulses B6 to B12 outputted from the first detection pulse generating circuit 5, and controls the step motor 20 so that an impedance of the coil 9 may vary. Then, the detection circuit 11 detects induced voltages generated in the coil due to the detection pulses B6 to B12. Meanwhile, the pulse selecting circuit 7 instructs the first detection mode determination circuit 412 to start the determination operation. The first detection mode determination circuit 412 determines detection result in the first detection mode, when a detection signal is inputted by the detection circuit 11. Based on receipt of the detection signal of the detection circuit 11, when the detection signal is generated twice, the first detection mode determination circuit 412 determines the detection, immediately stops the detection pulses outputted by the first detection pulse generating circuit 5, and shifts the first detection mode to the second detection mode by not only instructing the pulse selecting circuit 7 to stop the operation of the first detection mode, but also instructing the second detection mode determination circuit 413 to start the operation.

A determination period of the second detection mode varies depending on the determination time of the first detection mode. The configuration is such that when the first detection mode terminates prior to the detection pulse B7, the mask circuit 507 performs the masking operation, whereby the detection pulse F11 is stopped from being generated and the detection pulses F8 to F10 and F12 to F19 are sent to the pulse selecting circuit 7, as shown in FIG. 22(c), and that when the first detection mode terminates after the detection pulse B8, the mask circuit 507 does not perform the masking operation and the detection pulses F9 to F19 are all sent to the pulse selecting circuit 7. With this configuration, the second detection pulse generating circuit 506 functions as changing means for changing the determination period of the second detection mode in accordance with the determination time of the first detection mode.

First, described is a case where the second detection signal is generated by the detection pulse B7 and the first detection mode is shifted to the second detection mode. Since the second detection signal is generated by the detection pulse B7, the mask circuit 507 masks the detection pulse F11 so that the detection pulse F11 may not be sent to the pulse selecting circuit 7. Thus, the pulse selecting circuit 7 selects and outputs the detection pulses F8 to F10 and the detection pulses F12 to F19 generated by the second detection pulse generating circuit 506, and controls the step motor 20. Then, the detection circuit 11 detects induced voltages generated in the coil 9 due to the detection pulses F8 to F10 and the detection pulses F12 to F19. Based on receipt of the detection signal of the detection circuit 11, when a detection signal is generated even once, the second detection mode determination circuit 413 determines success of rotation, immediately stops detection pulses generated from the second pulse generating circuit 506, and controls the pulse selecting circuit 7 so that not only the operation of the second detection mode may terminate, but also no correction drive pulse FP may be outputted. However, the detection signals generated by the detection pulse 8 to F10 and the detection pulses F12 to F19 terminate after at most seven times of detection trials, i.e., after a detection trial of the detection pulse F15, which is the seventh detection trial as counted from the detection pulse F7.5 excluding the pulse F11 that is stopped from being generated. Note that, although the detection signals are aborted after seven detection trials, the determination period becomes long, e.g., the total length becomes 7 ms of the detection pulses F8 to F10 outputted in a period of 8 ms to 10 ms and the detection pulses F12 to F15 outputted in a period of 12 ms to 15 ms, respectively, if the determination period steps over the F11 that is stopped from being generated. If no detection signal is generated, the second detection mode determination circuit 413 determines failure of rotation, and controls the pulse selecting circuit 7 so that a correction drive pulse FP may be outputted.

Next, described is a case where two detection signals are not generated due to the pulse B7, for example, when the second detection signal is generated due to the detection pulse B8 and then the first detection mode is shifted to the second detection mode. Since the second detection signal is generated due to the detection pulse F8, the mask circuit 507 does not perform the masking operation for the detection pulse F11. Thus, the pulse selecting circuit 7 selects the detection pulses F9 to F19 generated by the second detection pulse generating circuit 506, and controls the step motor 20. Then, the detection circuit 11 detects induced voltages generated in the coil due to the detection pulses F9 to F19. Based on receipt of the detection signal of the detection circuit 11, when the detection signal is generated even once, the second detection mode determination circuit 413 determines success of rotation, immediately stops detection pulses outputted from the second detection pulse generating circuit 506, and further controls the pulse selecting circuit 7 so that no correction drive pulse FP may be outputted. However, detection signals generated by detection pulses terminate after at most seven times of detection trials, and if no detection signal is generated during the detection trials, the second detection mode determination circuit 413 determines failure of rotation, and controls the pulse selecting circuit 7 so that not only the operation of the second detection mode may terminate, but also a correction drive pulse FP may be outputted. For example, if a detection trial of the second detection mode starts from the detection pulse F9, the second detection mode is aborted after a detection trial of the detection pulse 15, which is the seventh detection trial as counted from the detection pulse F9. If no detection signal is generated during the detection trials, the second detection mode determination circuit 413 determines failure of rotation.

As described above, in the second detection mode, determinations are made to differ, by providing a stop period for some detection pulses. If determination time of the first detection mode terminates earlier, such as at 7 ms, the second detection mode is terminated after a long determination period by stopping some detection pulses. In contrast, if the determination time of the first detection mode terminates later in a period after 8 ms, the second detection mode is terminated after a short determination period, by performing detection trials in the same cycle of 1 ms.

A method for detecting actual rotation in the operation described above will be described with reference to the waveform diagrams in FIG. 22 and FIG. 3. First, a case where the pointer having the large moment of inertia is attached will be described. FIG. 3 is the same as that described in the first embodiment.

First, the normal drive pulse SP as shown in FIG. 22(*a*) is applied to the one end O1 of the coil 9, the rotor 10 rotates, and the current waveform c1 as shown in FIG. 3(*a*) is generated. When the normal drive pulse SP terminates, the rotor enters free vibration state, and current waveforms are those shown by c2, c31, cx and c41. At 6 ms, the first detection mode starts, and the detection pulse B6 as shown in FIG. 22(*b*) is applied to the coil 9. As shown in FIG. 3(*a*), at 6 ms, the current waveform is in the region of the current waveform c2, and a current value is on the negative side. Thus, as shown in FIG. 3(*c*), an induced voltage V6 generated due to the detection pulse B6 does not exceed a threshold value Vth. However, at 7 ms, the current waveform enters the region of the current waveform c31 and the current value changes to the positive side. Thus, as shown in FIG. 3(*c*), an induced voltage V7 generated due to the detection pulse B7 is a detection signal exceeding the threshold value Vth. Similarly, at 8 ms, the current waveform is still in the region of the current waveform c31, and an induced voltage V8 generated due to the detection pulse B8 is a signal exceeding the threshold value Vth. Since the two detection signals of the induced voltages V7, V8 have exceeded the threshold voltage Vth, the first detection mode switches to the second detection mode.

Since the switching to the second detection mode by the induced voltage V8 generated due to the detection pulse B8, the mask circuit does not perform the masking operation for the detection pulse F11. Then, a detection pulse of next timing, i.e., the detection pulse F9 at 9 ms as shown in FIG. 22(*c*) is applied to the coil 9. As shown in FIG. 3(*a*), at 9 ms, the current waveform is in the region of the current waveform c31 and the current value is on the positive side. Thus, as shown in FIG. 3(*b*), an induced voltage V9 generated due to the detection pulse F9 does not exceed the threshold value Vth. Similarly, as the current waveform is still in the region of the current waveform c31, induced voltages V10, V11, V12 generated due to the respective detection pulses F10, F11, F12 do not exceed the threshold value Vth. At 13 ms, the current waveform enters the region of the current waveform cx. However, the current value remains on the positive side, and induced voltages V13, V14 generated due to the detection pulses F13, F14 do not exceed the threshold value Vth, either. However, at 15 ms, which is the seventh detection trial in the second detection mode, the current waveform enters the region of the current waveform c41 as shown in FIG. 3(*a*), and the current value changes to the negative side. Thus, as shown in FIG. 3(*c*), an induced voltage generated due to the detection pulse F15 is a detection signal exceeding the threshold value Vth. Then, the second detection/determination circuit 413 correctly detects rotation to determine success of rotation, and controls the pulse selecting circuit 7 so that no correction drive pulse FP may be outputted.

Next, a case where the rotor 10 fails to rotate due to the effect of an external magnetic field will be described with reference to FIGS. 22 and 23. FIG. 23(*a*) shows current waveforms induced in the coil 9 when the rotor 10 fails to rotate due to the effect of external magnetic field. FIG. 23(*b*) shows voltage waveforms then generated at one terminal O1 of the coil 9, and FIG. 23(*c*) shows voltage waveforms generated at the other terminal O2 of the coil 9.

FIG. 23(*a*) shows current waveforms generated in the coil when the rotor fails to rotate due to the external magnetic field. First, at 6 ms, the first detection mode starts and the detection pulse B6 is applied to the coil 9. As shown in FIG. 23(*a*), at 6 ms, the current waveform is in the region of the current waveform c51, and a current value is on the positive side. Thus, as shown in FIG. 23(*c*), the induced voltage V6 is a detection signal exceeding the threshold value Vth. Further, at 7 ms, the current waveform is also in the region of the current waveform c71, the induced voltage V7 is a detection signal exceeding the threshold value Vth. Since the induced voltages V6, V7 and the two detection signals have exceeded the threshold value Vth, the first detection mode is shifted to the second detection mode.

Since the switching to the second detection mode by the induced voltage V7, a detection pulse of the next timing, i.e., a detection pulse F8 at 8 ms as shown in FIG. 22(*c*) is applied to the coil 9. As shown in FIG. 23(*a*), at 8 ms, the current waveform is in the region of the current waveform c71, and the current value is on the positive side. Thus, the induced voltage V8 generated by the detection pulse F8 does not exceed the threshold value Vth, as shown in FIG. 23(*b*).

Further, as the current waveform is still in the region of the current waveform c71, the induced voltages V9, V10 generated due to the detection pulses F9, F10 do not exceed the threshold value Vth. Next, as shown in FIG. 23(a), the current value changes to the negative side in a period of 10 ms to 12 ms. However, since a detection trial in the first detection mode is performed at V6 and V7, the first detection mode determination circuit 412 causes the mask circuit 507 to mask the detection pulse F11 so that the detection pulse F11 may not be sent to the pulse selecting circuit 7. Thus, a detection trial is not performed. Further, after 12 ms, the current value does not change to the negative side, and the second detection mode is aborted at F15 that is the seventh detection pulse. Thus, the second detection mode determination circuit 413 correctly determines failure of rotation, and controls the pulse selecting circuit 7 so that a correction drive pulse FP may be outputted. Thus, the clock does not stop.

In the fourth embodiment, although detection pulses are stopped for a certain period, the number of detection stop period or timing may be changed at the same time.

Fifth Embodiment

Figure 25:
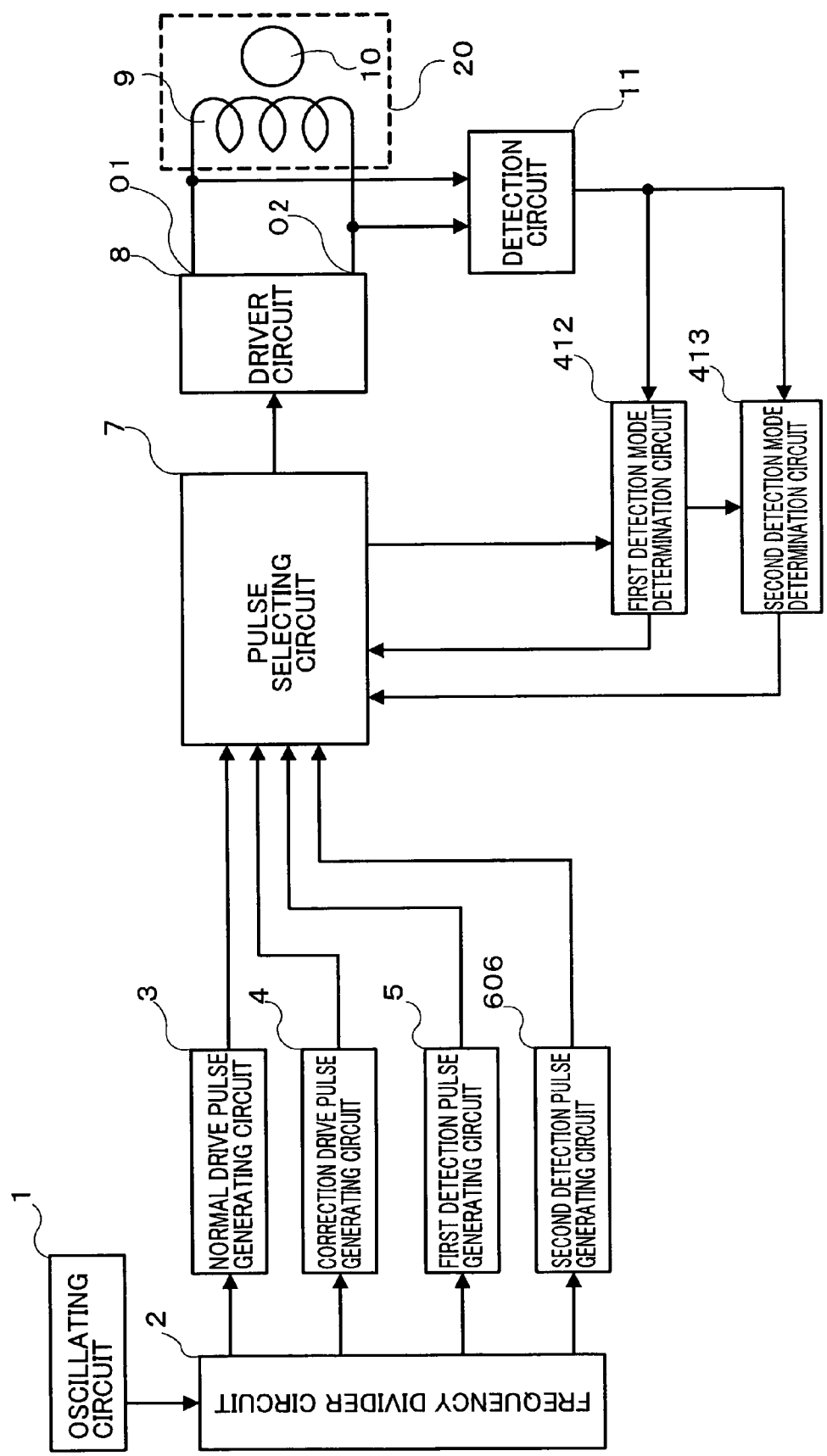
FIG. 25 is a block diagram showing a circuit configuration of an electronic clock of the present invention (fifth embodiment).

Next, a fifth embodiment of the present invention will be described in detail based on the drawings. The fifth embodiment is an example of changing the number of determination periods rather than changing the output timing of the detection pulses in the second detection mode. FIG. 25 is a block diagram showing a circuit configuration of an electronic clock of the fifth embodiment. FIG. 22 is a waveform diagram of pulses generated by the circuit of the electronic clock of the fifth embodiment (the same drawings as those of the fourth embodiment). FIG. 26 is a diagram of current waveforms and voltage waveforms generated in the coil when a pointer having a large moment of inertia is attached to the electronic clock of the fifth embodiment. FIG. 23 shows current waveforms and voltage waveforms generated in a coil when a rotor fails to rotate as it is affected by external magnetic field in the fifth embodiment (the same drawings as those of the fourth embodiment). Components that are the same as those described in the conventional example or the first to third embodiments are designated by the same reference numerals and will not be specifically described herein.

In FIG. 25, reference numeral 20 is a step motor formed of the coil 9 and the rotor 10, reference numeral 1 is an oscillating circuit, reference numeral 2 is a frequency divider circuit, reference numeral 3 is a normal drive pulse generating circuit, reference numeral 4 is a correction drive pulse generating circuit, and reference numeral 5 is a first detection pulse generating circuit that outputs detection pulses B6 to B12 for performing a first detection mode based on a signal of the frequency divider circuit 2. The detection pulses B6 to B12 are 0.125 ms-wide pulses, as shown in FIG. 22(b) and outputted every 1 ms in a period of 6 ms to 12 ms after the beginning of every second, respectively. Reference numeral 606 is a second detection pulse generating circuit that outputs detection pulses F8 to F10 and F12 to F19 for performing a second detection mode based on a signal of the frequency divider circuit 2 and stops (prohibits) a detection pulse F11 from being generated. The detection pulses F8 to F10 and F12 to F19 are 0.125 ms-wide pulses, as shown in FIG. 22(c); F8 to F10 are outputted for every 1 ms in a period of 8 ms to 10 ms after the beginning of every second, respectively; and F12 to F19 are also outputted for every 1 ms in a period of 12 ms to 19 ms after the beginning of every second, respectively.

While in the fourth embodiment, predetermined pulses of the detection pulses F8 to F19 are masked and sent to the pulse selecting circuit 7 based on the determination time of the first detection mode determination circuit 412, in this embodiment, the second detection pulse generating circuit 606 always stops the detection pulse from being generated. This can facilitate a circuit configuration.

Reference numeral 7 is a pulse selecting circuit, reference numeral 8 is a driver circuit, reference numeral 9 is a coil, reference numeral 10 is the rotor, reference numeral 11 is a detection circuit, reference numeral 412 is a first detection mode determination circuit for determining a first detection mode based on a detection signal from the detection circuit 11, and reference numeral 413 is a second detection mode determination circuit for determining a second detection mode based on a detection signal of the detection circuit 11.

Next, the operation of the above configuration will be described. The pulse selecting circuit 7 selects a normal drive pulse SP outputted from the normal drive pulse generating circuit 3 at the beginning of every second and drives the step motor 20. Then, 6 ms after the beginning of the second, the first detection mode starts. In the first detection mode, the pulse selecting circuit 7 outputs detection pulses B6 to B12 outputted from the first detection pulse generating circuit 5, and controls the step motor 20 so that an impedance of the coil 9 may vary. Then, the detection circuit 11 detects induced voltages generated in the coil due to the detection pulses B6 to B12. Meanwhile, the pulse selecting circuit 7 instructs the first detection mode determination circuit 412 to start the determination operation. The first detection mode determination circuit 412 determines detection result in the first detection mode, when a detection signal is inputted by the detection circuit 11. Based on receipt of the detection signal of the detection circuit 11, when a detection signal is generated twice, the first detection mode determination circuit 412 determines the detection, immediately stops the detection pulses outputted by the first detection pulse generating circuit 5, and shifts the first detection mode to the second detection mode by not only instructing the pulse selecting circuit 7 to stop the operation of the first detection mode, but also instructing the second detection mode determination circuit 413 to start the operation.

A determination period of the second detection mode varies depending on the determination time of the first detection mode. In the third embodiment, the second detection pulse generating circuit 306 outputs the detection pulses having two types of cycles (e.g., the detection pulse F7.5 having a cycle of 0.5 ms and outputted in a period of 7.5 ms to 8 ms, and the detection pulses F8 to F19 having a cycle of 1 ms and outputted in a period of 8 ms to 19 ms). In the fifth embodiment, however, the second detection pulse generating circuit 606 stops generation of the detection pulse F11 for the detection pulses F8 to F19 having a cycle of 1 ms and outputted in a period of 8 ms to 19 ms, respectively. With this configuration, the second detection pulse generating circuit 606 functions as changing means for changing the determination period of the second detection mode in accordance with the determination time of the first detection mode.

First, described is a case where the second detection signal is generated due to the detection pulse B7 and the first detection mode is shifted to the second detection mode. The pulse selecting circuit 7 selects and outputs the detection pulses F8 to F10 and the detection pulses F12 to F19 outputted by the second detection pulse generating circuit 606 and controls the step motor 20. Then, the detection circuit 11 detects induced voltages generated in the coil 9 due to the detection pulses F8 to F10 and the detection pulses F12 to F19. Based on receipt of the detection signal of the detection circuit 11, when the detection signal is generated even once, the second detection mode determination circuit 413 determines success of rotation, immediately stops detection pulses generated from the second pulse generating circuit 506, and controls the pulse selecting circuit 7 so that not only the operation of the second detection mode may terminate, but also no correction drive pulse FP may be outputted. However, the detection signals generated due to the detection pulse 8 to F10 and the detection pulses F12 to F19 terminate after at most seven times of detection trials, i.e., after a detection trial of the detection pulse F15, which is the seventh detection trial as counted from the detection pulse F8 excluding the pulse F11 that is stopped from being generated. Note that, although the detection signals are aborted after seven detection trials, the determination period becomes long, e.g., the total length becomes 7 ms of the detection pulses F8 to F10 outputted in a period of 8 ms to 10 ms and the detection pulses F12 to F15 outputted in a period of 12 ms to 15 ms, respectively. This is because the determination period steps over the F11 that is stopped from being generated. If no detection signal is generated, the second detection mode determination circuit 413 determines failure of rotation, and controls the pulse selecting circuit 7 so that a correction drive pulse FP may be outputted.

Next, described is a case where two detection signals are not generated due to the pulse B9, i.e., when the second detection signal is generated after the detection pulse B10 and then the first detection mode is shifted to the second detection mode. The pulse selecting circuit 7 selects the detection pulses F9 to F19 generated by the second detection pulse generating circuit 606, and controls the step motor 20. Then, the detection circuit 11 detects induced voltages generated in the coil due to the detection pulses F12 to F19. Based on receipt of the detection signal of the detection circuit 11, when the detection signal is generated even once, the second detection mode determination circuit 413 determines success of rotation, immediately stops detection pulses outputted from the second detection pulse generating circuit 606, and further controls the pulse selecting circuit 7 so that no correction drive pulse FP may be outputted. However, detection signals generated due to detection pulses terminate after at most seven times of detection trials, and if no detection signal is generated during the detection trials, the second detection mode determination circuit 413 determines failure of rotation, and controls the pulse selecting circuit 7 so that not only the operation of the second detection mode may terminate, but also a correction drive pulse FP may be outputted. For example, if a detection trial of the second detection mode starts from the detection pulse F12, the second detection mode is aborted after a detection trial of the detection pulse 18, which is the seventh detection trial as counted from the detection pulse F12. If no detection signal is generated during the detection trials, the second detection mode determination circuit 413 determines failure of rotation.

As described above, in the second detection mode, determinations are made to differ, by providing a stop period for some detection pulses. If determination time of the first detection mode terminates earlier, such as at 7 ms, the second detection mode is terminated after a long determination period by stopping some detection pulses. In contrast, if the determination time of the first detection mode terminates later in a period after 10 ms, the second detection mode is terminated after a short determination period, by performing detection trials in the same cycle of 1 ms.

A method for detecting actual rotation in the operation described above will be described with reference to the waveform diagrams in FIG. 22 and FIG. 26. First, a case where a pointer having a large moment of inertia is attached will be described. Compared with FIG. 3, in FIG. 26(*b*) only the second detection mode has a different waveform.

First, the normal drive pulse SP as shown in FIG. 22(*a*) is applied to the one end O1 of the coil 9, the rotor 10 rotates, and the current waveform c1 as shown in FIG. 26(*a*) is generated. When the normal drive pulse SP terminates, the rotor enters free vibration state, and current waveform are those shown by c2, c31, cx and c41. At 6 ms, the first detection mode starts, and the detection pulse B6 as shown in FIG. 22(*b*) is applied to the coil 9. As shown in FIG. 26(*a*), at 6 ms, the current waveform is in the region of the current waveform c2, and a current value is on the negative side. Thus, as shown in FIG. 26(*c*), an induced voltage V6 generated by the detection pulse B6 does not exceed a threshold value Vth. However, at 7 ms, the current waveform enters the region of the current waveform c31 and the current value changes to the positive side. Thus, as shown in FIG. 26(*c*), an induced voltage V7 generated by the detection pulse B7 is a detection signal exceeding the threshold value Vth. Similarly, at 8 ms, the current waveform is still in the region of the current waveform c31, and an induced voltage V8 generated by the detection pulse B8 is a signal exceeding the threshold value Vth. Since the two detection signals of the induced voltages V7, V8 have exceeded the threshold voltage Vth, the first detection mode switches to the second detection mode.

Since the switching to the second detection mode by the induced voltage V8 generated due to the detection pulse B8, the mask circuit does not perform the masking operation for the detection pulse F11. Then, a detection pulse of next timing, i.e., the detection pulse F9 at 9 ms as shown in FIG. 22(*c*) is applied to the coil 9. As shown in FIG. 26(*a*), at 9 ms, the current waveform is in the region of the current waveform c31 and the current value is on the positive side. Thus, as shown in FIG. 26(*b*), an induced voltage V9 generated due to the detection pulse F9 does not exceed the threshold value Vth. Similarly, as the current waveform is still in the region of the current waveform c31, induced voltages V10, V12 generated due to the respective detection pulses F10, F12 excluding the pulse 11 that is stopped from being generated do not exceed the threshold value Vth. At 13 ms, the current waveform enters the region of the current waveform cx. However, the current value remains on the positive side, and induced voltages V13, V14 generated by the detection pulses F13, F14 do not exceed the threshold value Vth, either. However, at 15 ms, which is the seventh detection trial in the second detection, the current waveform enters the region of the current waveform c41 as shown in FIG. 26(*a*), and the current value changes to the negative side. Thus, as shown in FIG. 26(*c*), an induced voltage generated due to the detection pulse F15 is a detection signal exceeding the threshold value Vth. Then, the second detection/determination circuit 413 correctly detects rotation to determine success of rotation, and controls the pulse selecting circuit 7 so that no correction drive pulse FP may be outputted.

Next, a case where the rotor 10 fails to rotate due to the effect of external magnetic field will be described with reference to FIGS. 22 and 23. FIG. 23(*a*) shows current waveforms induced in the coil 9 when the rotor 10 fails to rotate due to the effect of external magnetic field. FIG. 23(*b*) shows voltage waveforms then generated at one terminal O1 of the coil 9, and FIG. 23(*c*) shows voltage waveforms generated at the other terminal O2 of the coil 9 (the same drawings as those in the fourth embodiment).

FIG. 23(*a*) shows current waveforms generated in the coil when the rotor fails to rotate due to the external magnetic field. First, at 6 ms, the first detection mode starts and the detection pulse B6 is applied to the coil 9. As shown in FIG.

23(a), at 6 ms, the current waveform is in the region of the current waveform c51, and a current value is on the positive side. Thus, as shown in FIG. 23(c), the induced voltage V6 is a detection signal exceeding the threshold value Vth. Further, at 7 ms, the current waveform is also in the region of the current waveform c71, the induced voltage V7 is a detection signal exceeding the threshold value Vth. Since the induced voltages V6, V7 and the two detection signals have exceeded the threshold value Vth, the first detection mode is shifted to the second detection mode.

Since the switching to the second detection mode by the induced voltage V7, a detection pulse of next timing, i.e., a detection pulse F8 at 8 ms as shown in FIG. 22(c) is applied to the coil 9. As shown in FIG. 23(a), at 8 ms, the current waveform is in the region of the current waveform c71, and the current value is on the positive side. Thus, the induced voltage V8 generated due to the detection pulse F8 does not exceed the threshold value Vth, as shown in FIG. 23(b). Further, as the current waveform is still in the region of the current waveform c71, the induced voltages V9, V10 generated due to the detection pulses F9, F10 do not exceed the threshold value Vth. Next, as shown in FIG. 23(a), the current value changes to the negative side in a period of 10 ms to 12 ms. However, since the second detection pulse generating circuit 606 always stops the detection pulse 11 from being generated, a detection trial is not performed. Further, after 12 ms, the current value does not change to the negative side, and the second detection mode is aborted at F15 that is the seventh detection pulse. Thus, the second detection mode determination circuit 413 correctly determines failure of rotation, and controls the pulse selecting circuit 7 so that a correction drive pulse FP may be outputted. Thus, the clock does not stop.

In the fifth embodiment, although detection pulses are always stopped for a certain period, similar to the fourth embodiment, the number of stop periods for the detection pulses or timing may be changed at the same time.

For example, in this embodiment, although only the detection pulse F11 is stopped from being generated, needless to say, more than one detection pulse may be stopped (F10 to F12 may be stopped, for example).

In addition, in this embodiment, although the stop period is only once (F11), there may be more than one stop period. This is effective when more than one negative current such as c81 is generated during the determination period (F8 to F19) of the second detection mode (F11 and F13 are stopped, for example).

Further, in this embodiment, when the number of detection trials before the aborting of the detection in the second detection mode is counted, the determination period appears to be extended by not including the F11 that is stopped from being generated. However, the number of detection trials before the aborting of the detection in the second detection mode may be counted including a detection pulse that is stopped from being generated. This can terminate detections earlier, thereby reducing the possibility of erroneous detections.

Although the embodiments of the present invention have been described in detail with reference to the drawings, the embodiments are simply exemplary and the present invention should not be limited to the configurations of the embodiments. Therefore, it is needless to say that any design change, etc. without departing from the spirit of the present invention may be contained in the present invention.

For instance, each of the block diagrams shown in FIGS. 1, 8, 12, 21, and 25 is one example, and another configuration may be provided as long as the above-mentioned operation is performed.

In addition, current waveforms vary in their waveforms, i.e., output level or temporal response, depending on electric properties of the step motor or voltage values of driving pulses, etc. However, the effect of the present embodiment may be achieved without relying on the current waveforms, by changing the cycle of the first detection pulse, the cycle of the second detection pulse, the number of trials before the aborting of the detection in the second detection mode (the number of outputs of the second detection pulses), the threshold value Vth, etc. to an appropriate value depending on waveforms.

In addition, in the above embodiments, descriptions have been made for cases where a negative current possibly causing an erroneous detection occurs at the end or center of the determination period. However, the negative current might occur early in the determination period. In such a case, a detection trial of the negative current may be postponed by delaying start time of the second detection mode.

As a method of postponing a detection trial of the negative current, there is a method as a measure in which the period for stopping generation of detection pulses according to the fourth and fifth embodiments is set early in the determination period. However, it should of course be understood that the method is not limited to the above.

INDUSTRIAL APPLICABILITY

The present invention is applicable to any electronic clock provided with a step motor that drives a second hand, regardless of electric properties of the step motor and a moment of inertia of the second hand to be driven, i.e., mass of the second hand.

The invention claimed is:

1. An electronic clock comprising:
a step motor having a coil and a rotor;
a drive pulse generating means configured to generate a drive pulse to drive the step motor;
a step motor driving means configured to drive the step motor based on the drive pulse;
a rotor rotation detecting means configured to detect a rotation status of the rotor based on an induced voltage generated in the coil;
a first detection/determination means configured to determine rotation or non-rotation of the rotor based on a detection signal outputted by the rotor rotation detecting means; and
a second detection/determination means configured to determine whether rotation or non-rotation of the rotor occurs within a determination period based on a detection signal outputted by the rotor rotation detecting means, the determination of whether rotation or non-rotation of the rotor occurs being performed after determination by the first detection/determination means,
wherein the second detection/determination means is configured to change the determination period of the second detection/determination means based on whether or not a determination time required for the determination by the first detection/determination means is shorter than a predetermined length of time.

2. The electronic clock according to claim 1, further comprising:
a first detection pulse generating means configured to generate a first pulse signal having a predetermined cycle within a first predetermined period after the generation of the drive pulse; and
a second detection pulse generating means configured to generate a second pulse signal having a predetermined cycle within a second predetermined period after the generation of the first pulse signal, wherein the rotor rotation detecting means is configured to detect a rotation status of the rotor in the first predetermined period based on an induced voltage converted through the first pulse signal from an induced current generated due to the drive pulse in the coil after the rotor is driven, and also to detect a rotation status of the rotor in the second predetermined period based on an induced voltage converted through the second pulse signal from the induced current.

3. The electronic clock according to claim 2, wherein:

the second detection/determination means is configured to determine one of rotation and non-rotation of the rotor during the determination period; and the determination period is shortened if the determination time of the first detection/determination means is shorter than the predetermined length of time.

4. The electronic clock according to claim 3, wherein the second detection pulse generating means shortens the determination period by reducing the quantity of the second pulse signals.

5. The electronic clock according to claim 3, wherein the second detection pulse generating means shortens the determination period by shortening the predetermined cycle of the second pulse signal.

6. The electronic clock according to claim 3, wherein the second detection pulse generating means shortens the determination period by shortening the predetermined cycle of the second pulse signal in a part of the second determined period.

7. The electronic clock according to claim 3, wherein the second detection pulse generating means shortens the determination period by at least one of the methods for reducing the number of the second pulse signals, for shortening the predetermined cycle of the second pulse signal, and for shortening the predetermined cycle for the second pulse signal in a part of the second predetermined period.

8. The electronic clock according to claim 2, wherein the determination period is a determination length of time during which the second detection/determination means determines one of rotation and non-rotation of the rotor; and the second detection/determination means is configured to stop the second pulse signals from being generated at least in a part of the second predetermined period, if the determination time of the first detection/determination means is shorter than the predetermined length of time.

9. The electronic clock according to claim 8, wherein the second detection/determination means is configured to stop the second pulse signal from being generated at least in a part of the second predetermined period so that the determination period is extended.

10. The electronic clock according to claim 1, further comprising correction drive pulse generating means configured to generate a correction drive pulse to perform correction drive of the step motor, wherein the correction drive pulse is outputted to the step motor drive means when one of the first detection/determination means and the second detection/determination means determines the non-rotation of the rotor.

11. The electronic clock according to claim 1, wherein:

the second detection/determination means is configured to determine one of rotation and non-rotation of the rotor during the determination period; and the determination period is shortened if the determination time of the first detection/determination means is shorter than the predetermined length of time.

* * * * *